United States Patent
Khusnutdinova et al.

(10) Patent No.: US 12,365,800 B2
(45) Date of Patent: Jul. 22, 2025

(54) POLYMER, MECHANICAL STRESS SENSOR, METHOD FOR DETECTING MECHANICAL STRESS, METHOD FOR PREPARING POLYMER, COPPER COMPLEX AND METHOD FOR PREPARING SAME

(71) Applicant: OKINAWA INSTITUTE OF SCIENCE AND TECHNOLOGY SCHOOL CORPORATION, Kunigami-gun Okinawa (JP)

(72) Inventors: Julia Khusnutdinova, Kunigami-gun Okinawa (JP); Ayumu Karimata, Kunigami-gun Okinawa (JP)

(73) Assignee: OKINAWA INSTITUTE OF SCIENCE AND TECHNOLOGY SCHOOL CORPORATION, Okinawa (JP)

(*) Notice: Subject to any disclaimer, the term of this patent is extended or adjusted under 35 U.S.C. 154(b) by 1015 days.

(21) Appl. No.: 17/349,401

(22) Filed: Jun. 16, 2021

(65) Prior Publication Data
US 2022/0041866 A1   Feb. 10, 2022

(30) Foreign Application Priority Data

Jun. 16, 2020   (JP) .................. 2020-103434

(51) Int. Cl.
*C08L 101/00* (2006.01)
*C08K 5/56* (2006.01)
(Continued)

(52) U.S. Cl.
CPC .............. *C08L 101/00* (2013.01); *C08K 5/56* (2013.01); *G01L 1/24* (2013.01); *G01N 21/64* (2013.01);
(Continued)

(58) Field of Classification Search
CPC .............. C08L 101/00; C08L 2207/04; C08L 2312/00; C08K 5/56; G01L 1/24; G01N 21/64; G01N 2021/6497
(Continued)

(56) References Cited

FOREIGN PATENT DOCUMENTS

JP   2013511532 A   4/2013
JP   2016516731 A   6/2016
(Continued)

OTHER PUBLICATIONS

Filonenko et al., "Dynamic Phosphorscent Probe for Facile and Reversible Stress Sensing", Adv. Mater., 2017, 29, 1700563. (Year: 2017).*

(Continued)

*Primary Examiner* — Ling Siu Cho
*Assistant Examiner* — Ronald Grinsted
(74) *Attorney, Agent, or Firm* — FISHERBROYLES, LLP; Roger L. Browdy

(57) ABSTRACT

A polymer comprising a polymer chain moiety and a copper complex moiety (1) is useful as a mechanoresponsive luminescent material. $R_1$ and $R_2$ are linking groups to the polymer chain moiety; $R_3$ to $R_6$ are H or substituent.

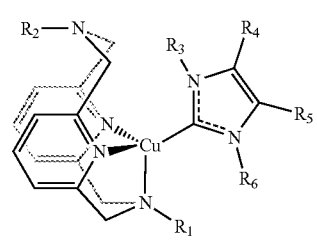

19 Claims, 32 Drawing Sheets

(51) Int. Cl.
*G01L 1/24* (2006.01)
*G01N 21/64* (2006.01)

(52) U.S. Cl.
CPC ....... *C08L 2207/04* (2013.01); *C08L 2312/00* (2013.01); *G01N 2021/6497* (2013.01)

(58) Field of Classification Search
USPC ........................................................ 524/440
See application file for complete search history.

(56) References Cited

FOREIGN PATENT DOCUMENTS

| JP | 2016517612 A | 6/2016 |
|---|---|---|
| WO | 2011063083 A1 | 5/2011 |
| WO | 2014131628 A1 | 9/2014 |

OTHER PUBLICATIONS

Georgy A. Filonenko, "Dynamic Phosphorescent Probe for Facile and Reversible Stress Sensing", Adv. Mater 2017, 29, 1700563.
Office Action dated Apr. 30, 2025 issued in the corresponding Japanese patent application No. 2021-100546 with its English Machine Translation.
Karimata, Ayumu et al., "Sensitive mechanocontrolled luminescence in cross-linked polymer films", ChemRxiv, pp. 1-19, 2019.
Filonenko, Georgy A et al., "Multicolor Organometallic Mechanophores for Polymer Imaging Driven by Exciplex Level Interactions", Journal of the American Chemical Society, vol. 141, pp. 9687-9692, 2019.
Canossa Stefano et al., "Color-Based Optical Detection of Glass Transitions on Microsecond Timescales Enabled by Exciplex Dynamics", Advanced Materials, vol. 32, pp. 1-6 2019.

\* cited by examiner

POLYMER, MECHANICAL STRESS SENSOR, METHOD FOR DETECTING MECHANICAL STRESS, METHOD FOR PREPARING POLYMER, COPPER COMPLEX AND METHOD FOR PREPARING SAME

CROSS-REFERENCE TO RELATED APPLICATION

This application claims the benefit of priority from Japanese Application No. 2020-103434, filed Jun. 16, 2020, the disclosures of which applications are incorporated by reference herein in their entirety.

TECHNICAL FIELD

The present invention relates to a mechanoresponsive luminescent material that is useful as a sensor material detecting mechanical strain and stress.

BACKGROUND OF THE INVENTION

Mechanoresponsive materials are a class of "smart" materials that demonstrate specific property changes induced by mechanical stimuli, for example, showing self-reporting or self-healing properties. Given the widespread use of synthetic polymers for engineering applications, the design of mechanoresponsive polymers capable of self-reporting mechanical stress is of high importance not only for preventing the materials' failure, but also for the better understanding of polymer response to mechanical force. An interesting approach to the design of diverse mechanosensitive materials includes the use of mechanophores covalently incorporated into polymer samples, which can change their spectroscopic properties in response to mechanical force.[1] The majority of commonly used mechanophores are based on organic molecules such as spiropyran,[2] 1,2-dioxetane,[3] diaryldibenzofuranone,[4] and others,[5] in which scission of a weak covalent chemical bond is caused by mechanical force. Intrinsically, the requirement for such covalent bond scission, and its associated structural reorganization, often leads to an irreversible response, or a slow recovery of the mechanophore's original state. Such drawbacks hinder the development of practical mechanical stress probes that can directly visualize subtle stress changes repeatably in realtime. Although some progress has been made in developing molecular mechanophores that do not require covalent bond scission,[6] including our previous report,[7] these systems typically require significant strain (>100%, e.g. stretching to more than two-fold of the original length during a tensile test) and stress (several MPa) to observe a response. In general, the development of a mechanosensitive system with fast, reversible and sensitive response remains a tremendous opportunity, as well as a challenge.

Our group has recently reported a $Cu^I$ iodide complex with a macrocyclic pyridinophane ligand covalently incorporated into a linear polyurethane chain that shows gradual photoluminescence intensity changes in response to tensile stress (FIG. 1) (NPL 1).[7] However, that initial system suffered from fast degradation under air, low photoluminescence quantum yield (PLQY), and it also required stretching to several times of the sample's initial length (strain >100%) in order to observe the response, meaning an overall low sensitivity and an inefficient transmission of mechanical force.

CITATION LIST

Non Patent Literatures

NPL 1: Adv. Mater., 2017, 29, 1700563

SUMMARY OF THE INVENTION

In such a situation, the inventors have further performed earnest investigations with the aim of realizing a material that the light-emitting characteristics change reversibly and sensitively in response to mechanical force.

As a result of earnest investigations for achieving the objects, it has been found that the emission intensity of a polymer introduced with a copper complex having a pyridinophane ligand and a N-heterocyclic carbene (NHC) ligand is reversibly and sensitively increased by causing mechanical strain on the polymer. It has been also found that the polymer is useful as a mechanoresponsive luminescent material. Based on the knowledge, the inventors have consequently provided the invention below as a measure for solving the problems.

[1] A polymer comprising a polymer chain moiety and a copper complex moiety represented by the following formula (1):

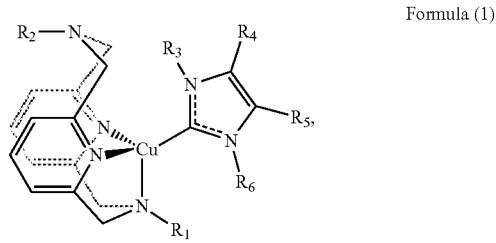

Formula (1)

wherein $R_1$ and $R_2$ each independently represent a linking group to the polymer chain moiety; and $R_3$ to $R_6$ each independently represent a hydrogen atom or a substituent, provided that $R_3$ and $R_4$, $R_4$ and $R_5$, and $R_5$ and $R_6$ each may be bonded to each other to form a cyclic structure, and at least one of the pyridine rings may be substituted.

[2] The polymer of [1], wherein $R_1$ and $R_2$ each comprise a functional group selected from the group consisting of an acryloyl group, an epoxy group, a triazole group, a sulfide group, a disulfide group, a siloxane bond, an amide group, an ester group, a carbon-carbon single bond, a carbon-carbon double bond, a carbon-carbon triple bond, an azide group, a thiol group, a hydroxy group, a carboxy group, an amino group, a cyanate group, and an isocyanate group.

[3] The polymer of [1] or [2], wherein $R_1$ and $R_2$ each independently comprise a group represented by the following formula (1a).

Formula (1a)

wherein $R_{11}$ and $R_{12}$ each independently represent a hydrogen atom or a substituted or unsubstituted alkyl group, and at least one of $R_{11}$ and $R_{12}$ is a substituted or unsubstituted alkyl group.

[4] The polymer of any one of [1] to [3], wherein $R_3$ to $R_6$ each independently represent a hydrogen atom, an alkyl group, an alkenyl group, an alkynyl group, an alkoxy group, a nitro group, a cyano group, a halogen atom, a hydroxy group, a thiol group, an acyl group, a carboxyl group, a carboxyamide group, an ester group, a silane group, an alkoxysilane group, an amino group, an aldehyde group, an amide group, an isocyanate group, a triazole group, a sulfide group, a disulfide group, an aryl-substituted alkyl group, a haloalkyl group, a haloalkoxy group, an aryl group, a heterocycloalkyl group, or a heteroaryl group.

[5] The polymer of any one of [1] to [4], wherein $R_4$ and $R_5$ are bonded to each other to form an aromatic ring.

[6] The polymer of any one of [1] to [5], wherein at least one of the pyridine rings in the formula (1) is substituted with a substituent.

[7] The polymer of any one of [1] to [6], wherein $R_3$ and $R_6$ are benzyl groups.

[8] The polymer of any one of [1] to [7], wherein the copper complex moiety is a crosslinker of the polymer chain moieties.

[9] The polymer of any one of [1] to [8], wherein the polymer is an elastomeric polymer.

[10] The polymer of any one of [1] to [9], wherein the polymer chain moiety comprises a structure selected from the group consisting of polyurethane, polyester, polyamide, polylactone, polystyrene, polyacrylate, polymethacrylate, polyalkyleneoxide, polysiloxane, polydimethylsiloxane, polycarbonate, polylactide, polyolefin, polyisobutylene, polyamideimide, polybutadiene, epoxy resin, polyacetylene, and polyvinyl.

[11] The polymer of any one of [1] to [10], wherein the material is a film, a coating, or a fiber.

[12] A composite material comprising the polymer of any one of [1] to [11].

[13] A mechanical stress, strain, or deformation sensor comprising the polymer of any one of [1] to [11].

[14] A method for detecting a mechanical stress, strain, or deformation comprising:
determining a mechanoresponse of the polymer of [1].

[15] The method of [14], wherein the mechanoresponse is determined by detecting a photoluminescence or a color change of the mechanoresponsive luminescent material.

[16] The method of [14] or [15], wherein the mechanical stress, strain, or deformation is derived from a mechanical loading selected from the group consisting of compression, tension, tensile stretch, impact, shear, crush, bend, abrasion, torsion, scratching, rubbing, and ultrasound.

[17] A method for preparing a polymer comprising a polymer chain moiety and a copper complex moiety represented by the following formula (1):

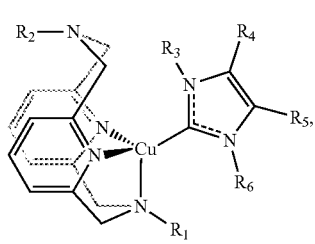

Formula (1)

wherein $R_1$ and $R_2$ each independently represent a linking group to the polymer chain moiety; and $R_3$ to $R_6$ each independently represent a hydrogen atom or a substituent, provided that $R_3$ and $R_4$, $R_4$ and $R_5$, and $R_5$ and $R_6$ each may be bonded to each other to form a cyclic structure, and at least one of the pyridine rings may be substituted, wherein the method comprises:

(1a) copolymerizing a monomer and a compound represented by the following formula (3a) to obtain a precursor polymer:

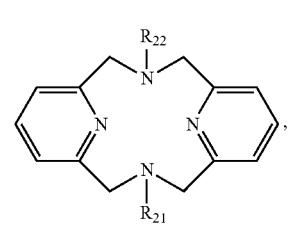

Formula (3a)

wherein $R_{21}$ and $R_{22}$ each independently represent a polymerizable group, and at least one of the pyridine rings may be substituted; or (1b) reacting a polymer chain having a first functional group and a compound represented by the following formula (3b) to obtain a precursor polymer:

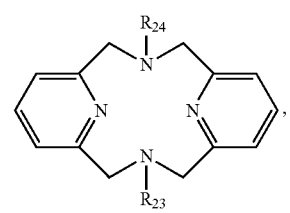

Formula (3b)

wherein $R_{23}$ and $R_{24}$ each independently represent a group having a second functional group that reacts with the first functional group to form a bond, and at least one of the pyridine rings may be substituted; and then, (2) reacting the precursor polymer and a compound represented by the following formula (4):

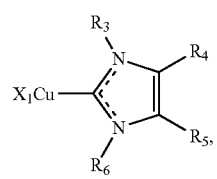

Formula (4)

wherein $X_1$ represents a halogen atom, a triflate group, or a pseudohalogen group; and $R_3$ to $R_6$ each independently represent a hydrogen atom or a substituent, provided that $R_3$ and $R_4$, $R_4$ and $R_5$, $R_5$ and $R_6$ each may be bonded to each other to form a cyclic structure.

[18] A copper complex represented by the following formula (5):

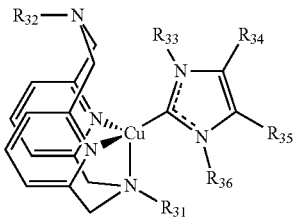

Formula (5)

wherein $R_{31}$ to $R_{36}$ each independently represent a hydrogen atom or a substituent, provided that $R_{33}$ and $R_{34}$, $R_{34}$ and $R_{35}$, $R_{35}$ and $R_{36}$ each may be bonded to each other to form a cyclic structure and at least one the pyridine rings may be substituted, and in case where $R_{34}$ and $R_{35}$ are both hydrogen atoms, $R_{33}$ and $R_{36}$ are not both methyl groups or both isopropyl groups.

[18a] The copper complex of [18] satisfying the limitation of [3].
[18b] The copper complex of any of [18] to [18a] satisfying the limitation of [4].
[18c] The copper complex of any of [18] to [18b] satisfying the limitation of [5].
[18d] The copper complex of any of [18] to [18c] satisfying the limitation of [6].
[18e] The copper complex of any of [18] to [18d] satisfying the limitation of [7].
[19] A method for preparing the copper complex any one of [18] to [18e], comprising:
   reacting a compound represented by the following formula (6) and a compound represented by the following formula (7):

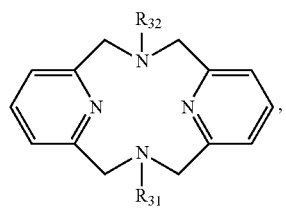

Formula (6)

wherein $R_{31}$ and $R_{32}$ each independently represent a hydrogen atom or a substituent, and at least one of the pyridine rings may be substituted;

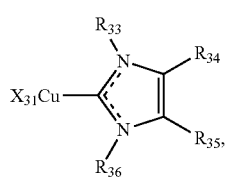

Formula (7)

wherein $X_{31}$ represents a halogen atom, a triflate group, or a pseudohalogen group; and $R_3$ to $R_6$ each independently represent a hydrogen atom or a substituent, provided that $R_{33}$ and $R_{34}$, $R_{34}$ and $R_{35}$, $R_{35}$ and $R_{36}$ each may be bonded to each other to form a cyclic structure, and in case where $R_{34}$ and $R_{35}$ are both hydrogen atoms, $R_{33}$ and $R_{36}$ are not both methyl groups or both isopropyl groups.

The polymer of the invention is useful as a mechanoresponsive luminescent material. The mechanoresponsive luminescent material of the invention changes its light emitting intensity reversibly and sensitively in response to mechanical strain. Therefore, the mechanoresponsive luminescent material of the invention is useful as a sensor material for detecting strain and stress. The sensor containing the mechanoresponsive luminescent material of the invention detects strain and stress generated in the object to be detected with high sensitivity.

DETAILED DESCRIPTION OF THE INVENTION

Figure 1:
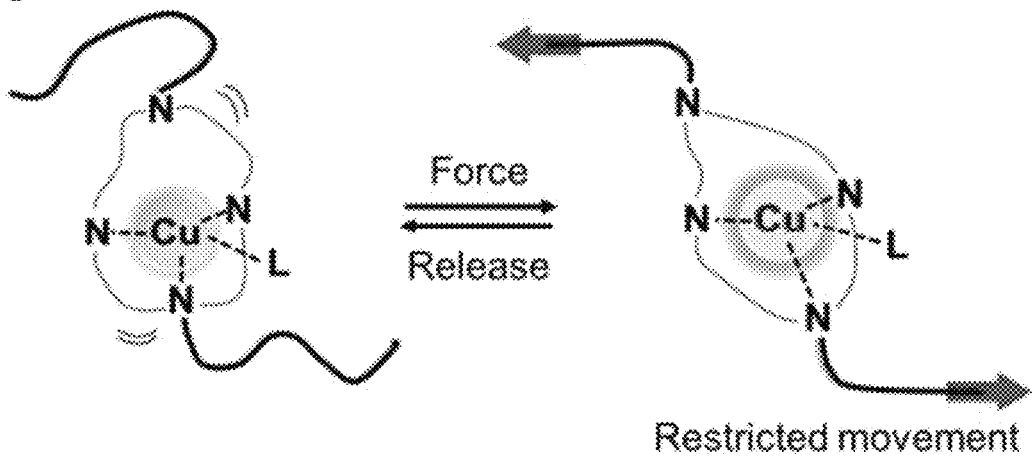
FIG. 1 is an illustration showing a $Cu^I$ iodide complex with a macrocyclic pyridinophane ligand covalently incorporated into a linear polyurethane chain.

The contents of the invention will be described in detail below. The constitutional elements may be described below with reference to representative embodiments and specific examples of the invention, but the invention is not limited to the embodiments and the examples. In the present specification, a numerical range expressed by "from X to Y" means a range including the numerals X and Y as the lower limit and the upper limit, respectively.

The invention provides a polymer with a polymer moiety and a copper complex moiety. The copper complex moiety is represented by the formula (1). It has a Cu complex structure having a pyridinophane ligand and a N-heterocyclic carbene (NHC) ligand and emits light when excited. The polymer is useful as a mechanoresponsive luminescent material.

In the following description, the polymer with a polymer moiety and a copper complex moiety of the formula (1) may be referred to as a "Cu complex-containing polymer". The nitrogen atom constituting the bridging structure of the pyridinophane ligand is referred to as "bridging nitrogen", and the nitrogen atom constituting the pyridine ring of the pyridinophane ligand is referred to as "pyridine nitrogen".

Hereinafter, the polymer with a polymer moiety and a copper complex moiety of the formula (1) will be described in detail.

Copper Complex Moiety of the Formula (1)

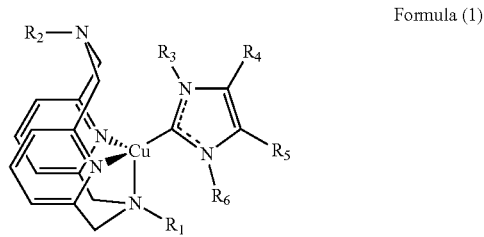

Formula (1)

In the formula (1), $R_1$ and $R_2$ each independently represent a linking group to a polymer chain moiety. The structures of $R_1$ and $R_2$ may be the same as or different from each other. The linking group represented by $R_1$ and $R_2$ is a divalent group linking the bridge nitrogen of the pyridinophane rings and one of the polymer chain moieties. $R_1$ and $R_2$ may bond to the same polymer chain moiety but preferably $R_1$ and $R_2$ bond to different polymer chain moieties to form a crosslink between these moieties. The polymer of the invention may comprise a copper complex moiety in which $R_1$ and $R_2$ bond to the same polymer chain moiety and a copper complex moiety in which $R_1$ and $R_2$ bond to different polymer chain moieties to form a crosslink. The linking group is preferably an alkylene group (carbon-carbon single bond), an alkenylene group (carbon-carbon double bond), an alkynylene group (carbon-carbon triple bond), a carbonyl group, an oxy group, a sulfide group, a siloxane group, an amide group, an ester group, or a combination of two or more of these divalent groups. Examples of the combination include an alkyleneoxycarbonyl group, an alkylenecarbonyloxy group, an alkylene carbonyl group, an alkyleneoxy group, an alkylenethio group, a disulfide group, an alkylenesiloxane group, and an alkyleneamide group. Specific examples of the linking group include a methyleneoxycarbonyl group, an ethyleneoxycarbonyl group and an propyleneoxycarbonyl group.

The linking group preferably comprises an alkylene group. The carbon number of the alkylene group in the linking group is preferably from 1 to 10, more preferably from 1 to 6, and further preferably from 1 to 4. The alkylene group may be linear or branched. The alkylene group may be substituted or unsubstituted. Further, the alkylene group in the linking group preferably has a branched structure represented by the following formula (2). When the alkylene group has a branched structure, the steric effect of the branched structure suppresses the isomerization of the pyridinophane ligand and suppresses the increase in the non-radiative decay rate due to the isomerization. As a result, the light emission efficiency of the mechanoresponsive luminescent material is improved.

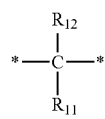

Formula (2)

In the formula (2), $R_{11}$ and $R_{12}$ each independently represent a hydrogen atom or a substituted or unsubstituted alkyl group, and at least one of $R_{11}$ and $R_{12}$ is a substituted or unsubstituted alkyl group. * represents the bonding position to the neighboring atom. The substituted or unsubstituted alkyl group may be either one or both of $R_{11}$ and $R_{12}$. Preferably, both $R_{11}$ and $R_{12}$ are substituted or unsubstituted alkyl groups. When both $R_{11}$ and $R_{12}$ are substituted or unsubstituted alkyl groups, these substituted or unsubstituted alkyl groups may be the same as or different from each other. The alkyl group in $R_{11}$ and $R_{12}$ may be linear, branched or cyclic. The alkyl group preferably has 1 to 10 carbon atoms, more preferably has from 1 to 6 carbon atoms, further preferably has from 1 to 3 carbon atoms.

A preferable example of the linking group represented by $R_1$ and $R_2$ is a linking group having a structure represented by the following formula (2a).

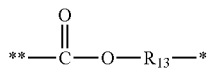

Formula (2a)

In the formula (2a), $R_{13}$ represents a substituted or unsubstituted alkylene group. * represents the bonding position to the bridge nitrogen of the pyridinophane rings, and ** represents the bonding position to a polymer chain moiety. For description of the substituted or unsubstituted alkylene group represented by $R_{13}$, and the preferable range and specific examples thereof, reference may be made to the description of the substituted or unsubstituted alkylene group in $R_1$ and $R_2$, and the preferable range and specific examples thereof above.

In the formula (1), $R_3$ to $R_6$ each independently represent a hydrogen atom or a substituent. $R_3$ to $R_6$ may be the same as or different from each other. The number of substituents among $R_3$ to $R_6$ is not particularly limited, and all of them may be hydrogen atoms. In a preferred embodiment, at least $R_3$ and $R_6$ are substituents. Specific examples of the substituent for $R_3$ to $R_6$ include an alkyl group having from 1 to 20 carbon atoms, an alkenyl group having from 2 to 20 carbon atoms, an alkynyl group having from 2 to 20 carbon atoms, an alkoxy group having from 1 to 20 carbon atoms, a nitro group, a cyano group, a halogen atom, a hydroxy group, a thiol group, an acyl group having from 2 to 20 carbon atoms, a carboxyl group, a carboxyamide group, an ester group, a silane group, an alkoxysilane group, an amino group, an aldehyde group, an amide group, a sulfide group, a disulfide group, an aryl group having from 6 to 40 carbon atoms, a heterocycloalkyl group, a heteroaryl group having from 4 to 40 carbon atoms, and a combination of these groups. In some embodiments of the invention, $R_3$ and $R_6$ are preferably an alkyl group substituted with a substituted or unsubstituted aryl group, more preferably an alkyl group substituted with a substituted or unsubstituted phenyl group, particularly preferably a benzyl group.

In the formula (1), $R_3$ and $R_4$, $R_4$ and $R_5$, and $R_5$ and $R_6$ each may be bonded to each other to form a cyclic structure. The cyclic structure may be an aromatic ring or an aliphatic ring, and may be one containing a hetero atom. The hetero atom herein is preferably selected from the group consisting of a nitrogen atom, an oxygen atom and a sulfur atom. Specific examples of the cyclic structure formed include a benzene ring, a naphthalene ring, a pyridine ring, a pyrrole ring, a furan ring, a thiophene ring, and a fused ring composed of two or more of these rings. The cyclic structure may be substituted. For specific examples of the substituent, reference may be made to the above specific examples of the substituent for $R_3$ to $R_6$. In some embodiments of the invention, $R_4$ and $R_5$ are bonded to each other to form a cyclic structure, and the cyclic structure is preferably an aromatic ring, more preferably a benzene ring.

In the formula (1), the pyridine rings constituting the pyridinophane ring may be substituted with a substituent. For specific examples of the substituent, reference may be made to the above specific examples of the substituent for $R_3$ to $R_6$.

The polymer may comprise only one kind of copper complex moiety or may comprise two or more kinds of copper complex moieties.

The molecular weight of the copper complex moiety is not specifically limited but preferably less than 1500, more preferably less than 1000. For example, the copper complex moiety may be selected from the moieties with a molecular weight of less than 800.

Polymer Chain Moiety

The polymer chain moiety constituting the polymer of the invention is not particularly limited. Examples of the polymer chain moiety include polyurethane, polyester, polyamide, polylactone, polystyrene, polyacrylate, polymethacrylate, polyalkyleneoxide, polysiloxane, polydimethylsiloxane, polycarbonate, polylactide, polyolefin, polyisobutylene, polyamideimide, polybutadiene, epoxy resin, polyacetylene and polyvinyl. The polymer chain moiety may be a homopolymer or a copolymer and may comprise a crosslinked structure. Further, the polymer chain moiety may comprise only one kind of polymer chain or may comprise two or more kinds of polymer chains bonding together.

EXAMPLES OF THE POLYMER

The polymer of the invention is preferably an elastomer polymer.

Specific examples of the polymer of the invention comprising a copper complex moiety and a polymer chain moiety are shown below. However, the copper complex moieties and the polymer chain moieties capable of being used in the invention are not construed as being limited to the specific examples. In the following formulae, each Bn represents a benzyl group, and the wavy lines represent the bonding position to a polybutylacrylate chain.

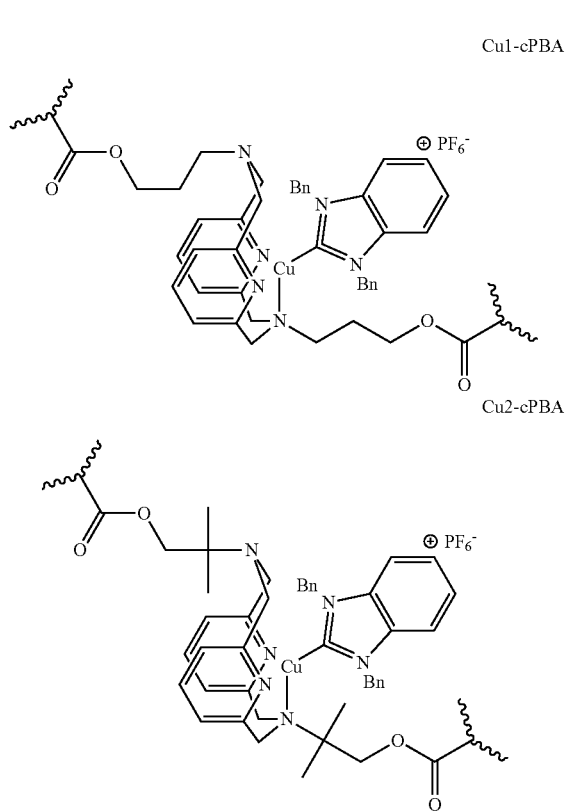

Cu1-cPBA

Cu2-cPBA

Mechanoresponsive Luminescent Material

The invention also provides mechanoresponsive luminescent material comprising the polymer of the invention. The mechanoresponsive luminescent material may consist of the polymer of the invention only, or may comprise other materials in addition to the polymer of the invention. Other materials are not particularly limited, and examples thereof include fillers and matrices.

The mechanoresponsive luminescent material may comprise only one kind of polymer of the invention or may contain two or more kinds of polymers of the invention. Further, the mechanoresponsive luminescent material may comprise polymers other than the invention. The polymer of the invention may be comprised in the mechanoresponsive luminescent material in an mount of 0.01% by weight or more.

The form of the mechanoresponsive luminescent material is not particularly limited. The mechanoresponsive luminescent material may be formed into various form depending on the application. The mechanoresponsive luminescent material may be in a form of film, coating, fiber, and particles. The film and the coating may have a single-layer structure or a multilayer structure. The fiber may constitute a cloth such as a woven fabric or a non-woven fabric.

The polymer of the invention comprises a polymer chain moiety and a copper complex moiety presented by the formula (1). The copper complex moiety has a pyridinophane ligand, a N-heterocyclic carbene ligand, and two linking groups bridging the pyiridinophane ligand and a polymer chain moiety. The polymer having such a structure exhibits higher emission intensity in a state with mechanical strain than in a state without mechanical strain. This is presumed to be due to the following mechanism.

The pyridinophane ring in the copper complex moiety is fluxional. Therefore, when the Cu complex is excited, the pyridinophane ring moves and becomes flat. As a result, the non-radiative decay rate of Cu complex increases, and the luminous efficiency decreases. On the other hand, when an external force is applied to the polymer to cause strain, movement of the pyridinophane ring is restricted and the flattening of the ring is suppressed. As a result, the non-radiative decay process of the Cu complex is suppressed, and the light emission intensity is increased. Further, when the polymer returns from the strained state to the non-strained state, the pyridinophane ring also returns to the original fluidity, and the luminous efficiency decreases. By such a mechanism, the emission intensity of the Cu complex-containing polymer changes reversibly and sensitively in response to mechanical strain applied to the polymer. So that, by measuring the change in the emission intensity of the polymer, the mechanical strain and stress generated in the polymer can be detected with high sensitivity. Therefore, the polymer of the invention can be effectively used as a mechanically responsive light emitting material for detecting mechanical strain (deformation) and stress.

The mechanoresponsive luminescent material of the invention is reversibly and sensitively increased in light emitting intensity in response to mechanical strain (deformation) and stress generated in the Cu complex-containing polymer. Therefore, the mechanoresponsive luminescent material of the invention is useful as a material for a sensor for detecting mechanical strain and stress. The mechanoresponsive luminescent material is particularly effectively used as a sensor material for detecting mechanical strains and stresses due to compression, tension, tensile stretch, impact, shear, crush, bend, abrasion, torsion, scratching, rubbing, and ultrasound.

In the sensor containing the material of the present invention, for example, by measuring the change in the emission intensity or the emission color of the material, it is capable of detecting mechanical strain (deformation) and stress generated in the material. Here the excitation method for causing the mechanically responsive light emitting material to emit light is not particularly limited, and may be photoexcitation or current excitation.

Copper Complex

The invention also provides a copper complex (Cu complex).

The Cu complex of the invention is represented by the following formula (5). As shown in the examples described later, the Cu complex represented by the general formula (5) exhibits light emission. Thus, the Cu complex is useful as a light emitting material.

Formula (5)

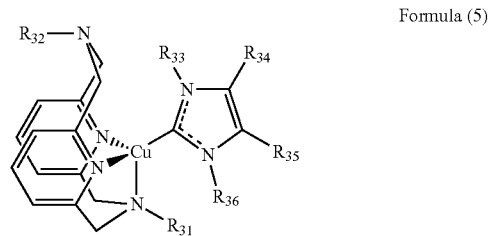

In the formula (5), $R_{31}$ to $R_{36}$ each independently represent a hydrogen atom or a substituent. $R_{31}$ to $R_{36}$ may be the same as or different from each other. In case where $R_{34}$ and $R_{35}$ are both hydrogen atoms, $R_{33}$ and $R_{36}$ are not both methyl groups or both isopropyl groups. $R_{33}$ and $R_{34}$, $R_{34}$ and $R_{35}$, and $R_{35}$ and $R_{36}$ each may be bonded to each other to form a cyclic structure. For $R_{33}$ to $R_{36}$ and the preferable ranges and specific examples thereof, reference may be made to the above description of $R_3$ to $R_6$ in the formula (1), the preferable ranges and specific examples thereof.

In the formula (5), $R_{31}$ and $R_{32}$ are preferably substituents, preferably substituted or unsubstituted alkyl groups. The alkyl group may be linear, branched or cyclic. Of these alkyl groups, a branched alkyl group is preferred. When $R_{31}$ and $R_{32}$ are branched alkyl groups, the steric effect of the branched structure suppresses the isomerization of the pyridinophane ligand and suppresses the increase in the non-radiative decay rate due to the isomerization. As a result, the light emission efficiency of the copper complex is improved. The number of carbon atoms of the alkyl group is preferably from 1 to 20, more preferably from 1 to 10. Specific examples of an alkyl group include a methyl group (Me), an ethyl group, a n-propyl group (n-Pr), an isopropyl group (i-Pr), a n-butyl group, an isobutyl group, a sec-butyl group, a tert-butyl group (t-Bu), a n-pentyl group, an isopentyl group, a neopentyl group, a tert-pentyl group. Among these alkyl groups, the preferred alkyl groups are an isopropyl group, an isobutyl group, a sec-butyl group, a tert-butyl group, a n-pentyl group, an isopentyl group, a neopentyl group and a tert-pentyl group, and the more preferred alkyl groups are a tert-butyl group and a tert-pentyl.

In the formula (5), the pyridine rings constituting the pyridinophane ring may be substituted with a substituent. For specific examples of the substituent, reference may be made to the above specific examples of the substituent for $R_3$ to $R_6$.

Specific examples of the Cu complex represented by the formula (5) are shown below. However, the Cu complex of the invention is not construed as being limited to the specific examples. In the following formula, Me, n-Pr, i-Pr, t-Bu represents a methyl group, a n-propyl group, a isopropyl group, a tert-butyl group, respectively.

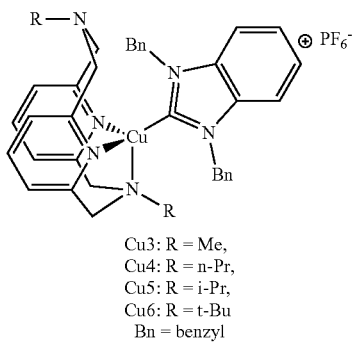

Cu3: R = Me,
Cu4: R = n-Pr,
Cu5: R = i-Pr,
Cu6: R = t-Bu
Bn = benzyl

Method for Preparing the Copper Complex

The Cu complex of the invention can be prepared by any known synthetic method. Preferred method comprises the step of reacting a compound represented by the following formula (6) with a compound represented by the following formula (7) to obtain the copper complex represented by the formula (5). By conducting the reaction in the presence of a counter anion, $X_{31}$ is dissociated as an anion from of the compound represented by the formula (7), and the nitrogen atom of the pyridinophane ring of the compound represented by the formula (7) is coordinated to Cu(I). As a result, the cupper complex represented by the formula (5) is produced. For the copper complex, reference may be made to the description in the above of "copper complex" section. For the reaction condition and specific examples of the counter anion, reference may be made to the below description in "[2] Cu complex formation process".

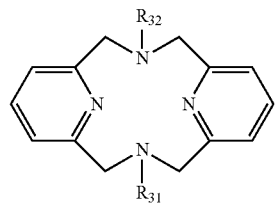

Formula (6)

In the formula (6), $R_{31}$ and $R_{32}$ each independently represent a hydrogen atom or a substituent. $R_{31}$ and $R_{32}$ may be the same as or different each other. For the description of $R_{31}$ and $R_{32}$, and preferable range and specific examples thereof, reference may be made to the description of $R_{31}$ and $R_{32}$ in the formula (5), and the preferable range and specific examples thereof. In the formula (6), the pyridine rings constituting the pyridinophane ring may be substituted with a substituent. For specific examples of the substituent, reference may be made to the above specific examples of the substituent for $R_3$ to $R_6$.

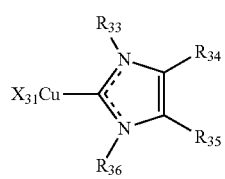

Formula (7)

In the formula (7), $X_{31}$ represents a halogen atom, a triflate group or a pseudohalogen group. For specific examples of pseudohalogens, specific examples of pseudohalogens in $X_1$ of the formula (4) may be referenced.

$R_{33}$ to $R_{36}$ each independently represent a hydrogen atom or a substituent. $R_{33}$ to $R_{36}$ may be the same as or different from each other. In case where $R_{34}$ and $R_{35}$ are both hydrogen atoms, $R_{33}$ and $R_{36}$ are not both methyl groups or both isopropyl groups. $R_{33}$ and $R_{34}$, $R_{34}$ and $R_{35}$, and $R_{35}$ and $R_{36}$ may be bonded to each other to form a cyclic structure. For the description of $R_{33}$ to $R_{36}$, and preferable ranges and specific examples thereof, reference may be made to the above description of $R_{33}$ to $R_{36}$ of formula (5), and the preferable ranges and specific examples thereof.

Method for Preparing the Polymer

The method for preparing the polymer of the invention is not particularly limited. According to the method of the invention, the polymer can be prepared easily. The method of the invention comprises a precursor polymer synthesis process and a Cu complex formation process. Each step will be described hereinafter.

[1] Precursor Polymer Synthesis Process

This process provides a precursor with pyridinophane rings and polymer chains bonded together.

In this process, a polymerizable composition comprising a compound represented by the following formula (3a) and a monomer is reacted to synthesize a precursor polymer. The monomer used in this process is a polymerizable compound other than the compound represented by the formula (3a). The monomer may be a monofunctional monomer or a polyfunctional monomer. By reaction of the polymerizable composition, while the monomers polymerize to form a polymer chain, the $R_{21}$ and $R_{22}$ of the compound represented by the formula (3a) each react with the polymerizable group of the monomer to form a crosslinked structure.

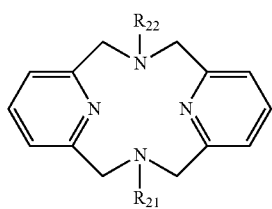

Formula (3a)

In the formula (3), $R_{21}$ and $R_{22}$ each independently represent a polyerizable group. The polymerizable group here has a polymerizable functional group and may have a non-polymerizable moiety. $R_{21}$ and $R_{22}$ may be the same as or different from each other. The polymerizable functional group in $R_{21}$ and $R_{22}$ is capable of copolymerizing with the monomer in the polymerizable composition. When the monomer causes an addition polymerization, the polymerizable functional group in $R_{21}$ and $R_{22}$ is selected from those causing an additional polymerization with the monomer. For example, when the monomer has an ethylenically unsaturated bond such as a vinyl group, $R_{21}$ and $R_{22}$ are preferably selected from the groups having an ethylenically unsaturated bond such as a vinyl group. Specific, examples of the polymerizable functional group include an acryloyl group, a methacryloyl group, and an epoxy group. The polymerizable functional group may be bonded to the bridging nitrogen of the pyridinophane ring with a single bond or may be linked to the bridging nitrogen via a divalent group. In preferable embodiments, $R_{21}$ and $R_{22}$ are selected from acryloyloxyalkyl groups and methacryloyloxyalkyl groups. Preferred examples of $R_{21}$ and $R_{22}$ include acryloyloxymethyl group, acryloyloxyethyl group, acryloyloxypropyl group, methacryloyloxymethyl group, methacryloyloxyethyl group, and methacryloyloxypropyl group.

In the formula (3), the pyridine rings constituting the pyridinophane ring may be substituted with a substituent. For specific examples of the substituent, reference may be made to the above specific examples of the substituent for $R_3$ to $R_6$.

As the monomer for the polymerizable composition, a known monomer may be appropriately selected. The monomer is preferably an alkyl acrylate, an alkyl methacrylate, more preferably an alkyl acrylate having from 4 to 23 carbon atoms, an alkyl methacrylate having from 5 to 24 carbon atoms, particularly preferably, a butyl acrylate, a butyl methacrylate. The polymerizable composition may contain only one kind of monomer or may contain two or more kinds of monomers.

The molar ratio of the monomer to the compound represented by the formula (3a) is preferably from 1 to 10000, more preferably 10 to 1000.

As the reaction conditions of the polymerizable composition, known reaction conditions may be appropriately selected. For details of the reaction, a synthetic example described later may be referenced.

The precursor polymer synthesis process may be also conducted by another manner.

That is reacting a polymer chain having a first functional group and a compound represented by the following formula (3b) to obtain a precursor polymer.

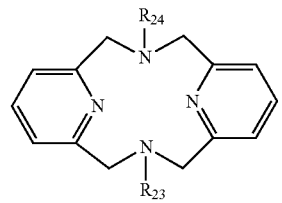

Formula (3b)

In the formula (3b), $R_{23}$ and $R_{24}$ each independently represent a group having a second functional group that reacts with the first functional group to form a bond, and at least one of the pyridine rings may be substituted.

The first functional group and the second functional group may be selected from the combinations that form a chemical bond between the polymer chain and the compound represented by the formula (3b) through the reaction of the first functional group and the second functional group. In preferable embodiments, the first functional group and the second functional group are selected from an epoxy group, an azide group, a thiol group, a hydroxy group, a carbonyl group, a carboxy group, an amino group, a cyanate group, and an isocyanate group. Typical reaction between the first functional group and the second functional group is a condensation reaction. For example, the first functional group and the second functional group may be a combination of a carboxy group and a hydroxy group, a combination of a carbonyl group and an amino group, a combination of a carbonyl group and a hydroxy group, a combination of an epoxy group and a hydroxy group, and vis-versa.

[2] Cu Complex Formation Process

Cu complex formation process is conducted after the recursor polymer synthesis process.

In this process, the precursor polymer is reacted with a compound represented by the following formula (4) to obtain a polymer represented by the formula (1). By reacting the precursor polymer with the compound represented by the formula (4) in the presence of a counter anion, $X_1$ of the compound represented by the formula (4) is dissociated as an anion, and the nitrogen atom of the pyridinophane ring of the precursor polymer is coordinated to Cu(I). As a result, a polymer represented by the formula (1) (Cu complex-containing polymer) is produced. For the description of the Cu complex-containing polymer, reference may be made to the descriptions in the above "Polymer" section.

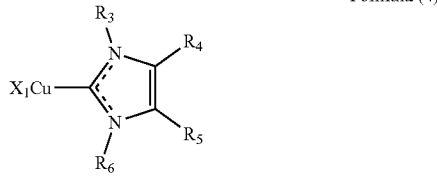

Formula (4)

In the formula (4), $X_1$ represents a halogen atom, a triflate group (a trifluoromethanesulfonate group) or a pseudohalogen group.

$R_3$ to $R_6$ independently represent a hydrogen atom or a substituent. $R_3$ and $R_4$, $R_4$ and $R_5$, and $R_5$ and $R_6$ may be bonded to each other to form a cyclic structure. $R_3$ to $R_6$ may be the same as or different from each other. For the description of $R_3$ to $R_6$, and preferable ranges and specific examples thereof, reference may be made to the above description of $R_3$ to $R_6$ in the formula (1), and the preferable ranges and specific examples thereof.

Specific examples of the counter anion used for the reaction include $PF_6^-$. The reaction temperature and reaction time are not particularly limited.

EXAMPLES

The features of the invention will be described more specifically with reference to synthesis examples and working examples below. The materials, processes, procedures and the like shown below may be appropriately modified unless they deviate from the substance of the invention. Accordingly, the scope of the invention is not construed as being limited to the specific examples shown below.

In the current work we report new, photoluminescent (NHC)Cu$^I$ complexes covalently incorporated into polybutylacrylate as a crosslinker. As a result, cross-linked polybutylacrylate (cPBA) samples Cu1-cPBA and Cu2-cPBA (Cu complex-containing polymer) demonstrate a highly sensitive response to mechanical stress even at small strain (<50%) and stress (<0.1 MPa) values. Such sensitivity is unprecedented when compared to many currently known stress-responsive polymers containing organic-based mechanophores. This system enables direct visualization of mechanical stress via imaging methods. In addition, we achieved good airstability as the samples showed only minor degradation after several days under air.

We propose that the emission intensity increases in response to mechanical force, due to restricting the mobility of the cross-linker which contains the fluxional, Cu-based mechanophore. Thus, these systems represent a new type of mechanophore in which the mechanism of response is not caused by the cleavage, or the formation of a covalent bond, letting us achieve a fast and reversible response.[6] Our mechanistic proposal is supported by the study of model compounds Cu3-6 (Cu complex), which display good correlation between complex fluxionality and their non-radiative decay rate, as well as their PLQY (Photoluminescence quantum yield).

Before attempting to make cross-linkers and incorporating them into a polymer, we optimized the synthesis of model complexes Cu3-6 containing the $^R$N4 ligand (N,N'-dialkyl-2,11-diaza[3,3](2,6)pyridinophane ligand) with its steric hindrance modified by the R substituent (R=Me, n-Pr, i-Pr, t-Bu). The complexes were synthesized by reacting the corresponding macrocyclic ligands $^R$N4 with ($^{Bn}$NHC)CuCl (1,3-dibenzylbenzimidazoyl-2-ylidene)copper(I) chloride, followed by the counterion exchange with KPF6. These complexes were isolated and characterized by NMR, IR, UV-vis spectroscopies, single-crystal X-ray diffraction (FIG. 4I, ESI: Electronic supplementary information), and elemental analysis.[8] Their dynamic behavior in solution was studied in detail by NMR (vide infra)[8] and was found to be similar to previously described ($^R$N4)Cu$^I$I complexes.[9] Photophysical properties of Cu3-6 are summarized in Table 1.

TABLE 1

Photophysical properties of [($^R$N4)Cu($^{Bn}$NHC)]PF$_6$ in CH$_2$Cl$_2$ at 298K[a]

| Complex | R | $\lambda_{max}^b$ [nm] | PLQY | $\tau^c$ [μs] | $k_r^d$ 10$^{-4}$ [s$^{-1}$] | $k_{nr}^e$ 10$^{-4}$ [s$^{-1}$] |
|---|---|---|---|---|---|---|
| Cu3 | Me | 567 | 0.06 | 8.20 | 0.732 | 11.5 |
| Cu4 | $^n$Pr | 561 | 0.19 | 7.59 | 2.50 | 10.7 |
| Cu5 | $^i$Pr | 551 | 0.30 | 9.98 | 3.00 | 7.01 |
| Cu6 | $^t$Bu | 549 | 0.72 | 18.0 | 4.00 | 1.56 |

[a]Excitation at 380 nm.
[b]Emission maximum.
[c]Emission lifetime.
[d]Radiative decay rate constant.
[e]Non-radiative decay rate constant.

We then set out to prepare cross-linked polybutylacrylate (cPBA) samples using the bis(acrylate) functionalized pyridinophane ligand as a cross-linker. PBA was selected for this study due to its widespread use in industry, its suitable mechanical properties such as elasticity, and the possibility to further tune a wide range of properties by a rich choice of monomers. Cross-linked sample Cu1-cPBA was prepared by photo-initiated radical polymerization using butyl acrylate and bis(acrylate)-functionalized ligand L1 (1 mol %), followed by incorporation of ($^{Bn}$NHC)Cu$^I$ by dipping the film into a solution of ($^{Bn}$NHC)CuCl precursor (Scheme S5, ESI). Cu2-cPBA was prepared by the analogous procedure using acrylate-functionalized ligand L2 (Scheme S6, ESI).[8] PLQYs of Cu1-cPBA and Cu2-cPBA were determined to be 0.075 and 0.27, respectively.

The mechanical properties of Cu1-cPBA and Cu2-cPBA were investigated using a tensile testing machine under an argon atmosphere. The representative stress-strain (S-S) curves are given in FIG. 2 (ESI) showing good sample elongation (323% for Cu1-cPBA, 476% for Cu2-cPBA).

Figure 3A:
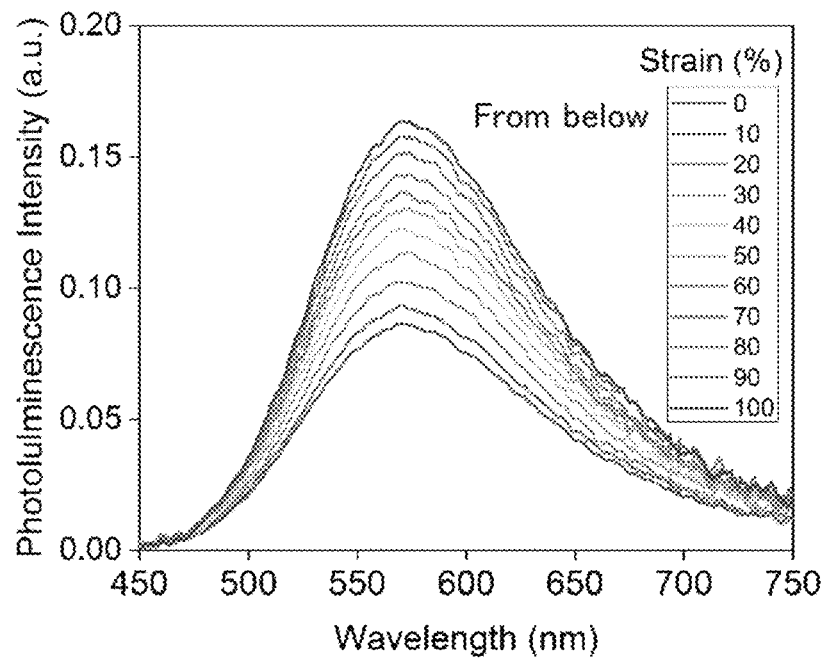
FIG. 3A is an emission spectrum of Cu1-cPBA during stretching.
Figure 3B:
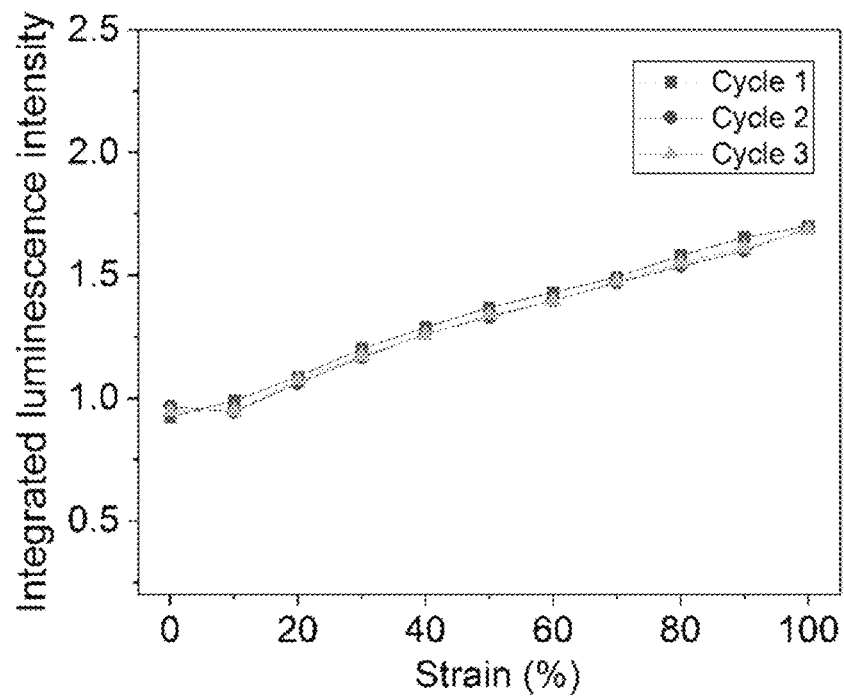
FIG. 3B is a plot of integrated photoluminescence intensity vs. strain of Cu1-cPBA.

To investigate the mechanoresponsive properties of the new cross-linked Cu1-cPBA film, it was stretched uniaxially and at the same time the luminescence spectrum during stretching was measured by monitoring the film's central area. As the Cu1-cPBA film was being stretched, its luminescence intensity increased (FIG. 3A). The plot of integrated luminescence intensity vs. tensile strain (FIG. 3B) shows that luminescence intensity gradually increased even when the strain was less than 50% and the tensile stress was less than 0.1 MPa. Such sensitivity is much higher than that found in the majority of previously reported organic mechanophore systems, which typically require stress of several MPa to reliably observe a response.[2-6]

Figure 4:
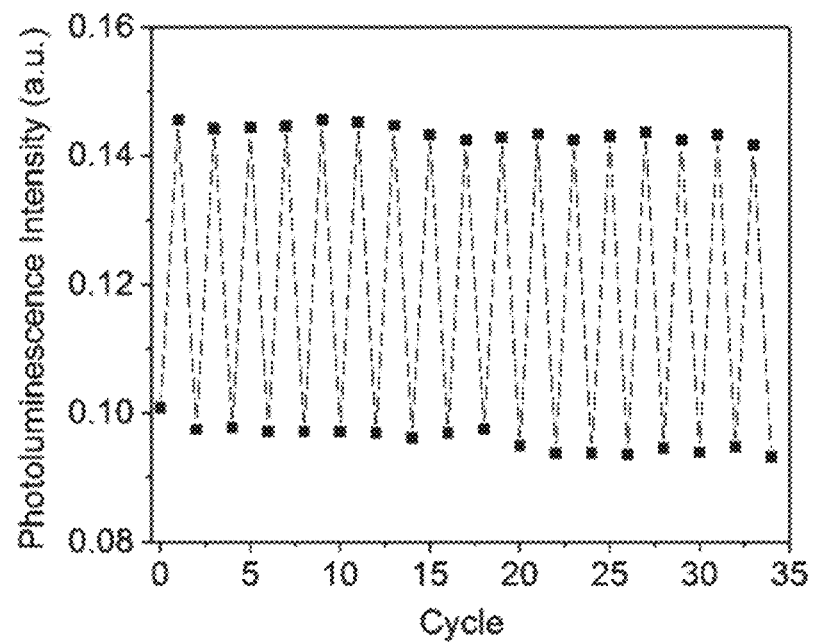
FIG. 4 is a graph showing photoluminescence intensity of Cu1-cPBA during repeated stretching.

The film was stretched and released three times from 0 to 100% of strain, showing only a slight photoluminescence (PL) intensity decrease when compared to the original value measured during the first cycle. The luminescence enhancement was observed in a reproducible and reversible manner over more than 30 cycles of applied stress (FIG. 4).

Furthermore, an additional intensity enhancement in response to tensile elongation was also observed up to the film's breaking point (FIG. 5, ESI).[8] Up to a 200% strain value, the maximum wavelength and the shape of the emission spectrum remains unchanged, indicating that no significant structural changes occur upon stretching. A similar mechanoresponse which showed a measurable emission intensity increase at low strain and stress values was also observed for Cu2-cPBA (FIG. 6A and FIG. 6B, ESI).[8]

Figure 7:
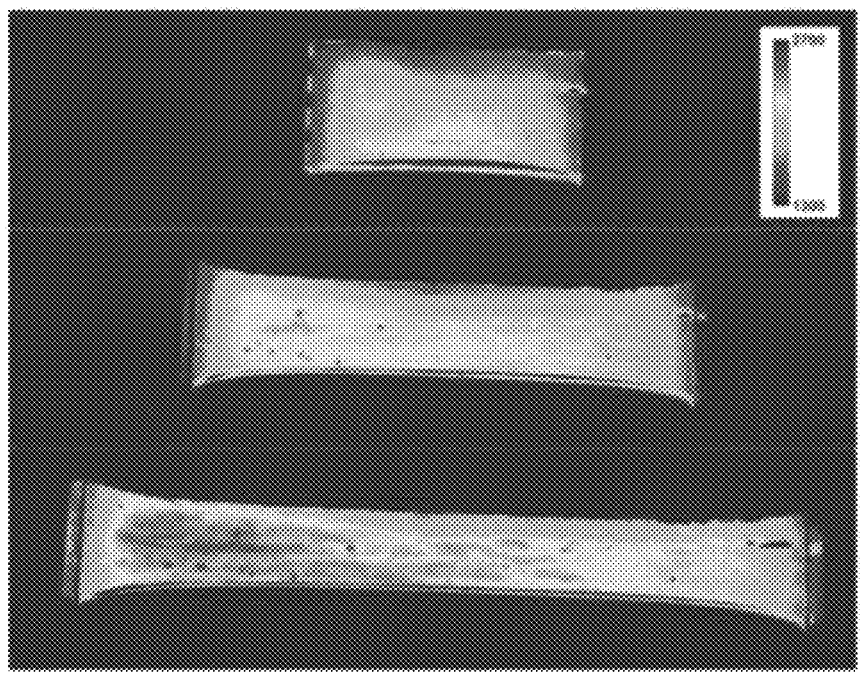
FIG. 7 is an analysis image of Cu1-cPBA during stretching at 0% (top), 100% (middle), 200% (bottom).
Figure 8:
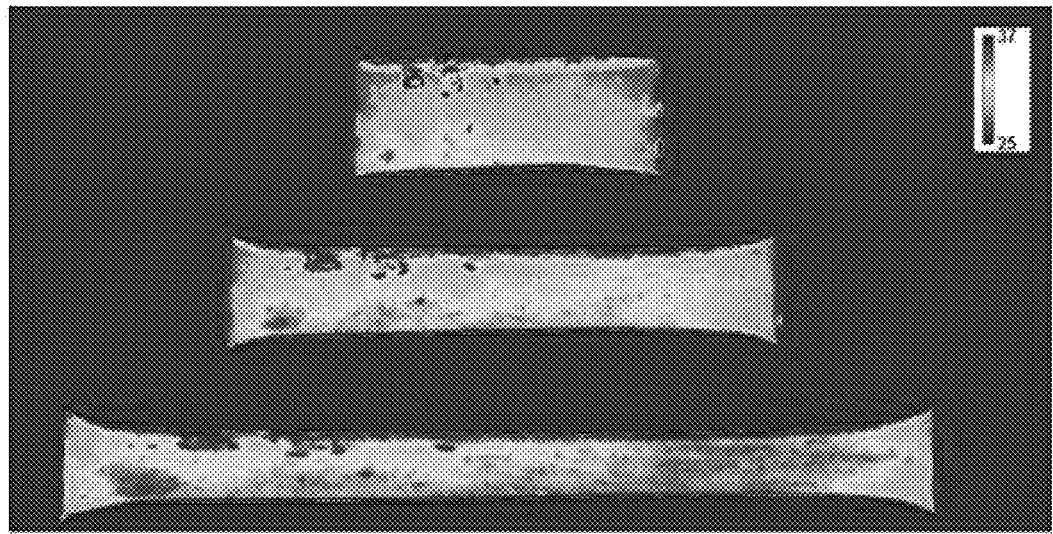
FIG. 8 is an analysis image of Cu2-cPBA at 0%, 100%, and 200% strain.

A sensitive response and good PLQY suggest that it should be possible to directly visualize applied mechanical stress via optical imaging. Accordingly, we monitored the luminescence intensity change in the Cu1-cPBA and Cu2-cPBA samples by a CCD camera during repeated cycles of stretching and release under UV-light irradiation in the 0-200% elongation range. To our delight, luminescence intensity smoothly and steadily increased in response sample stretching (FIG. 7 and FIG. 8, ESI). This response was quick and reversible, and upon releasing the sample to its original length, PL intensity decreased accordingly. A movie showing realtime changes in the emission brightness in response to stress is supplied in the ESI.

Figure 9:
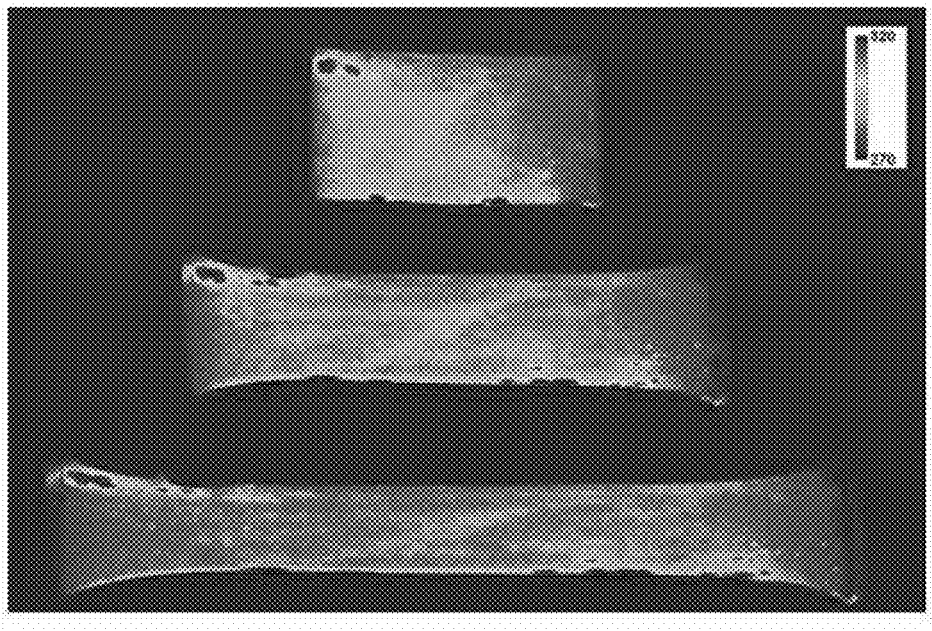
FIG. 9 is an analysis Image of control experiment of a reference hexamethylene diacrylate-crosslinked PBA containing 1 wt % of Cu4 at 0%, 100%, and 200% strain.
Figure 10:
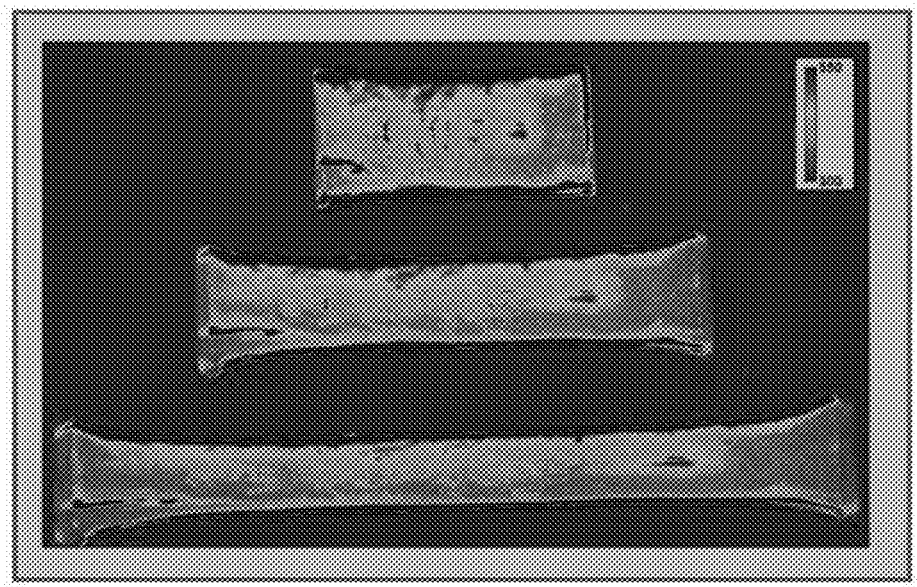
FIG. 10 is an analysis image of the control experiment of a reference hexamethylene diacrylate-crosslinked PBA containing 1 wt % of Cu6 at 0%, 100%, and 200% of strain.

We performed a control experiment to investigate whether the emission intensity changes are caused by mechanical force that is directly transmitted to the cross-linker, or if it's influenced by a constrained environment. A reference sample of cross-linked cPBA was prepared using hexamethylene diacrylate as a cross-linker mechanically mixed with 1 wt % of model compounds Cu4 and Cu6. The control samples with the complexes mechanically incorporated into hexamethylene diacrylate-cross linked polybutylacrylate showed insignificant changes in spectroscopically detected emission intensity in response to tensile stress. The imaging analysis also confirmed that there are no noticeable emission intensity changes in response to stretching in the control samples with mechanically incorporated complexes Cu4 and Cu6 (FIG. 9 and FIG. 10). Thus, covalent incorporation of the mechanophore as a cross-linker is required to clearly observe sensitive mechanoresponsive behavior.[4e] To investigate their air-stability, films of Cu1-cPBA and Cu2-cPBA were exposed to air for several days and the PLQYs were recorded (see FIG. 11A and FIG. 11B, ESI).[8] Both polymers showed good air-stability with only slight decrease of PLQY (3-4%) after 4 days under air, presumably due to oxidation to trace $Cu^{II}$ with oxygen. Thus, while not ideal, the strategy of introducing a carbene moiety makes the copper mechanophores suitable for practical applications. To shed light on the mechanoresponse mechanism, we analyzed the dynamic behavior and photophysical properties of model complexes Cu3-6. All these complexes show isomerization in solution that involves conformational fluxionality of the macrocyclic ligand $^{R}N4$ (Scheme 1). Variable temperature (VT) NMR studies in $CD_2Cl_2$ solution show that as the steric hindrance of the $^{R}N4$ ligand increases, fluxionality of the complexes decreases leading to slower isomerization. Interestingly, PLQY in $CH_2Cl_2$ solution increases from Cu3 to Cu6, correlating with the increase of steric hindrance and an inversely proportional decrease in fluxionality, accompanied by a blue shift of the emission peak (Table 1). Notably, this trend shows very good correlation with the gradual decrease of the non-radiative decay rate constant $k_{nr}$ from Cu3 to Cu6, showing that suppression of non-radiative decay is likely the main reason for PLQY's increase.

Based on these observations and by analogy with other photo-luminescent $Cu^I$ complexes reported in the literature, we propose that the increase of PLQY in more rigid model systems is due to the suppression of Jahn-Teller distortions in the excited state in the presence of sterically hindered ligands. A similar effect was reported for substituted phenanthroline $Cu^I$ complexes, where ligand sterics were varied.[10] By analogy, we propose that applied mechanical force restricts cross-linker mobility, making it responsible for the observed increase of emission intensity upon elongation.

Additionally, formation of an exciplex by coordination of a pendant N-donor of the $^{R}N4$ ligand to form a five-coordinate species could be another mechanism for photoluminescence quenching.[10a,11] Indeed, NMR studies show that only the $\kappa^3$-isomer is present in solutions of bulky complexes Cu5 and Cu6, while both $\kappa^4$- and $\kappa^3$-isomers were observed to be present in equilibrium for Cu3 and Cu4 (Scheme 1). Less favorable pendant amine arm binding in bulkier complexes is also consistent with cyclic voltammetry studies.[8]

Scheme 1 Fluxional behavior of $[(^{R}N4)Cu(NHC)]^+$ complexes.

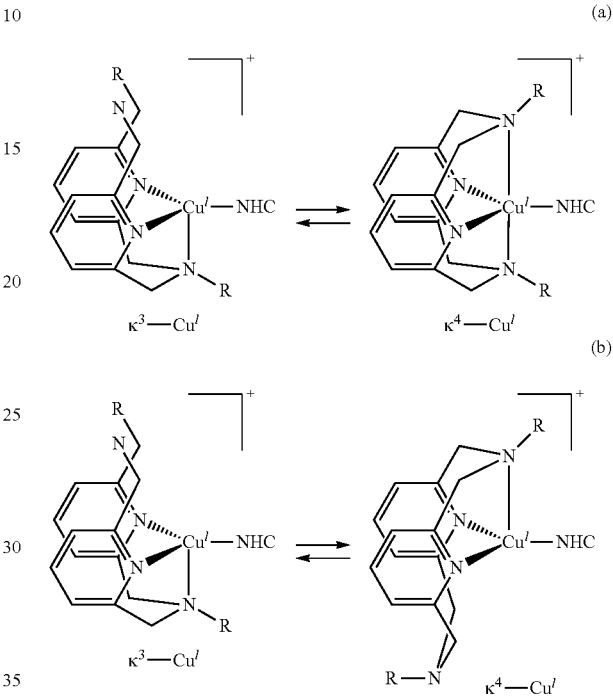

Notably, the rate of isomerization of complex Cu6 in solution was found to be ca. 16 s$^{-1}$ and it is expected to be even slower in a polymer matrix, making it several orders of magnitude slower than non-radiative and radiative decay processes (Table 1).[8] Based on this, we attribute the observed luminescence response to changes in the dynamics of the excited state, rather than to isomerization suppression that was proposed for an analogous system.[12]

In summary, we report a highly sensitive mechanophore based on the $(^{R}N4)Cu(NHC)^+$ complex, which was incorporated as a cross-linker in polybutylacrylate. This system shows a highly sensitive response to mechanical force, allowing for the detection of mechanical stress changes even at small strain and stress values, and it enables the direct visualization of mechanical stress. The covalent incorporation of the Cu-based mechanophore as a cross-linker is necessary to observe of a mechanoresponse. Such high sensitivity is superior to many currently reported system based on classical mechanophores such as spiropyrans, diaryldibenzofura-none and others.[2-5] The mechanism of mechanoresponse is different from commonly used organic-based mechanophores as it does not involve covalent bond cleavage/formation, but is based on restricting the mobility of the fluxional Cu complex and thus suppressing non-radiative decay as confirmed by our studies of the model systems. Considering the high sensitivity and good air stability of these systems, they may find use in real-time visualization and in situ sensing of mechanical stress via coating or incorporation into common construction materials in aerospace or civil engineering. Generally, the conformationally flexible macrocyclic ligands resemble allosteric enzyme mimic systems[13] showing stimuli-responsive structural changes, and we plan to further utilize these ligands to study mechanocontrolled reactivity and properties of coordination compounds.

REFERENCES 1 (a) J. Li, C. Nagamani and J. S. Moore, *Acc. Chem. Res.*, 2015, 48, 2181-2190; (b) C. Calvino, L. Neumann, C. Weder and S. Schrettl, *J. Polym. Sci., Part A: Polym. Chem.*, 2017, 55, 640-652.

2 (a) D. A. Davis, A. Hamilton, J. Yang, L. D. Cremar, D. Van Gough, S. L. Potisek, M. T. Ong, P. V. Braun, T. J. Martinez, S. R. White, J. S. Moore and N. R. Sottos, *Nature*, 2009, 459, 68-72; (b) C. K. Lee, B. A. Beiermann, M. N. Silberstein, J. Wang, J. S. Moore, N. R. Sottos and P. V. Braun, *Macromolecules*, 2013, 46, 3746-3752; (c) Y. Lin, M. H. Barbee, C. C. Chang and S. L. Craig, *J. Am. Chem. Soc.*, 2018, 140, 15969-15975.

3 (a) Y. Chen and R. P. Sijbesma, *Macromolecules*, 2014, 47, 3797-3805; (b) Y. Chen, A. J. Spiering, S. Karthikeyan, G. W. Peters, E. W. Meijer and R. P. Sijbesma, *Nat. Chem.*, 2012, 4, 559-562; (c) J. M. Clough, A. Balan, T. L. van Daal and R. P. Sijbesma, *Angew. Chem., Int. Ed.*, 2016, 55, 1445-1449; (d) E. Ducrot, Y. Chen, M. Bulters, R. P. Sijbesma and C. Creton, *Science*, 2014, 344, 186-189.

4 (a) K. Imato, A. Irie, T. Kosuge, T. Ohishi, M. Nishihara, A. Takahara and H. Otsuka, *Angew. Chem., Int. Ed.*, 2015, 54, 6168-6172; (b) K. Imato, T. Kanehara, S. Nojima, T. Ohishi, Y. Higaki, A. Takahara and H. Otsuka, *Chem. Commun.*, 2016, 52, 10482-10485; (c) K. Imato, T. Kanehara, T. Ohishi, M. Nishihara, H. Yajima, M. Ito, A. Takahara and H. Otsuka, *ACS Macro Lett.*, 2015, 4, 1307-1311; (d) T. Kosuge, X. Zhu, V. M. Lau, D. Aoki, T. J. Martinez, J. S. Moore and H. Otsuka, *J. Am. Chem. Soc.*, 2019, 141, 1898-1902; (e) H. Oka, K. Imato, T. Sato, T. Ohishi, R. Goseki and H. Otsuka, *ACS Macro Lett.*, 2016, 5, 1124-1127.

5 (a) R. Go¨stl and R. P. Sijbesma, *Chem. Sci.*, 2016, 7, 370-375; (b) M. J. Robb, T. A. Kim, A. J. Halmes, S. R. White, N. R. Sottos and J. S. Moore, *J. Am. Chem. Soc.*, 2016, 138, 12328-12331; (c) T. Wang, N. Zhang, J. Dai, Z. Li, W. Bai and R. Bai, *ACS Appl. Mater. Interfaces*, 2017, 9, 11874-11881.

6 (a) H. Yabu, Y. Saito, S. Saito, S. Yamagichi and S. Nobusue, US Pat. 20190031820A1, 2019; (b) Y. Sagara, M. Karman, E. Verde-Sesto, K. Matsuo, Y. Kim, N. Tamaoki and C. Weder, *J. Am. Chem. Soc.*, 2018, 140, 1584-1587.

7 G. A. Filonenko and J. R. Khusnutdinova, *Adv. Mater.*, 2017, 29, 1700563.

8 See ESI† for details.

9 P. H. Patil, G. A. Filonenko, S. Lapointe, R. R. Fayzullin and J. R. Khusnutdinova, *Inorg. Chem.*, 2018, 57, 10009-10027.

10 (a) D. R. McMillin, J. R. Kirchhoff and K. V. Goodwin, *Coord. Chem. Rev.*, 1985, 64, 83-92; (b) C. T. Cunningham, K. L. H. Cunningham, J. F. Michalec and D. R. McMillin, *Inorg. Chem.*, 1999, 38, 4388-4392; (c) D. Felder, J.-F. Nierengarten, F. Barigelletti, B. Ventura and N. Armaroli, *J. Am. Chem. Soc.*, 2001, 123, 6291-6299; (d) A. Lavie-Cambot, M. Cantuel, Y. Leydet, G. Jonusauskas, D. M. Bassani and N. D. McClenaghan, *Coord. Chem. Rev.*, 2008, 252, 2572-2584; (e) O. Green, B. A. Gandhi and J. N. Burstyn, *Inorg. Chem.*, 2009, 48, 5704-5714; (f) M. W. Mara, K. A. Fransted and L. X. Chen, *Coord. Chem. Rev.*, 2015, 282-283, 2-18.

11 (a) E. M. Stacy and D. R. McMillin, *Inorg. Chem.*, 1990, 29, 393-396; (b) L. X. Chen, G. B. Shaw, I. Novozhilova, T. Liu, G. Jennings, K. Attenkofer, G. J. Meyer and P. Coppens, *J. Am. Chem. Soc.*, 2003, 125, 7022-7034.

12 (a) G. A. Filonenko, J. A. M. Lugger, C. Liu, E. P. A. van Heeswijk, M. Hendrix, M. Weber, C. Muller, E. J. M. Hensen, R. P. Sijbesma and E. A. Pidko, *Angew. Chem., Int. Ed.*, 2018, 57, 16385-16390; (b) G. A. Filonenko, D. Sun, M. Weber, C. Muller and E. A. Pidko, *J. Am. Chem. Soc.*, 2019, 141, 9687-9692.

13 (a) H. J. Yoon and C. A. Mirkin, *J. Am. Chem. Soc.*, 2008, 130, 11590-11591; (b) H. J. Yoon, J. Kuwabara, J.-H. Kim and C. A. Mirkin, *Science*, 2010, 330, 66-69; (c) H. J. Yoon, J. Heo and C. A. Mirkin, *J. Am. Chem. Soc.*, 2007, 129, 14182-14183; (d) M. Raynal, P. Ballester, A. Vidal-Ferran and P. W. N. M. van Leeuwen, *Chem. Soc. Rev.*, 2014, 43, 1734-1787; (e) J. Kuwabara, H. J. Yoon, C. A. Mirkin, A. G. Di Pasquale and A. L. Rheingold, *Chem. Commun.*, 2009, 4557-4559.

I. GENERAL SPECIFICATIONS

Materials

All manipulations unless stated otherwise were performed using Schlenk or glovebox techniques under a dry argon atmosphere. Sodium hydride was washed with hexane, dried under vacuum, and stored in a glove box. Pyridine-2,6-dialdehyde,[1] 3-aminopropyl (tert-butyl)dimethylsilyl ether,[2] N,N'-dimethyl-2,11-diaza[3,3](2,6)pyridinophane,[3] N,N'-di-iso-propyl-2,11-diaza[3,3] (2,6)pyridinophane[3], N,N'-di-tert-butyl-2,11-diaza[3,3](2,6)pyridinophane,[4] (1,3-dibenzylbenzimidazoyl-2-ylidene)copper(I) chloride[5] were synthesized by the previously reported procedures.

NMR Spectroscopy

NMR spectra were measured on JEOL ECZ600R or JEOL ECZ400S NMR spectrometers.

Luminescent Properties

Luminescence spectra and luminescence quantum yields were recorded by Hamamatsu Quantaurus-QY Plus (excitation wavelength is 380 nm). For PLQY measurements, a solid sample placed on a quartz dish was purged with nitrogen gas for 30 min and measured in nitrogen gas flow. Luminescence lifetime was measured with second harmonics of a Spectra-Physics Mai Tai pulsed laser and a Hamamatsu Photonics Streak scope camera (excitation wavelength is 380 nm). Fitting curves of emission decay were obtained as biexponential fits and emission lifetimes were obtained as intensity-weighted average estimated by $(A_1\tau_1^2 + A_2\tau_2^2)/(A_1\tau_1 + A_1\tau_1)$. Integrated luminescence intensities were obtained by dividing the integrated luminescence spectrum in 450 to 760 nm range with the area of reflection of excitation.

Mechanical Properties

All tensile tests were performed inside a glove box. Films with 25 mm [L]×10 mm [W]×0.6 mm [T] were used. Strain-Stress curves were recorded with a compact uniaxial tensile testing machine manufactured by Acroedge Co with speed of 1 mm per second. Stress and strain at break were estimated as an average of measurements of 3 samples±deviation. Strain was defined as $100 \times (L-L_0)/L_0$ ($L_0$ is initial length) and stress (MPa) was calculated as dividing load (N) with cross-section area of the film ($m^2$)

Thermal Properties

Differential scanning calorimetry (DSC) was performed using a Perkin Elmer DSC 8500 with heating rate of 10° C./min under nitrogen gas flow at 20 mL/min.

Luminescence Spectra During Stretching

Luminescence spectra of the films during stretching were obtained by monitoring emission of the central area of the film using a Reflection/Backscattering Probe R600-7 manufactured by Ocean optics Co. during stretching from both edge sides of the film using a compact uniaxial tensile testing machine.

Luminescence Imaging and Luminescence Time Profile of Film During Stretching

The photographs and movies of luminescence imaging were taken by a CCD camera manufactured by Thorlabs attached with a UV cut filter. The taken photographs and movies were analyzed by free software Image J.

Cyclic Voltammetry

Cyclic voltammetry was performed inside glovebox, using ALS/CHI electrochemical analyzers 660E. 0.1 M solution of $^nBu_4NPF_6$ as a supporting electrolyte in $CH_2Cl_2$ was used. Pt disk electrode (d=1.6 mm) as the working electrode, a platinum wire as the auxiliary electrode, and non-aqueous silver wire reference electrode assembly filled with a 0.01 M $AgNO_3$/0.1 M $^nBu_4NClO_4$/MeCN solution were used. All potentials were referenced against ferrocene ($Fc/Fc^+$).

II. SYNTHESIS OF LIGANDS, METAL COMPLEXES AND POLYMERS

Scheme S1. Synthesis of compound 3.

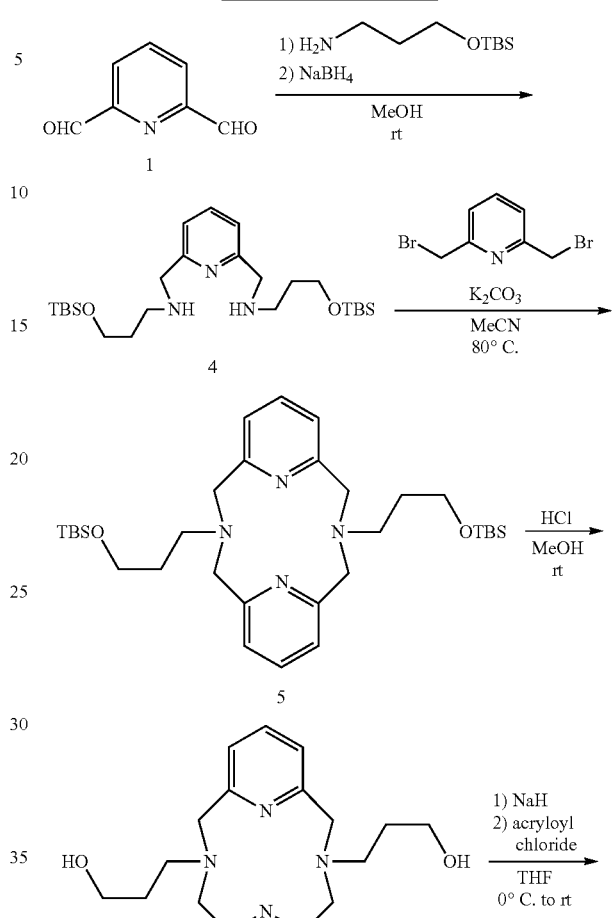

Scheme S2. Synthesis of L1.

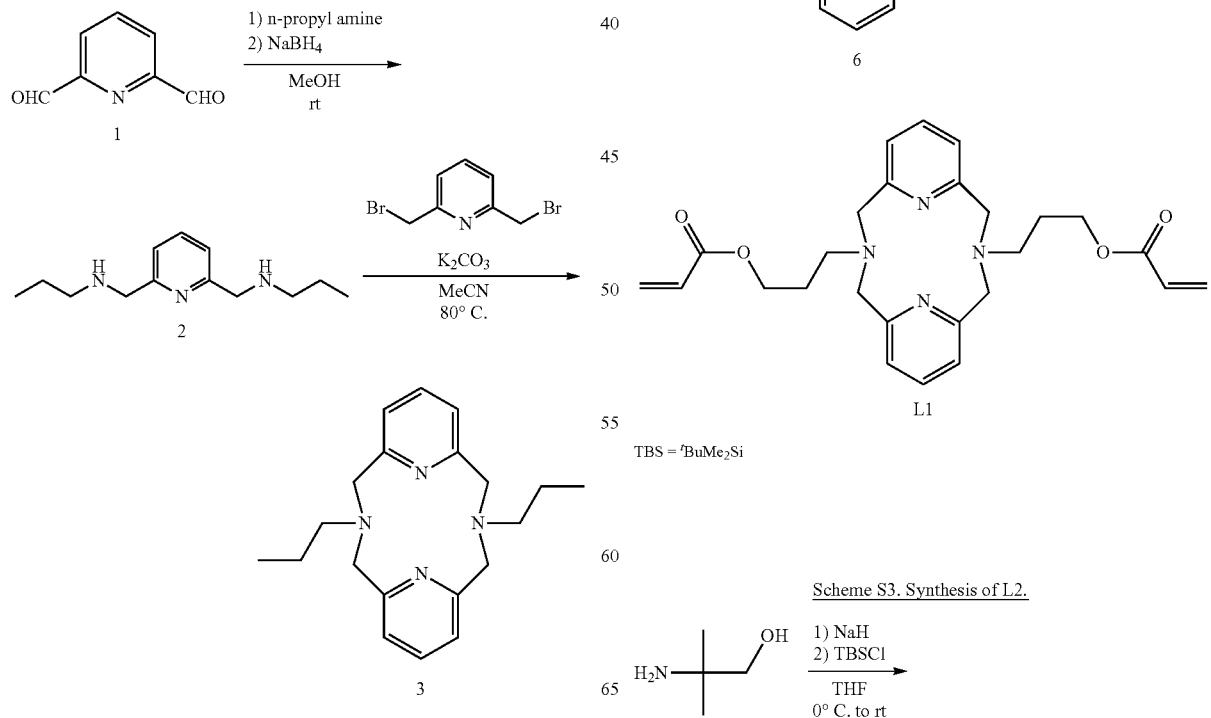

TBS = $^tBuMe_2Si$

Scheme S3. Synthesis of L2.

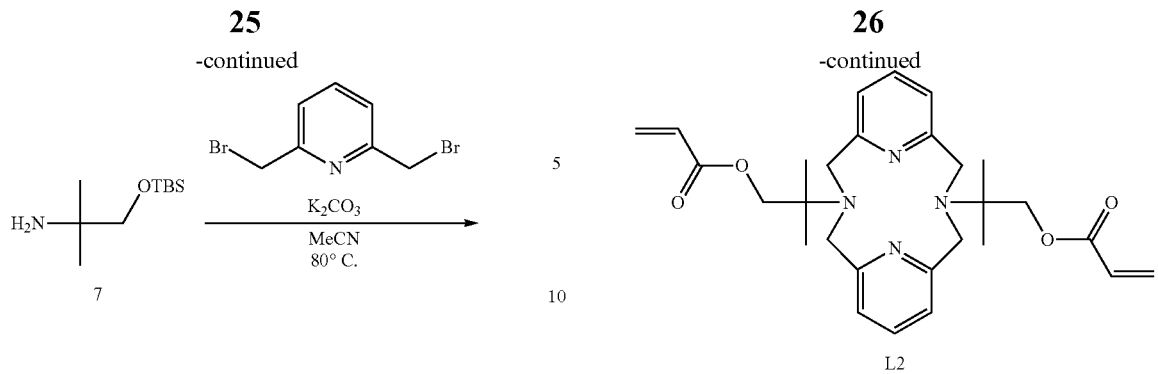
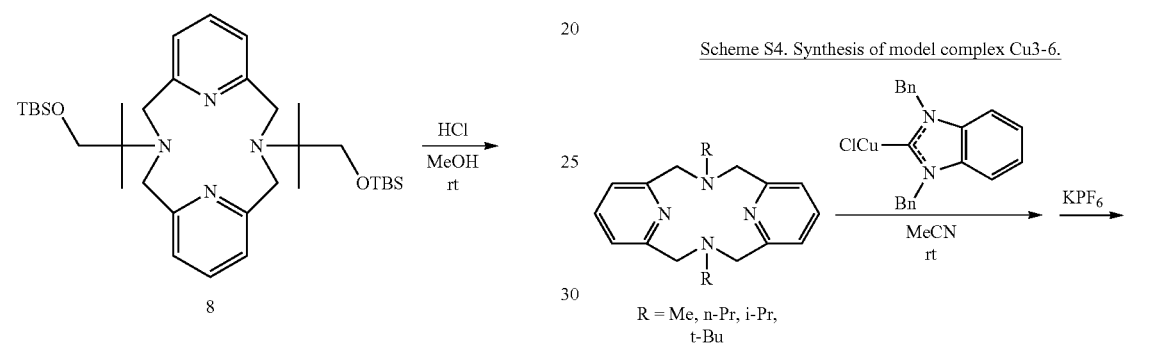
Scheme S4. Synthesis of model complex Cu3-6.
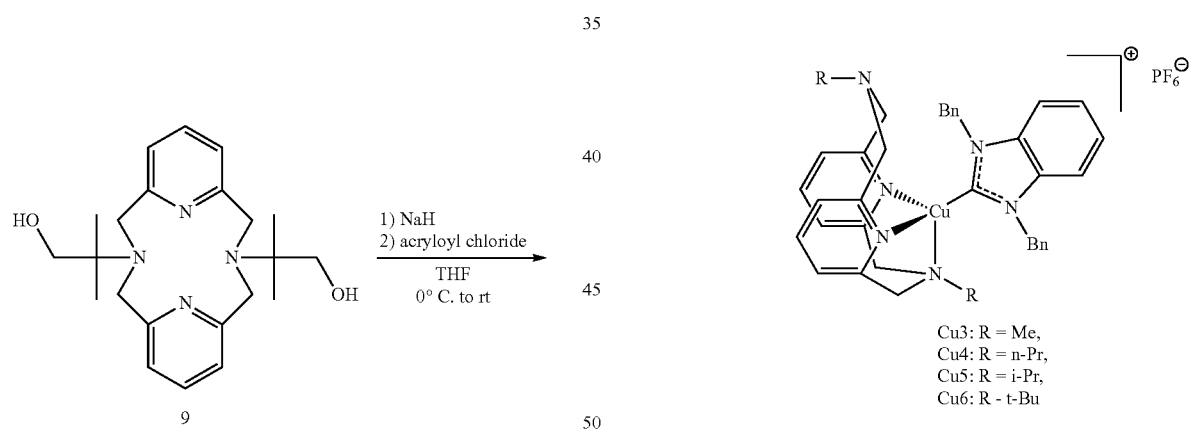
Scheme S5. Synthesis of Cu1-cPBA.
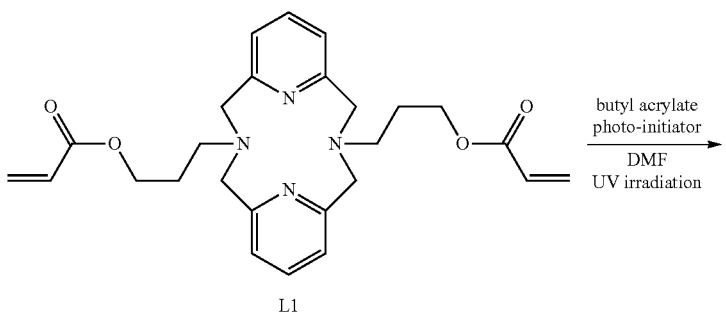

-continued
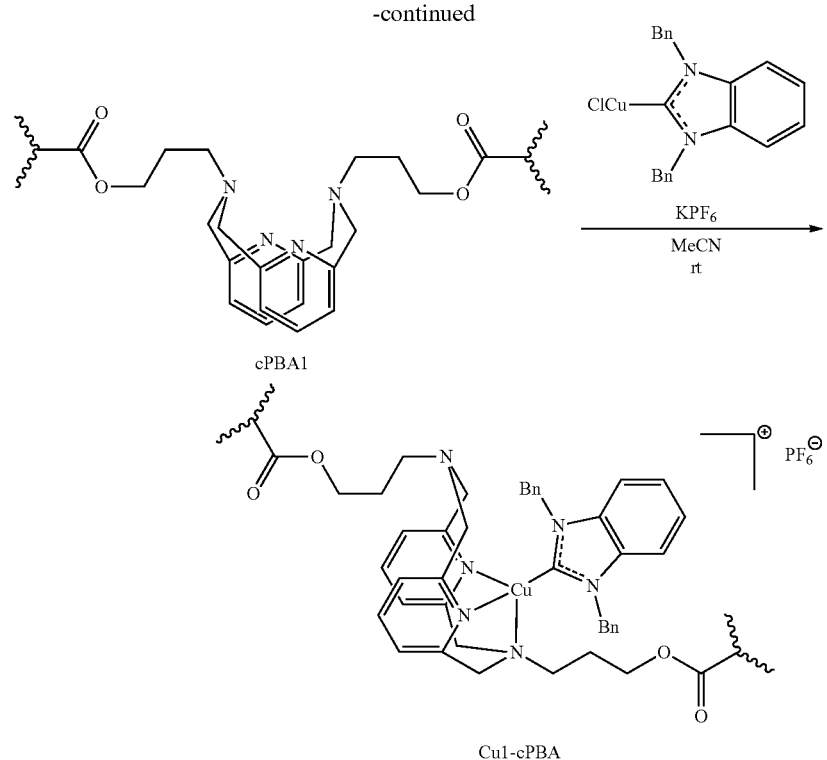
cPBA1 → Cu1-cPBA
Scheme S6. Synthesis of Cu2-cPBA.
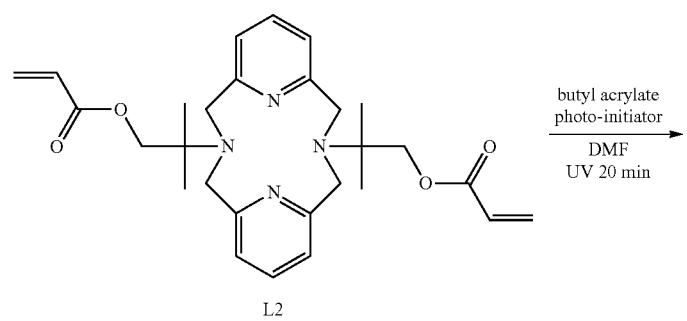
L2
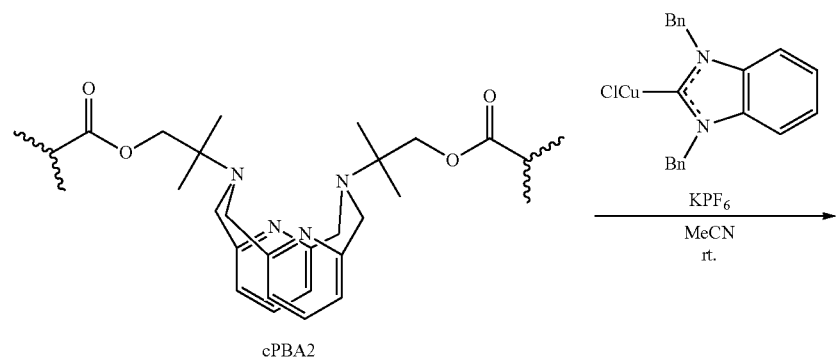
cPBA2

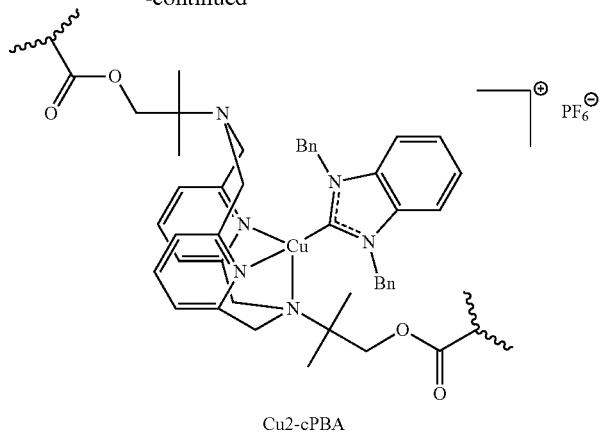

Cu2-cPBA

2,6-Bis(n-propylaminomethyl)pyridine (2)

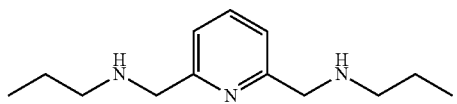 [SMILES: CCCNCc1cccc(CNCCC)n1]

2,6-Bis(n-propylaminomethyl)pyridine (2) was prepared according to the previously reported procedure[6]. A mixture of pyridine-2,6-dialdehyde 1 (500 mg, 3.70 mmol), propylamine (438 mg, 7.41 mmol), 3 Å molecular sieves (0.50 g) in dry MeOH (5.0 mL) was stirred at room temperature under an argon atmosphere for 3 h. Sodium borohydride (310 mg, 8.19 mmol) was added slowly over 5 min at 0° C. under argon gas flow. After stirring at room temperature for 3 h, the mixture was filtered through Celite and concentrated under reduced pressure. The saturated aqueous solution of NH4Cl (1 mL) was added, and the mixture was stirred for 10 min. After addition of a saturated aqueous solution of potassium carbonate (3 mL), the aqueous layer was extracted with diethyl ether (20 mL×3). The combined organic layers were washed with water (10 mL×2), dried over magnesium sulfate, filtered, and concentrated under reduced pressure to give a colorless oil, 810 mg, yield 99%. The product was used for the next reaction without further purification.

$^{1}$H NMR (400 MHz, 23° C., CDCl$_3$): δ 7.58 (t, $^{3}J_{HH}$=7.8 Hz, p-H$_{Py}$, 1H), 7.14 (d, $^{3}J_{HH}$=7.8 Hz, m-H$_{Py}$, 2H), 3.88 (s, Py-CH$_2$—N, 4H), 2.63 (t, J=7.3 Hz, N—CH$_2$—C, 4H), 2.02 (s, NH, 2H), 1.56 (sext, $^{3}J_{HH}$=7.3 Hz, C—CH$_2$—C, 4H), 0.92 (t, $^{3}J_{HH}$=7.3 Hz, C—CH$_3$, 6H).

$^{13}$C NMR (100 MHz, 23° C., CDCl$_3$): δ 159.5 (o-C$_{Py}$), 136.9 (p-C$_{Py}$), 120.5 (m-C$_{Py}$), 55.3 (-Py-C—N—), 51.7 (—N—C—C), 23.4 (—C—C—C), 11.9 (C—CH$_3$).

ESI-HRMS m/z calcd for C$_{13}$H24N3 [M+H$^+$]: 222.1965, found: 222.1956.

N,N'-Di-n-propyl-2,11-diaza[3,3](2,6)-pyridinophane (3)

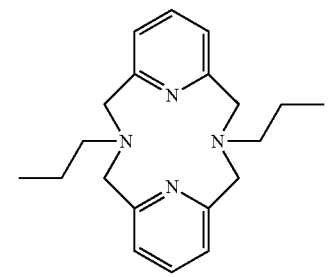 [SMILES: CCCN1Cc2cccc(n2)CN(CCC)Cc2cccc(n2)C1]

A solution of 2,6-bis(bromomethyl)pyridine (978 mg, 3.69 mmol) in MeCN (50 mL) was added dropwise using a dropping funnel to a mixture of compound 2 (810 mg, 3.66 mmol), potassium carbonate (3.06 g, 22.1 mmol), and MeCN (400 mL) with stirring at 80° C. for over 4 h. After stirring at 80° C. for 2 days, the hot mixture was filtered off and concentrated under reduced pressure. The crude mixture was suspended in CH$_2$Cl$_2$ (30 mL) and washed with water (10 mL×3), dried over MgSO$_4$, filtered off, and concentrated under reduced pressure. The mixture was suspended in MeCN (8 mL) by sonication, filtered off to remove insoluble precipitate, and concentrated under reduced pressure. The mixture was suspended in hexane (20 mL) and stirred at room temperature for 30 min, then filtered through Celite to remove insoluble sticky solid. The filtrate was concentrated under reduced pressure to give a white powder. The crude product was purified by basic alumina column chromatography using hexane AcOEt (2:1/v:v) as an eluent. The solid was dissolved in a solution of hexane-diethyl ether (1:1/v:v) (2 mL) and evaporated slowly at room temperature to give a colorless crystalline product, 370 mg, yield 31%.

$^{1}$H NMR (400 MHz, 23° C., CDCl$_3$): δ 7.10 (t, $^{3}J_{HH}$=7.7 Hz, p-H$_{py}$, 2H), 6.76 (d, $^{3}J_{HH}$=7.6 Hz, m-H$_{py}$, 4H), 3.89 (s, Py-CH$_2$—N, 8H), 2.82 (t, $^{3}J_{HH}$=7.4 Hz, —N—CH$_2$—, 4H), 1.72 (sext, $^{3}J_{HH}$=7.4 Hz, C—CH$_2$—CH$_3$, 4H), 1.04 (t, $^{3}J_{HH}$=7.4 Hz, —CH$_2$—CH$_3$, 6H). $^{13}$C NMR (100 MHz, 23° C., CDCl$_3$): δ 158.1 (o-C$_{Py}$), 135.5 (p-C$_{Py}$), 122.6 (m-C$_{Py}$), 64.0 5 (-Py-C—N—), 62.7 (—N—C—C), 20.9 (—C—C—C), 12.1 (C—CH$_3$).

ESI-HRMS m/z calcd for C$_{20}$H$_{29}$N$_4$ [M+H$^+$]: 325.2387, found: 325.2378.

Synthesis of Cu3

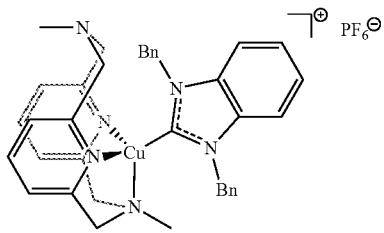

In a glovebox, (1,3-dibenzylbenzimidazoyl-2-ylidene)copper(I) chloride (44.5 mg, 0.112 mmol) was added to a solution of N,N'-dimethyl-2,11-diaza[3,3](2,6)-pyridinophane (30.0 mg, 0.112 mmol) in MeCN (2 mL). After stirring at room temperature for 3 h (consumption of ligand was confirmed by NMR), KPF6 (206 mg, 1.12 mmol) was added to the reaction mixture, and the mixture was stirred at room temperature. After removing solvent under reduced pressure, dichloromethane (2 mL) was added and the reaction mixture was filtered through Celite pad. The filtrate was concentrated under vacuum and purified by crystallization via vapor diffusion with dichloromethane-diethyl ether repeatedly to give yellow crystals. (66.5 mg, 74%) These crystals were used for X-ray crystallography analysis.

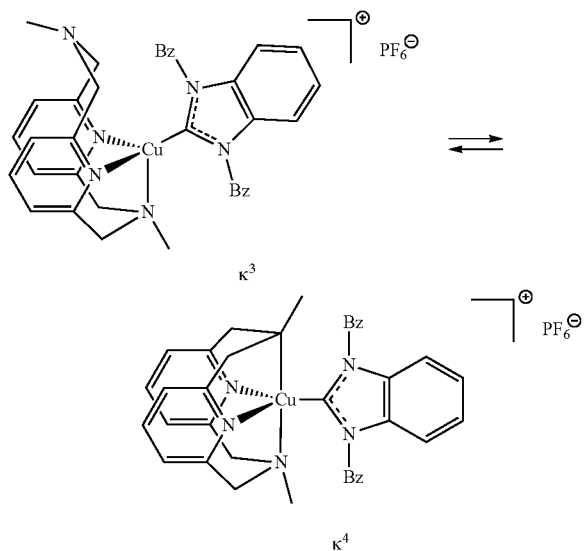

At −30° C., $\kappa^3$ and $\kappa^4$ isomers were present in CD$_2$Cl$_2$ solution in a 40.8:59.2 ratio according to NMR integration.

$\kappa^4$, major isomer. $^1$H NMR (600 MHz, −30° C., CD$_2$Cl$_2$): δ 7.42-7.24 (m, p-H$_{py}$, Ar—H$_{benz}$, 12H), 7.15 (d, $^3J_{HH}$=5.5 Hz, Ar—H$_{benz}$, 4H), 6.68 (d, $^3J_{HH}$=7.8 Hz, m-H$_{py}$, 4H), 5.80 (s, CH$_{2benz}$, 4H), 3.76 (d, $^2J_{HH}$=14.8 Hz, -Py-CH$_2$—N—, 4H), 3.39 (d, $^2J_{HH}$=15.5 Hz, -Py-CH$_2$—N—, 4H), 2.40 (s, —N—CH$_3$, 6H). $^{13}$C NMR (151 MHz, −30° C., CD$_2$Cl$_2$): δ 192.65 (quat, C$_{benz}$), 156.3 (quat, C$_{Py}$), 137.0 (Ar—CH$_{benz}$), 136.96 (Ar—C$_{benz}$), 134.3 (Ar—CH$_{benz}$), 128.8 (Ar—CH$_{benz}$), 128.0 (Ar—C$_{benz}$), 126.7 (Ar—CH$_{benz}$), 123.4 (Ar—CH$_{benz}$), 122.2 (m-C$_{py}$), 111.5 (Ar—CH$_{benz}$), 64.2 (-Py-CH$_2$—N—), 52.0 (CH$_{2benz}$), 48.8 (—N—CH$_3$). $\kappa^3$, minor isomer: $^1$H NMR (600 MHz, −30° C., CD$_2$Cl$_2$): δ 7.42-7.24 (m, p-H$_{py}$, Ar—H$_{benz}$, 12H), 7.06 (d, $^3J_{HH}$=5.1 Hz, Ar—H$_{benz}$, 4H), 6.91 (d, $^3J_{HH}$=7.4 Hz, m-H$_{py}$, 2H), 6.83 (d, $^3J_{HH}$=8.2 Hz, m-H$_{py}$, 2H), 5.73 (s, CH$_{2benz}$, 4H), 4.27 (d, $^2J_{HH}$=13.1 Hz, -Py-CH$_2$—N—, 2H), 3.92 (dd, $^2J_{HH}$=14.4, 13.8 Hz, -Py-CH$_2$—N—, 4H), 3.57 (d, $^2J_{HH}$=15.1 Hz, -Py-CH$_2$—N—, 2H), 2.37 (s, —N—CH$_3$, 3H), 2.32 (s, —N—CH$_3$, 3H). $^{13}$C NMR (151 MHz, −30° C., CD$_2$Cl$_2$): δ 191.34 (quat. C$_{benz}$), 155.0 (quat. C$_{Py}$), 154.9 (quat. C$_{Py}$), 137.4 (Ar—CH$_{benz}$), 136.96 (Ar—C$_{benz}$), 134.4 (Ar—C$_{benz}$), 128.95 (Ar—CH$_{benz}$), 128.03 (Ar—CH$_{benz}$), 126.4 (Ar—CH$_{benz}$), 124.4 (m-C$_{py}$), 123.7 (Ar—CH$_{benz}$), 121.6 (m-C$_{py}$), 111.4 (Ar—CH$_{benz}$), 66.4 (-Py-CH$_2$—N—), 65.2 (-Py-CH$_2$—N—), 51.8 (CH$_{2benz}$), 50.8 (—N—CH$_3$), 42.9 (—N—CH$_3$). Anal. Found (calcd for C$_{37}$H$_{38}$CuF$_6$N$_6$P): C, 57.17, (57.32); H, 4.74, (4.94); N, 11.07, (10.84).

Synthesis of Cu4

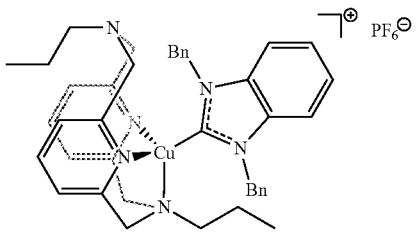

Cu4 was prepared by the same procedure as Cu3 using (1,3-dibenzylbenzimidazoyl-2-ylidene)copper(I) chloride (30.6 mg, 0.0770 mmol), compound 3 (25.0 mg, 0.0770 mmol), MeCN (5 mL), and KPF6 (285 mg, 1.55 mmol) to provide yellow crystal (55.8 mg, 84%). Crystals suitable for X-ray crystallography were obtained by the vapor diffusion method with dichloromethane-diethyl ether.

At −30° C., $\kappa^3$ and $\kappa^4$ isomers were present in CD$_2$Cl$_2$ solution in a 66.7:33.3 ratio according to NMR integration.

$\kappa^3$, major isomer:
$^1$H NMR (600 MHz, −30° C., CD$_2$Cl$_2$): δ 7.44-7.33 (m, p-H$_{py}$, Ar—H$_{benz}$, 6H), 7.29-7.23 (m, Ar—H$_{benz}$, 6H), 7.07-7.04 (m, Ar—H$_{benz}$, 4H), 6.90 (d, $^3J_{HH}$=7.8 Hz, m-H$_{py}$, 2H), 6.81 (d, $^3J_{HH}$=7.6 Hz, m-H$_{py}$, 2H), 5.82 (d, $^2J_{HH}$=16.4 Hz, CH$_{2benz}$, 2H), 5.70 (d, $^2J_{HH}$=16.4 Hz, CH$_{2Benz}$, 2H), 4.13 (d, $^2J_{HH}$=13.1 Hz, -Py-CH$_2$—N—, 2H), 3.96 (d, $^2J_{HH}$=13.1 Hz, -Py-CH$_2$—N—, 2H), 3.71 (d, $^2J_{HH}$=15.3 Hz, -Py-CH$_2$—N—, 2H), 3.53 (d, $^2J_{HH}$=14.8 Hz, -Py-CH$_2$—N—, 2H), 2.42-2.39 (m, —N—CH$_2$—CH$_2$—, 2H), 2.34-2.31 (m, —N—CH$_2$—CH$_2$—, 2H), 1.44-1.36 (m, —CH$_2$—CH$_2$—CH$_3$, 4H), 0.64 (t, $^3J_{HH}$=7.3 Hz, —CH$_2$—CH$_3$, 3H), 0.63 (t, $^3J_{HH}$=7.4 Hz, —CH$_2$—CH$_3$, 3H). $^{13}$C NMR (151 MHz, −30° C., CD$_2$Cl$_2$): δ 191.72 (quat. C$_{benz}$), 156.62 (quat. C$_{py}$), 154.88 (quat. C$_{py}$), 137.51 (p-C$_{py}$), 136.85 (Ar—C$_{benz}$), 134.44 (Ar—C$_{benz}$), 128.96 (Ar—CH$_{benz}$), 127.99 (Ar—C$_{benz}$), 126.34 (Ar—CH$_{benz}$), 124.31 (m-C$_{py}$), 123.70 (Ar—CH$_{benz}$), 121.70 (m-C$_{py}$), 111.54 (Ar—CH$_{benz}$), 64.25 (—N—CH$_2$—CH$_2$—) 63.90 (-Py-CH$_2$—N—), 63.72 (—N—CH$_2$—CH$_2$—), 63.56 (-Py-CH$_2$—N—), 61.20 (-Py-CH$_2$—N—), 52.0 (CH$_{2benz}$), 51.74 (CH$_{2benz}$), 19.41 (—CH$_2$—CH$_2$—CH$_3$), 17.23 (—CH$_2$—CH$_2$—CH$_3$), 11.53 (—CH$_2$—CH$_3$), 11.24 (—CH$_2$—CH$_3$).

$\kappa^d$, minor isomer:
$^1$H NMR (600 MHz, −30° C., CD$_2$Cl$_2$): δ 7.44-7.33 (m, Ar—H$_{benz}$, 4H), 7.29-7.23 (m, p-H$_{py}$, Ar—H$_{benz}$, 8H), 7.07-7.04 (m, Ar—H$_{benz}$, 4H), 6.69 (d, $^3J_{HH}$=7.6 Hz, m-H$_{py}$, 4H), 5.79 (s, CH$_{2benz}$, 4H), 3.99 (d, $^2J_{HH}$=15.3 Hz, -Py-CH$_2$—N—, 4H), 3.61 (d, $^2J_{HH}$=15.3 Hz, -Py-CH$_2$—N—, 4H), 2.51 (t, $^3J_{HH}$=7.1 Hz, —N—CH$_2$—

CH$_2$—, 4H), 1.60-1.54 (m, —CH$_2$—CH$_2$—CH$_3$, 4H), 0.93 (t, $^3J_{HH}$=7.13 Hz, —CH$_2$—CH$_3$, 6H). $^{13}$C NMR (151 MHz, −30° C.,

CD$_2$Cl$_2$): δ 193.11 (quat. C$_{Imd}$), 156.67 (quat. C$_{py}$), 137.04 (p-C$_{py}$), 136.92 (Ar—C$_{benz}$—), 134.41 (Ar—C$_{benz}$—), 128.80 (Ar—CH$_{benz}$—), 126.66 (Ar—CH$_{benz}$—), 123.46 (Ar—C$_{benz}$—), 122.27 (m-C$_{py}$), 111.64 (Ar—CH-$_{benz}$), 63.72 (-Py-CH$_2$—N—), 57.92 (—N—CH$_2$—CH$_2$—), 52.0 (CH$_{2benz}$), 20.65 (—CH$_2$—CH$_2$—CH$_3$), 11.50 (—CH$_2$—CH$_3$). Anal. Found (calcd for C$_{41}$H$_{46}$N$_6$CuF$_6$P): C, 58.96 (59.23), H, 5.58 (5.58), N, 9.88 (10.11).

Synthesis of Cu5

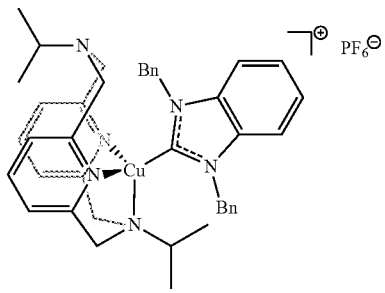

Cu5 was prepared by the same procedure as Cu3 using (1,3-dibenzylbenzimidazoyl-2-ylidene)copper(I) chloride (25.0 mg, 0.0629 mmol), N,N'-diisopropyl-2,11-diaza[3,3] (2,6)-pyridinophane (20.5 mg, 0.0632 mmol), MeCN (0.5 mL), THF (0.5 mL), and KPF6 (233 mg, 1.27 mmol), and vapor diffusion with dichloromethane-ether provided yellow crystal (38.5 mg, 71%). Crystals suitable for X-ray crystallography were obtained by vapor diffusion method with dichloromethane-diethyl ether. Cu5 exists as a single isomer [κ$^3$-$^{iPr}$N$_4$(Benz)Cu]PF$_6$ in a CD$_2$Cl$_2$ solution.

κ$^3$-3:

$^1$H NMR (600 MHz, −30° C., CD$_2$Cl$_2$): δ 7.35 (t, J$_{HH}$=7.7 Hz, p-H$_{py}$, 2H), 7.31-7.30 (m, Ar—H$_{benz}$, 10H), 7.06 (t, $^3J_{HH}$=3.6 Hz, Ar—H$_{benz}$, 4H), 6.88 (d, $^3J_{HH}$=7.7 Hz, m-H$_{py}$, 2H), 6.80 (d, $^3J_{HH}$=7.5 Hz, m-H$_{py}$, 2H), 5.93 (d, $^2J_{HH}$=16.2 Hz, CH$_{benz}$, 2H), 5.74 (d, $^2J_{HH}$ 16.2 Hz, CH$_{2benz}$, 2H), 4.15 (d, $^2J_{HH}$=14.8 Hz, -Py-CH$_2$—N—, 2H), 3.83 (d, $^2J_{HH}$=13.0 Hz, -Py-CH$_2$—N—, 2H), 3.69 (d, $^2J_{HH}$=12.7 Hz, -Py-CH$_2$—N—, 2H), 3.61 (d, $^2J_{HH}$=15.2 Hz, -Py-CH$_2$—N—, 2H), 3.06 (septet, $^3J_{HH}$=6.4 Hz, —N—CH(CH$_3$)$_2$, 1H), 2.70-2.65 (m, —N—CH(CH$_3$)$_2$, 1H), 1.12 (d, $^3J_{HH}$=6.4 Hz, —N—CH(CH$_3$)$_2$, 6H), 1.00 (d, $^3J_{HH}$=6.4 Hz, —N—CH(CH$_3$)$_2$, 6H).

$^{13}$C NMR (101 MHz, −30° C., CD$_2$Cl$_2$): δ 192.3 (quat. C$_{Imd}$), 159.4 (quat. C$_{Py}$), 154.8 (quat. C$_{Py}$), 137.8 (p-C$_{Py}$), 136.6 (Ar—C-$_{benz}$), 134.5 (Ar—C-$_{benz}$), 129.1 (Ar—CH-$_{benz}$), 128.1 (Ar—C-$_{benz}$), 126.3 (Ar—CH-$_{benz}$), 124.7 (m-C$_{Py}$), 123.8 (Ar—CH-$_{benz}$), 121.9 (m-C$_{Py}$), 111.97 (Ar—CH-$_{benz}$), 61.8 (-Py-CH$_2$—N—), 60.4 (-Py-CH$_2$—N—), 59.4 (—N—CH(CH$_3$)$_2$), 59.1 (—N—CH(CH$_3$)$_2$) and (-Py-CH$_2$—N—), 52.1 (CH$_{2benz}$), 19.1 (—N—CH(CH$_3$)$_2$), 18.9 (—N—CH(CH$_3$)$_2$)

Anal. Found (calcd for C$_{41}$H$_{46}$N$_6$CuF$_6$P): C, 59.56 (59.23), H, 5.70 (5.58), N, 10.24 (10.11).

Synthesis of Cu6

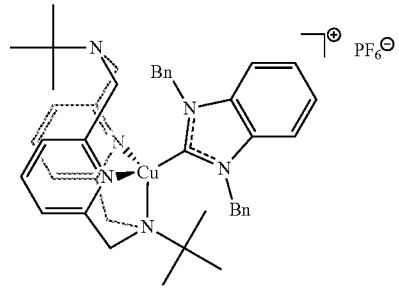

Cu6 was prepared by the same procedure as Cu3 using (1,3-dibenzylbenzimidazoyl-2-ylidene)copper(I) chloride (28.3 mg, 0.0712 mmol), N,N'-di-t-butyl-2,11-diaza[3,3](2,6)-pyridinophane (25.0 mg, 0.0709 mmol), MeCN (1 mL), THF (1 mL), and KPF6 (264 mg, 1.43 mmol) to provide yellow crystalline solid (50.7 mg, 81%). Crystals suitable for X-ray crystallography were obtained by the vapor diffusion method with dichloromethane-diethyl ether.

In CD$_2$Cl$_2$ Cu6 features a tetragonal geometry with a κ$^3$coordinated ligand and exists in solution as a single isomer.

$^1$H NMR (600 MHz, 20° C., CD$_2$Cl$_2$, ) (κ$^3$): Single conformer: δ 7.31-7.25 (m, p-H$_{py}$ and Ar—H$_{benz}$, 12H), 7.06-7.04 (m, Ar—H$_{benz}$, 4H), 6.78 (d, $^3J_{HH}$=7.8 Hz, m-H$_{py}$, 2H), 6.75 (d, $^3J_{HH}$=7.5 Hz, m-H$_{py}$, 2H), 6.12 (d, $^2J_{HH}$=16.1 Hz, CH$_{2benz}$, 2H), 5.62 (d, $^2J_{HH}$=16.1 Hz, CH$_{2benz}$, 2H), 4.75 (d, $^2J_{HH}$=15.0 Hz, -Py-CH$_2$—N—, 2H), 3.70 (d, $^2J_{HH}$=13.1 Hz, -Py-CH$_2$—N—, 2H), 3.57 (d, $^2J_{HH}$=14.8 Hz, -Py-CH$_2$—N—, 2H), 3.46 (d, $^2J_{HH}$=13.0 Hz, -Py-CH$_2$—N—, 2H), 1.37 (s, —N—C(CH$_3$)$_3$, 9H), 1.00 (s, —N—C(CH$_3$)$_3$, 9H).

$^{13}$C NMR (101 MHz, 20° C., CD$_2$Cl$_2$) (κ$^3$): Single conformer: δ 192.5 (quat. C$_{Imd}$), 159.9 (quat. C$_{Py}$), 155.2 (quat. C$_{Py}$), 137.6 (p-C$_{Py}$), 136.1 (Ar—C-$_{benz}$), 134.4 (Ar—C-$_{benz}$), 129.0 (Ar—CH-$_{benz}$), 128.0 (Ar—C-$_{benz}$), 126.2 (Ar—CH$_{benz}$), 124.2 (m-C$_{Py}$), 123.7 (Ar—CH-$_{benz}$), 121.5 (m-C$_{Py}$), 112.2 (Ar—CH-$_{benz}$), 59.6 (-Py-CH$_2$—N—), 59.2 (-Py-CH$_2$—N—), 59.1 (-Py-CH$_2$—N—), 56.3 (—N—C (CH$_3$)$_2$), 52.2 (CH$_{2benz}$), 27.5 (—N—C(CH$_3$)$_3$). Anal. Found (calcd for C$_{43}$H$_{50}$CuF$_6$N$_6$P): C, 60.11, (60.10); H, 5.88, (5.86); N, 10.43, (9.78).

Synthesis of 4

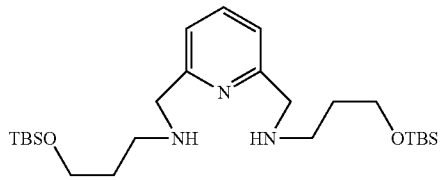 [SMILES: CC(C)(C)[Si](C)(C)OCCCNCc1cccc(CNCCCO[Si](C)(C)C(C)(C)C)n1]

Compound 4 was prepared according to the previously reported procedure.[6]

A mixture of pyridine-2,6-dialdehyde (1) (2.16 g, 16.0 mmol) and 3 Å molecular sieves (6.0 g) in dry MeOH (30 mL) was stirred at room temperature in a three-necked flask under an argon atmosphere. After addition of 3-aminopropyl (tert-butyl)dimethylsilyl ether (6.06 g, 32.0 mmol), the mixture was stirred at room temperature for 3 h. Sodium borohydride (1.33 g, 35.2 mmol) was added slowly at 0° C. under argon gas flow. After stirring at room temperature for 3 h, the mixture was filtered through Celite, and concentrated under reduced pressure. Saturated NH4Cl aqueous solution (5 mL) was added slowly to the mixture at 0° C., and the mixture was stirred at room temperature for 10 min. Saturated aqueous solution of potassium carbonate (10 mL) was added and extracted with dichloromethane (20 mL×5). The dichloromethane solution was dried over magnesium sulfate, filtered, and concentrated under reduced pressure. The crude mixture was purified by basic alumina column chromatography with hexane:AcOEt (2:1/v:v) as an eluent to give an oil, 4.60 g, yield 60%.

$^1$H NMR (400 MHz, 23° C., CDCl$_3$): δ 7.56 (t, $^3J_{HH}$=7.6 Hz, p-H$_{Py}$, 1H), 7.14 (d, $^3J_{HH}$=7.6 Hz, m-H$_{Py}$, 2H), 3.86 (s, Py-CH$_2$—N, 4H), 3.68 (t, $^3J_{HH}$=6.2 Hz, N—CH$_2$—C, 4H), 2.73 (t, $^3J_{HH}$=6.9 Hz, C—CH$_2$—C, 4H), 1.85 (br s, NH), 1.74 (quint, $^3J_{HH}$=6.6 Hz, C—CH$_2$—C, 6H), 0.86 (s, Si—C—C(CH$_3$)$_3$, 18H), 0.023 (s, Si-CH$_3$, 12H).

$^{13}$C NMR (100 MHz, 23° C., CDCl$_3$): δ 159.4 (o-C$_{Py}$), 136.9 (p-CP$_y$), 120.5 (m-C$_{Py}$), 61.8 (—N—C—C), 55.5 (Py-C—N—), 47.0 (—C—C—O), 33.1 (—C—C—C), 26.1 (Si—C(CH$_3$)$_3$), 18.4 (Si—C(CH$_3$)$_3$), −5.2 (—Si—CH$_3$). ESI-HRMS m/z calcd for C$_{25}$H$_{52}$O$_2$N$_3$Si$_2$ [M+H$^+$]: 482.3593, found: 482.3574.

Synthesis 5

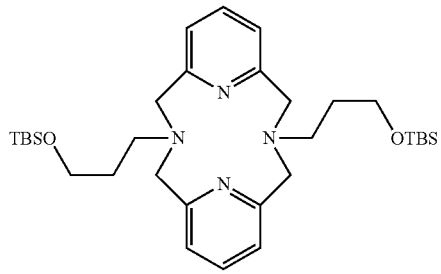 [SMILES: CC(C)(C)[Si](C)(C)OCCCN1Cc2cccc(n2)CN(CCCO[Si](C)(C)C(C)(C)C)Cc2cccc(n2)C1]

A solution of 2,6-bis(bromomethyl) pyridine (2.54 g, 9.59 mmol) in MeCN (50 mL) was added dropwise using a dropping funnel to a mixture of compound 4 (4.60 g, 9.55 mmol), potassium carbonate (7.97 g, 57.7 mmol), and MeCN (500 mL) with stirring at 80° C. for over 4 h. After stirring at 80° C. for 2 days, the hot mixture was filtered off and concentrated under reduced pressure. The crude mixture was purified by silica gel column chromatography using CHCl$_3$:MeOH:28% NH$_3$ aqueous solution (50:1:0.1) as an eluent to give an white solid. The solid was recrystallized from MeCN to give a colorless solid product, 2.20 g, yield 39%.

The crude mixture also can be purified by basic alumina column chromatography with hexane:AcOEt (4:1/v:v).

$^1$H NMR (400 MHz, 23° C., CDCl$_3$): δ 7.10 (t, $^3J_{HH}$=7.5 Hz, p-py, 2H), 6.75 (d, $^3J_{HH}$=7.5 Hz, m-N$_{Py}$, 4H), 3.89 (s, Py-CH$_2$—N, 8H), 3.82 (t, $^3J_{HH}$=6.9 Hz, N—CH$_2$—C, 4H), 2.94 (t, $^3J_{HH}$=6.9 Hz, C—CH$_2$—O, 4H), 1.92 (quint, $^3J_{HH}$=6.9 Hz, C—CH$_2$—C, 4H), 0.93 (s, Si—C(CH$_3$)$_3$, 18H), 0.10 (s, Si—CH$_3$, 12H).

$^{13}$C NMR (100 MHz, 23° C., CDCl$_3$): δ 158.0 (o-C$_{Py}$), 135.6 (p-C$_{Py}$), 122.6 (m-C$_{Py}$), 64.0 (—N—C—C), 61.5 (-Py-C—N—), 57.1 (C—C—O), 30.9 (—C—C—C), 26.1 (Si—C(CH$_3$)$_3$), 18.5 (Si—C(CH$_3$)$_3$), −5.1 (Si—CH$_3$). ESI-HRMS m/z calcd for C$_{32}$H$_{57}$N$_4$O$_2$Si$_2$ [M+H$^+$]: 585.4004, found: 585.3992.

Synthesis of 6

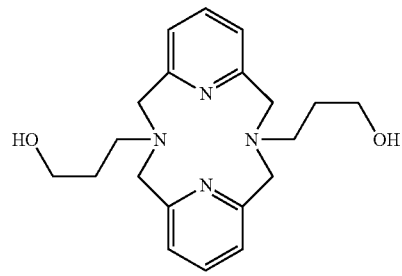 [SMILES: OCCCN1Cc2cccc(n2)CN(CCCO)Cc2cccc(n2)C1]

Compound 5 (2.20 g, 3.76 mmol) was dissolved in MeOH (10 mL). After the addition of 35% hydrochloric acid (1.0 mL), the mixture was stirred at room temperature for 1 day. The solvents were removed under reduced pressure. Potassium carbonate (2.60 g, 18.8 mmol) and water (10 mL) were added to the mixture. The mixture was extracted with CH$_2$Cl$_2$ (10 mL×5), dried over a mixture of magnesium sulfate and potassium carbonate, filtered off, and concentrated under reduced pressure. The mixture was recrystallized from MeCN to give a colorless solid product, 1.23 g, yield 92%.

$^1$H NMR (400 MHz, 23° C., CDCl$_3$): δ 7.10 (t, $^3J_{HH}$=7.8 Hz, p-H$_{Py}$, 2H), 6.75 (d, $^3J_{HH}$=7.8 Hz, m-H$_{Py}$, 4H), 6.03 (br, 2H, OH), 4.04 (t, $^3J_{HH}$=5.0 Hz, N—CH$_2$—C, 4H), 3.95 (s, Py-CH$_2$—N, 8H), 3.08 (t, $^3J_{HH}$=5.5 Hz, C—CH$_2$—O, 4H), 1.93 (quint, $^3J_{HH}$=5.0 Hz, C—CH$_2$—C, 4H).

$^{13}$C NMR (100 MHz, 23° C., CDCl$_3$): δ 157.2 (o-C$_{Py}$), 136.3 (p-C$_{Py}$), 122.3 (m-C$_{Py}$), 65.0 (—N—C—C), 64.6 (-Py-C—N—), 61.2 (C—C—O), 29.0 (—C—C—C).

ESI-HRMS m/z calcd for C$_{20}$H$_{29}$N$_4$O$_2$ [M+H$^+$]: 357.2285, found: 357.2289.

Synthesis of Li

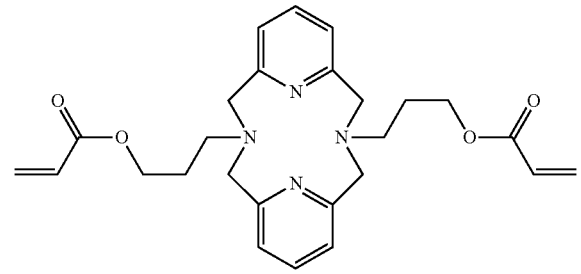 [SMILES: C=CC(=O)OCCCN1Cc2cccc(n2)CN(CCCOC(=O)C=C)Cc2cccc(n2)C1]

Method A

In a glove box, sodium hydride (20.3 mg, 0.846 mmol) and anhydrous THF (5 mL) were placed in 25 mL Schlenk tube. The Schlenk tube was taken out from the glove box. After the addition of compound 6 (101 mg, 0.283 mmol) under argon gas flow at 0° C., the mixture was stirred at room temperature for 1 h. Acryloyl chloride (112 mg, 1.24 mmol) was added slowly at 0° C. under argon gas flow. The reaction mixture was allowed to warm to room temperature, and stirred for 16 h. After the addition of MeOH (1 mL) at 0° C., the reaction mixture was concentrated under vacuum at room temperature. Acetonitrile (3 mL) and 10 wt % potassium carbonate aqueous solution (3 mL) was added, and extracted with a solution of hexane-diethyl ether (10:1/v:v) (30 mL×5). The extracted solution was dried over a mixture of magnesium sulfate and potassium carbonate, filtered, and concentrated under reduced pressure at room temperature to give the product as a white powder (84.0 mg, 64%). This ligand was used for polymerization immediately.
Method B A solution of compound 6 (100 mg, 0.281 mmol), triethylamine (290 mg, 2.87 mmol), and 2,6-di-tert-butyl-p-cresol (5.0 mg, 0.0227 mmol) in dry dichloromethane (5 mL) was stirred at 0° C. in 25 mL Schlenk tube under an argon atmosphere. Acryloyl chloride (67.2 mg, 0.742 mmol) was added to the solution slowly over 5 min. under argon gas flow, and the reaction mixture was stirred at room temperature for 18 h. After addition of methanol (1 mL), the mixture was concentrated at room temperature under reduced pressure. The crude mixture was purified by basic alumina column chromatography using ethyl acetate:hexane (2:1 v/v), then ethyl acetate as an eluent to give a white powder (88.3 mg, 67%). (TLC plate was stained by iodine) This ligand was used for polymerization immediately. CDCl$_3$ solution for NMR analysis was passed through $\kappa^2$CO$_3$ before measurement because the product can be easily protonated.

$^1$H NMR (400 MHz, 23° C., CDCl$_3$): δ 7.12 (t, $^3J_{HH}$=7.78 Hz, p-H$_{Py}$, 2H), 6.75 (d, $^3J_{HH}$=7.8 Hz, m-H$_{Py}$, 4H), 6.45 (d, $^2J_{HH}$=17.4 Hz, —C=CH, 2H), 6.18 (dd, $^3J_{HH}$=17.4 and 10.1 Hz, —CH=CH, 2H), 5.85 (d, $^2J_{HH}$=10.1 Hz, —C=CH, 2H), 4.43 (t, $^3J_{HH}$=6.4 Hz, C—CH$_2$—O, 4H), 3.89 (s, Py-CH$_2$—N, 8H), 2.95 (t, $^3J_{HH}$=6.4 Hz, C—CH$_2$—N, 4H), 2.08 (quint, $^3J_{HH}$=6.4 Hz, C—CH—C, 4H).

$^{13}$C NMR (100 MHz, 23° C., CDCl$_3$): δ 166.5 (C=O), 157.8 (o-C$_{Py}$), 135.8 (p-C$_{Py}$), 131.0 (0=C—C=C), 128.6 (O=O—C=C), 122.8 (m-C$_{Py}$), 64.1 (C—C—O), 63.0 (-Py-C—N—), 56.7 (N—C—C), 27.2 (C—C—C). ESI-HRMS m/z calcd for C$_{26}$H$_{33}$N$_4$O$_4$ [M+H$^+$]: 465.2496, found: 465.2482.

Synthesis of 1-((tert-butyldimethylsilyl)oxy)-2-methylpropan-2-amine (7)

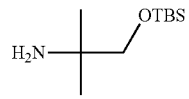

1-((tert-butyldimethylsilyl)oxy)-2-methylpropan-2-amine (7) was prepared by following the previously reported procedure with some modifications.[7]

In a glove box, sodium hydride (3.19 g, 133 mmol) and dry THF (300 mL) were placed in 500 mL Schlenk flask. The flask was capped and taken out of glovebox and cooled with an ice bath. 2-Amino-2-methylpropanol (11.9 g, 133 mmol) was added slowly over 5 min. under argon gas flow with stirring. The reaction mixture was stirred at room temperature for 1 h. A solution of tert-butyldimethyl chloride (20.0 g, 133 mmol) in dry THF (50 mL) was added to the mixture slowly over 5 min at 0° C., then the mixture was stirred at room temperature for 3 h. After addition of methanol (10 mL), the reaction mixture was concentrated to ca. 50 mL volume under reduced pressure. After addition of hexane (100 mL), the mixture was washed with water (20 mL×3) and brine (20 mL), dried over magnesium sulfate, filtered off, and concentrated under reduced pressure to give the product as a colorless oil (25.3 g, yield 93%). This compound was used for the next reaction without further purification.

$^1$H NMR (400 MHz, 23° C., CDCl$_3$): δ 3.25 (s, 2H, C—CH$_2$—O), 1.03 (s, 6H, C—CH$_3$), 0.89 (s, 9H, Si—C—(CH$_3$)$_3$), 0.028 (s, 6H, Si—CH$_3$). The peaks of NH$_2$ could not be assigned unambiguously due to possible exchange with water (broad singlet at 1.60 ppm).

$^{13}$C NMR (100 MHz, 23° C., CDCl$_3$): δ 73.2 (C—C—O), 50.8 (—N—C—C), 26.9 (—C—CH$_3$), 26.0 (Si—C(CH$_3$)$_3$), 18.4 (Si—C(CH$_3$)$_3$), −5.3 (Si—CH$_3$).

ESI-HRMS m/z calcd for C$_{10}$H$_{26}$NOSi [M+H$^+$]: 204.1778, found: 204.1777.

Synthesis of 8

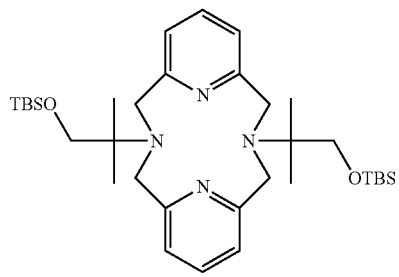 [SMILES: CC(C)(CO[Si](C)(C)C(C)(C)C)N1Cc2cccc(n2)CN(C(C)(C)CO[Si](C)(C)C(C)(C)C)Cc2cccc(n2)C1]

A solution of 2,6-bis(bromomethyl) pyridine (6.36 g, 24.0 mmol) in MeCN (50 mL) was added dropwise over 4 h using a dropping funnel to a mixture of compound 7 (4.88 g, 24.0 mmol), potassium carbonate (20.0 g, 145 mmol), and MeCN (1.2 L) with stirring at 80° C. After stirring at 80° C. for 2 days, the hot mixture was filtered off and concentrated under reduced pressure. The mixture was suspended in dichloromethane (100 mL) and washed with water (20 mL×2), dried over a mixture of potassium carbonate and magnesium sulfate, filtered off and concentrated under reduced pressure. The mixture was suspended in hexane (30 mL) and stirred at 60° C., then cooled to room temperature slowly. After cooling further with an ice bath, the mixture was filtered off to remove precipitate. The mixture was purified by silica gel column chromatography using CHCl$_3$:MeOH:28% NH$_3$ aqueous solution (50:1:0.1/v) to give a white powder, 1.99 g, yield 27%.

$^1$H NMR (400 MHz, 23° C., CDCl$_3$): δ 7.04 (t, J=7.3 Hz, p-H$_{Py}$, 2H), 6.72 (d, J=7.3 Hz, m-H$_{Py}$, 4H), 4.04 (s, Py-CH$_2$—N, 8H), 3.67 (s, C—CH$_2$—O, 4H), 1.28 (s, N—C—(CH$_3$)$_2$, 12H), 0.93 (s, Si—C(CH$_3$)$_3$, 18H), 0.09 (s, Si—CH$_3$, 12H).

$^{13}$C NMR (100 MHz, 23° C., CDCl$_3$): δ 159.6 (o-C$_{Py}$), 135.3 (p-C$_{Py}$), 122.1 (m-C$_{Py}$), 69.6 (C—C—O), 59.6 (C—CH$_3$), 58.1 (-Py-C—N—), 26.1 (—C—CH$_3$), 23.7 (Si—C(CH$_3$)$_3$), 18.5 (Si—C(CH$_3$)$_3$), −5.3 (Si—CH$_3$).

ESI-HRMS m/z calcd for C$_{34}$H$_{61}$O$_2$N$_4$Si$_2$ [M+H$^+$]: 613.4328, found: 613.4315.

Synthesis of

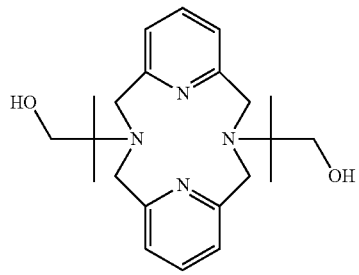 [SMILES: CC(C)(CO)N1Cc2cccc(n2)CN(C(C)(C)CO)Cc2cccc(n2)C1]

Compound 8 (1.98 g, 3.23 mmol) was suspended in MeOH (10 mL). After the addition of 35% hydrochloric acid (1.0 mL), the mixture was stirred at room temperature for 1 day. The solvents were removed under reduced pressure. Potassium carbonate (16.2 g, 117 mmol) and water (10 mL) were added to the mixture. The mixture was extracted with $CH_2Cl_2$ (20 mL×8) (the target compound only slightly dissolves in water). The combined organic layers were dried over a mixture of potassium carbonate and magnesium sulfate, filtered off, and concentrated under reduced pressure. Toluene (20 mL) was added to the mixture and stirred at 110° C. for 5 min. The hot mixture was filtered off to remove viscous solid and concentrated under reduced pressure. Recrystallization from MeCN (5 mL) provided target product as a colorless crystalline solid, 1.01 g, yield 81%.

$^1$H NMR (400 MHz, 23° C., CDCl$_3$): δ 7.04 (t, J=7.3 Hz, p-H$_{Py}$, 2H), 6.50 (d, J=7.3 Hz, m-H$_{Py}$, 4H), 3.92 (s, Py-CH$_2$—N, 8H), 3.54 (s, C—CH$_2$—O, 4H), 2.14 (s, 2H, OH), 1.29 (s, N—C—(CH$_3$)$_2$, 12H).

$^{13}$C NMR (100 MHz, 23° C., CDCl$_3$): δ 159.8 (o-C$_{Py}$), 135.5 (p-C$_{Py}$), 120.4 (m-C$_{Py}$), 69.9 (C—C—O), 59.1 (C—CH$_3$), 55.7 (-Py-C—N—), 23.0 (C—CH$_3$).

ESI-HRMS m/z calcd for $C_{22}H_{33}N_4O_2$ [M+H$^+$]: 385.2598, found: 385.2587.

Synthesis of L$_2$

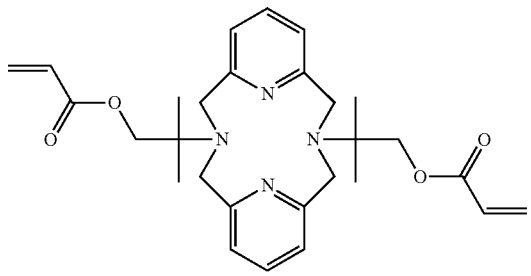 [SMILES: C=CC(=O)OCC(C)(C)N1Cc2cccc(n2)CN(C(C)(C)COC(=O)C=C)Cc2cccc(n2)C1]

L$_2$ was prepared by the same procedure with L$_1$ using compound 8 (100 mg, 0.260 mmol), sodium hydride (20.0 mg, 0.834 mmol), dry THF (5 mL) and acryloyl chloride (112 mg, 1.24 mmol) to give the product as a white powder (82.5 mg, yield 64%).

$^1$H NMR (400 MHz, 23° C., CDCl$_3$): δ 7.07 (t, $^3J_{HH}$=7.8 Hz, p-H$_{Py}$, 2H), 6.71 (d, $^3J_{HH}$=7.8 Hz, m-H$_{Py}$, 4H), 6.47 (d, $^2J_{HH}$=17.4 Hz, —C=CH, 2H), 6.21 (dd, $^3J_{HH}$=17.4 and 10.52 Hz, —CH=CH, 2H), 5.88 (d, $^2J_{HH}$=10.52 Hz, —C=CH, 2H), 4.30 (s, C—CH$_2$—O, 4H,), 4.07 (s, Py-CH$_2$—N, 8H), 1.34 (s, C—CH$_3$, 12H).

$^{13}$C NMR (100 MHz, 23° C., CDCl$_3$): δ 166.3 (C=O), 159.1 (o-C$_{Py}$), 135.6 (p-C$_{Py}$), 131.2 (CO—C=C), 128.6 (CO—C=C), 122.2 (m-C$_{Py}$), 69.8 (C—C—O), 58.1 (C$_q$—CH$_3$), 58.0 (-Py-CH$_2$—N—), 24.4 (C—CH$_3$). ESI-HRMS m/z calcd for $C_{28}H_{37}O_4N_4$ [M+H$^+$]: 493.2809, found: 493.2785.

Synthesis of cPBA1

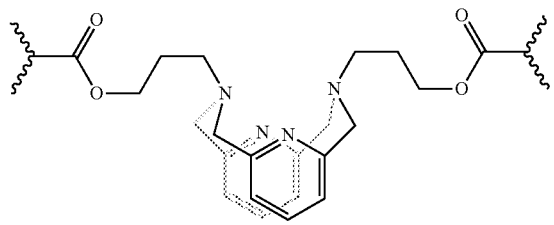 [SMILES: *C(=O)OCCCN1Cc2cccc(n2)CN(CCCOC(*)=O)Cc2cccc(n2)C1]

In a glove box, 2-methyl-4'-(methylthio)-2-morpholino-propiophenone (39.5 mg, 0.141 mmol) was dissolved in a solution of L$_1$ (65.1 mg, 0.140 mmol) and butyl acrylate (1.79 g, 14.0 mmol) in dry DMF (6 mL). The reaction mixture was split into two Teflon molds [40 mm [W]×70 mm [L]×5 mm [D]]. The molds were covered with thin glass plate [50 mm [W]×80 mm [L]×0.15 mm [T]] and sealed with silicone grease. After irradiation with UV lamp for 20 min, the molds were left in a glove box for 24 h, then taken out of the glove box. The formed films were taken from mold and put in a solution of hexane-diethyl ether in a capped glass bottle. After 4-10 h, the solvent was replaced. This washing process was repeated five times.

The washing solvents were concentrated and analyzed by H NMR, which gave no peak of pyridinophane ligand, indicating the ligand with acryloyloxyl was incorporated completely. The films were further dried under vacuum for 2 days on Teflon sheet to give transparent films (1.52 g, 82%).

FT-IR (ATR, solid): U 738, 840, 940, 1021, 1062, 1116, 1156, 1241, 1449, 1727, 2873, 2957 cm$^{-1}$.

Synthesis of Cu1-cPBA

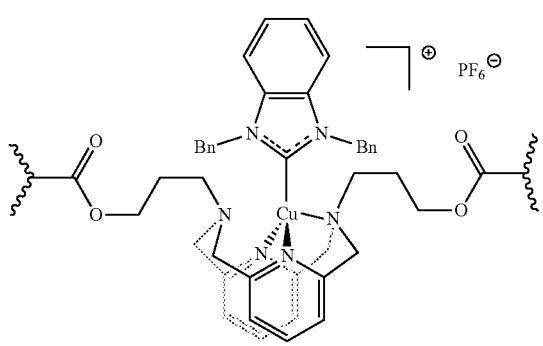

Cut films [25 mm×10 mm] were used for the reaction. In a glove box, cross-linked poly(butyl acrylate) films [0.09 mmol/g of L$_1$ incorporated in cPBA] (2.39 g) were placed in dry MeCN (30 mL) in a capped metal container for 1 h. (1,3-Dibenzylbenzimidazoyl-2-ylidene)copper(I) chloride (23.9 mg, 0.0471 mmol) was dissolved in dry MeCN (20 mL) by stirring and added to the swollen films in solution. The mixture was left at room temperature for 24 h. The solvent was replaced with fresh MeCN, then left for 4-10 h. This washing process was repeated three times.

The washing solvents were concentrated and analyzed by H NMR, which gave no peak of (1,3-dibenzylbenzimidazoyl-2-ylidene)copper(I) chloride.

After the addition of KPF6 (174 mg, 0.945 mmol), the films in MeCN were left for 6 h. After replacing the MeCN solution, the films were left for 4-10 h to wash the films, then taken out from solution and dried under vacuum for 2 days on Teflon sheet.

FT-IR (ATR, solid): u 741, 841, 943, 1025, 1063, 1116, 1156, 1244, 1377, 1452, 1728, 2334, 2871, 2957 cm$^{-1}$.

Synthesis of cPBA2

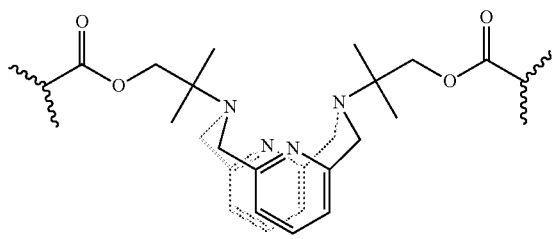 [SMILES: *C(=O)OCC(C)(C)N1Cc2cccc(n2)CN(C(C)(C)COC(*)=O)Cc2cccc(n2)C1]

cPBA2 was prepared by the same procedure as cPBA1 by using L$_2$ (69.0 mg, 0.140 mmol), 2-methyl-4'-(methylthio)-2-morpholinopropiophenone (39.1 mg, 0.140 mmol), butyl acrylate (1.79 g, 14.0 mmol) and dry DMF (6 mL) to provide films (1.54 g, 83%)

FT-IR (ATR, solid): u 738, 806, 840, 941, 1020, 1062, 1116, 1156, 1242, 1450, 1540, 1576, 1727, 2873, 2958 cm$^{-1}$.

Synthesis of Cu2-cPBA

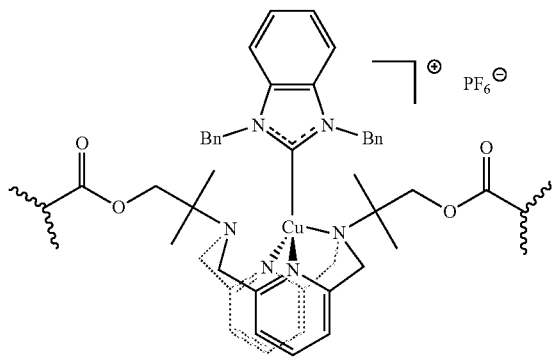

Cu2-cPBA was prepared by the same procedure as Cu1-cPBA by using films of cPBA2 [0.09 mmol/g of L2 incorporated in cPBA] (1.98 g) and (1,3-dibenzylbenzimidazoyl-2-ylidene)copper(I) chloride (19.8 mg, 0.0391 mmol), and potassium hexafluorophosphate (145 mg, 0.788 mmol). $^1$H NMR analysis of concentrated washing solvent confirmed no peaks of (1,3-dibenzylbenzimidazoyl-2-ylidene)copper (I) chloride.

FT-IR (ATR, solid): u 737, 841, 940, 1021, 1062, 1116, 1156, 1241, 1449, 1589, 1727, 2873, 2932, 2957 cm$^{-1}$.

Preparation of Reference Film for Control Experiments

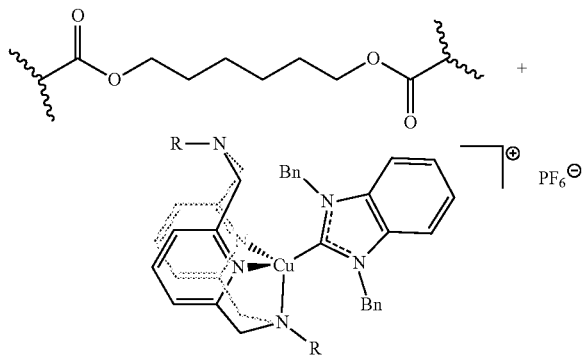

The films for the control experiment were prepared as the same method as described above by using 1,6-bis(acryloyloxy)hexane (31.8 mg, 0.141 mmol), butyl acrylate (1.79 g, 14.0 mmol), 2-methyl-4'-(methylthio)-2-morpholinopropiophenone (39.2 mg, 0.140 mmol), and DMF (6 mL) to give transparent films (1.41 g, 77%)

Cut films [25 mm×10 mm] were used for further experiments. In a glove box, reference cross-linked poly(butyl acrylate) films were placed on Teflon sheet and each film was swollen in MeCN (0.2 mL). Then, the swollen films were further swollen by a solution of MeCN (0.3 mL) including 1 wt % of Cu4 or Cu6. After leaving for 3 h, the films were dried under vacuum for 2 days on a Teflon sheet.

III. FT-IR SPECTRA

FT-IR spectra of cPBA1, cPBA2, Cu1-cPBA, Cu2-cPBA, and Cu3 to Cu6 are shown in FIG. 12 to FIG. 15.

IV. UV-VIS SPECTRA

Figure 16:
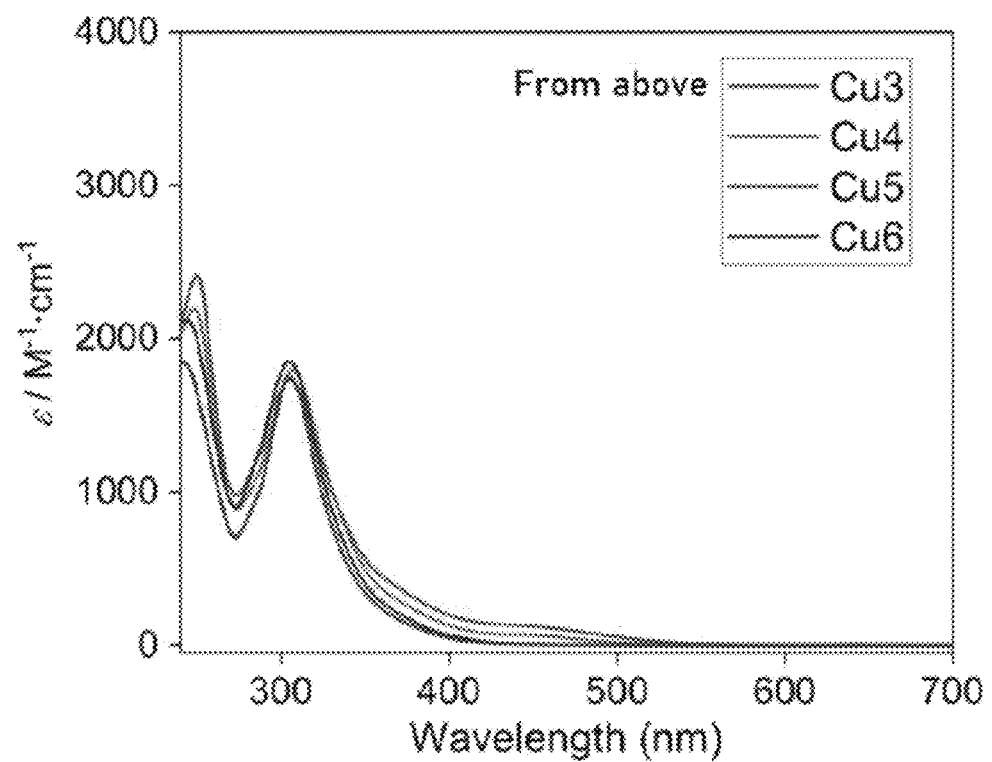
FIG. 16 is a UV-vis absorption spectrum of Cu3 to Cu6 in dichloromethane.

UV-vis absorption spectra of Cu3 to Cu6 are shown in FIG. 16.

V. EXSY AND VT NMR EXPERIMENTS

To study conformational flexibility of the ligand in complexes Cu3-6, NOESY (EXSY) NMR experiments at VT experiments were performed. The isomerization in complexes Cu3-6 is similar to that observed in previously reported copper(I) iodide complexes.8 Mixing time of 0.5 s and relaxation delay of 1.5 s were used.

Two isomers were present in solution of complexes Cu3 and Cu4, assigned as complexes with κ4- and κ3-bound ligands based on symmetry considerations.8 EXSY experiment shows an exchange between two isomers with κ4- and κ3-bound ligands (Scheme S8). For example, exchange cross-peaks are observed between methylene protons Ha/a', Hb/b' and Hc/c'.

Scheme S7. Isomer interconversion involving
(κ3-RN4) CuI (BnNHC)$^+$ and (κ4-RN4) CuI (BnNHC)$^+$ (R = Me, nPr).

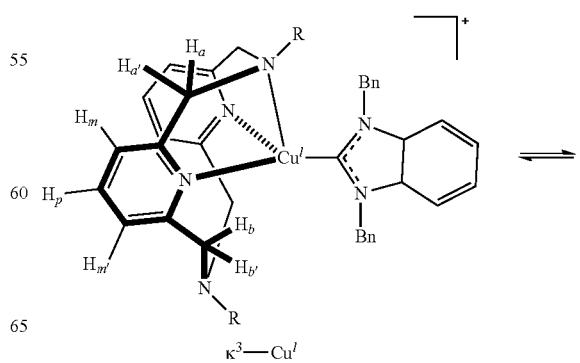

-continued

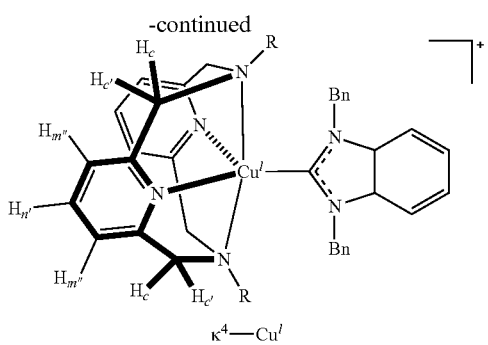

Bn = benzyl, CH$_2$Ph
R κ$^3$:κ$^4$ (-30° C.)
Me 40.8:59.2
$^n$Pr 66.7:33.3
$^i$Pr 100:0
$^t$Bu 100:0

In addition, degenerative exchange was also observed in complexes Cu5 and Cu6 where only one isomer, (κ3-RN4)CuI(BnNHC)$^+$, was present involving an exchange between pendant and coordinated amines (Scheme S8).8

Scheme S8. Exchange process in solution of (κ$^3$-RN4) CuI (BnNHC)$^+$ involving coordinated and non-coordinated amines (R = tBu, iPr). Such degenerative exchange is evident from EXSY spectrum showing exchange peaks between Hm and Hm' protons and methylene protons Ha/a' and Hb/b'.

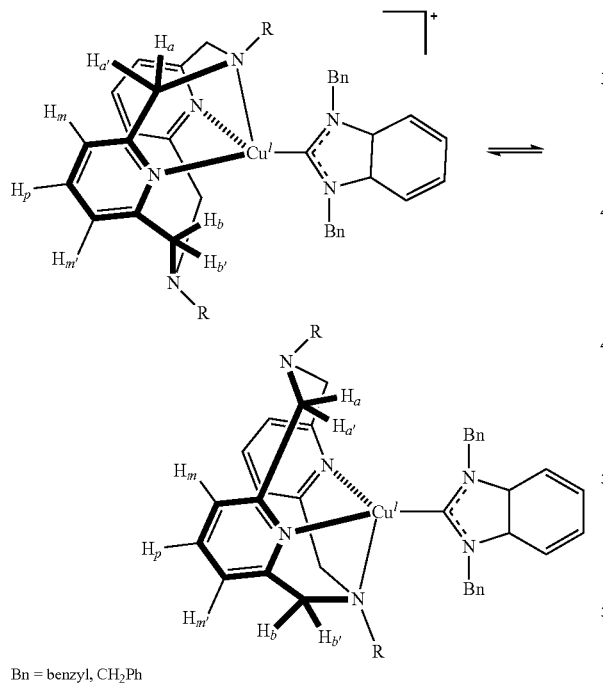

Bn = benzyl, CH$_2$Ph

Figure 17:
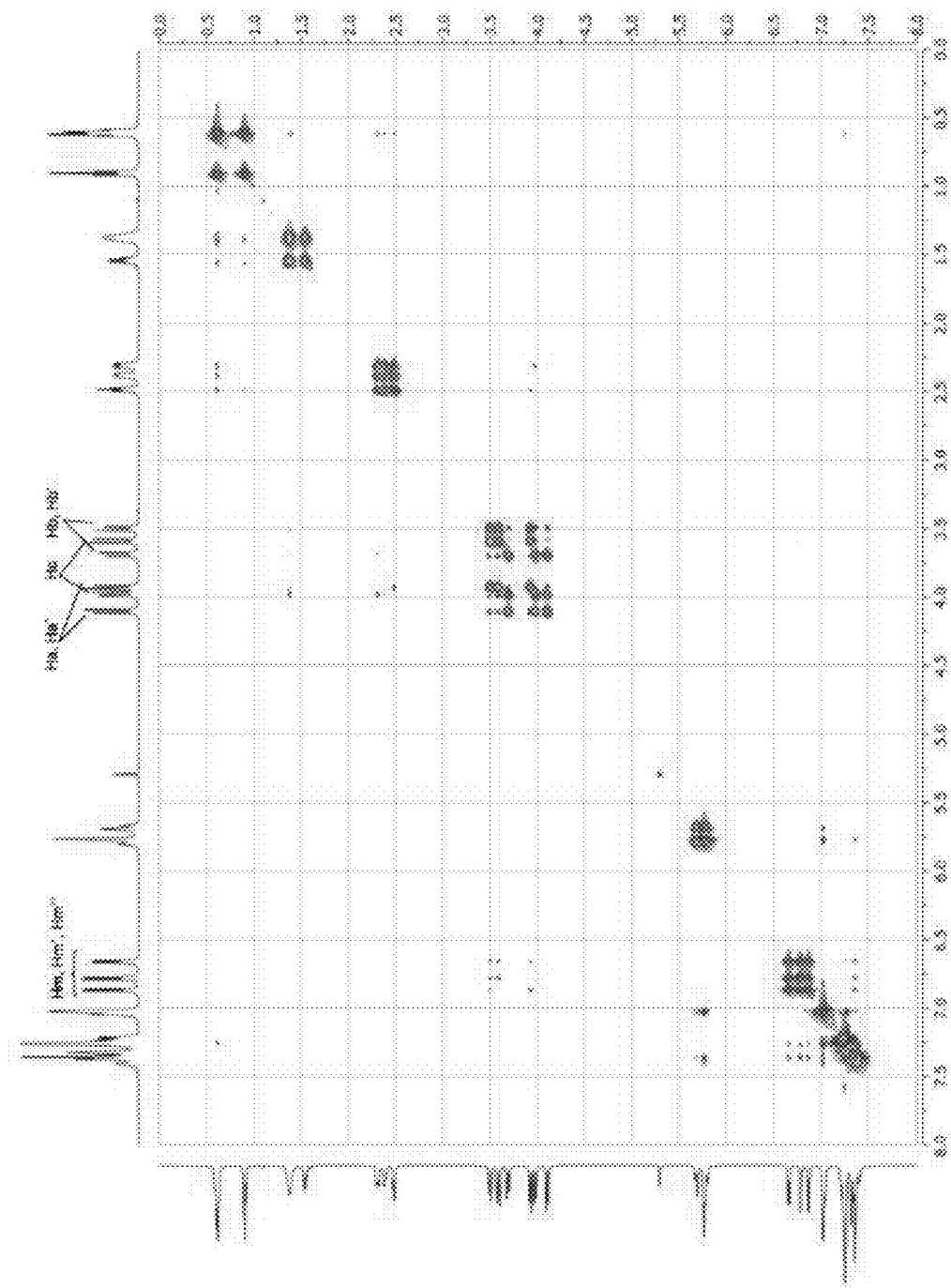
FIG. 17 is a EXSY spectrum of Cu4 in $CD_2Cl_2$.
Figure 18:
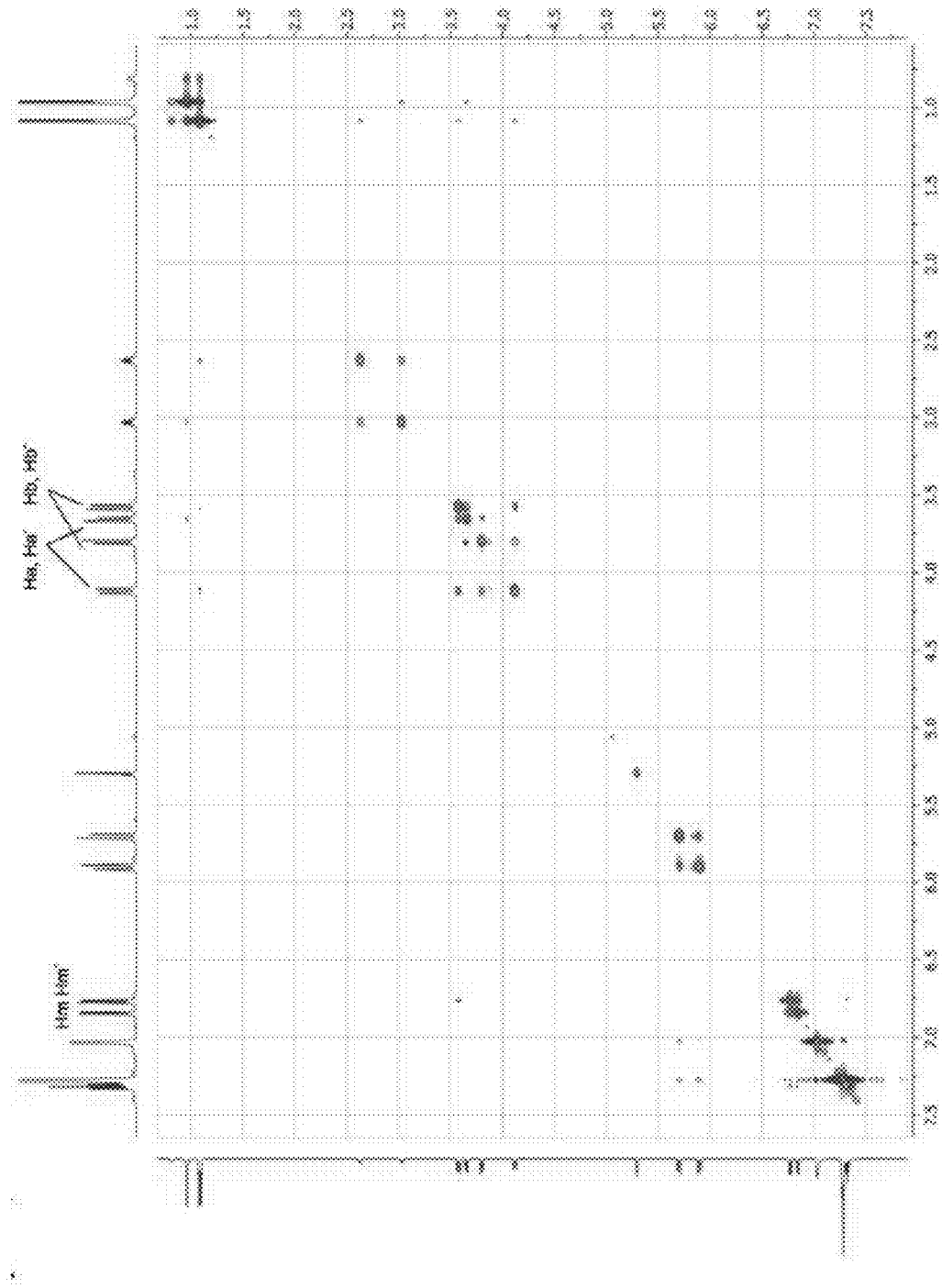
FIG. 18 is a EXSY spectrum of Cu5 in $CD_2Cl_2$.
Figure 19:
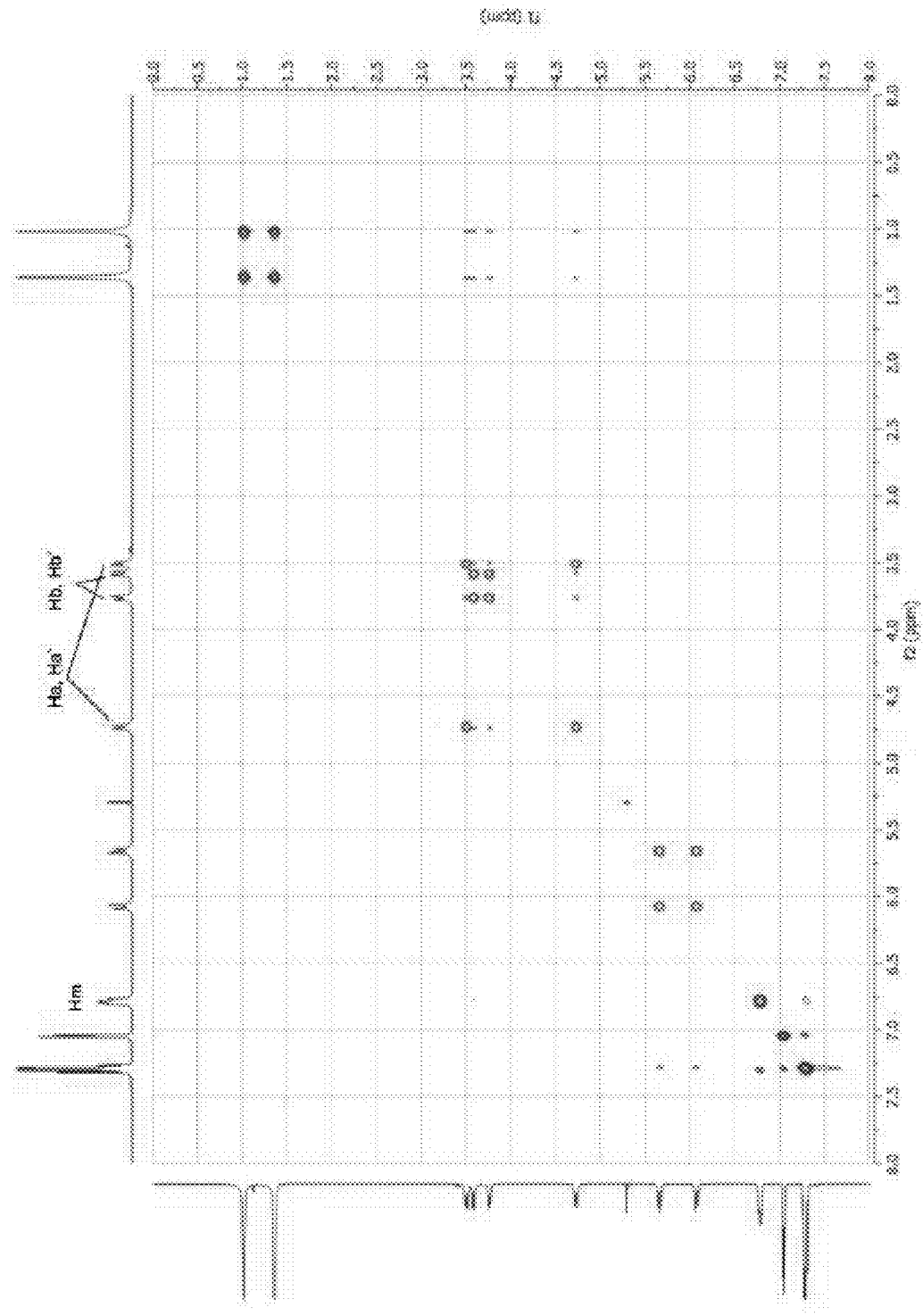
FIG. 19 is a EXSY spectrum of Cu6 in $CD_2Cl_2$.
Figure 20:
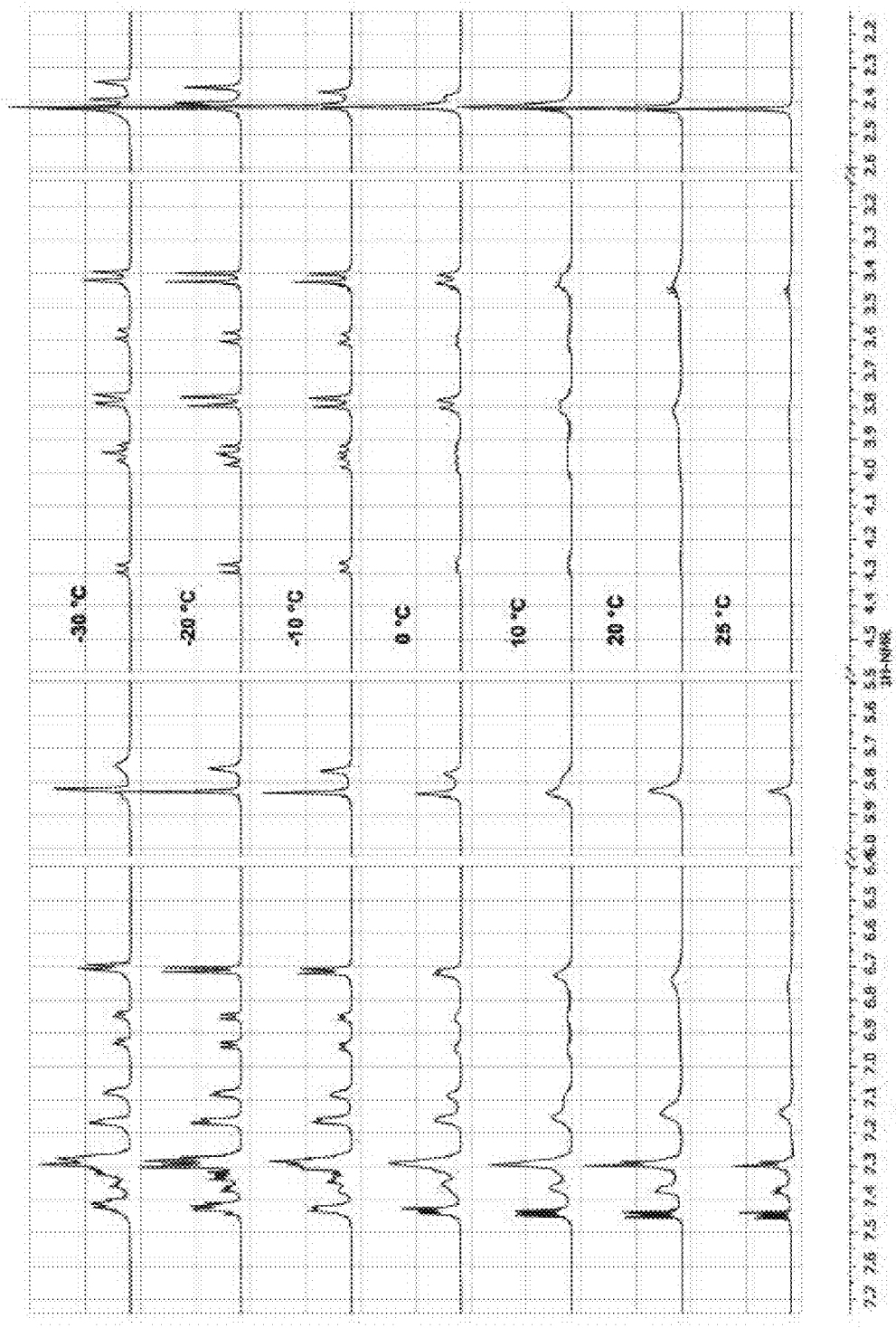
FIG. 20 is a VT $^1$H-NMR spectrum of Cu3 in $CD_2Cl_2$.
Figure 21:
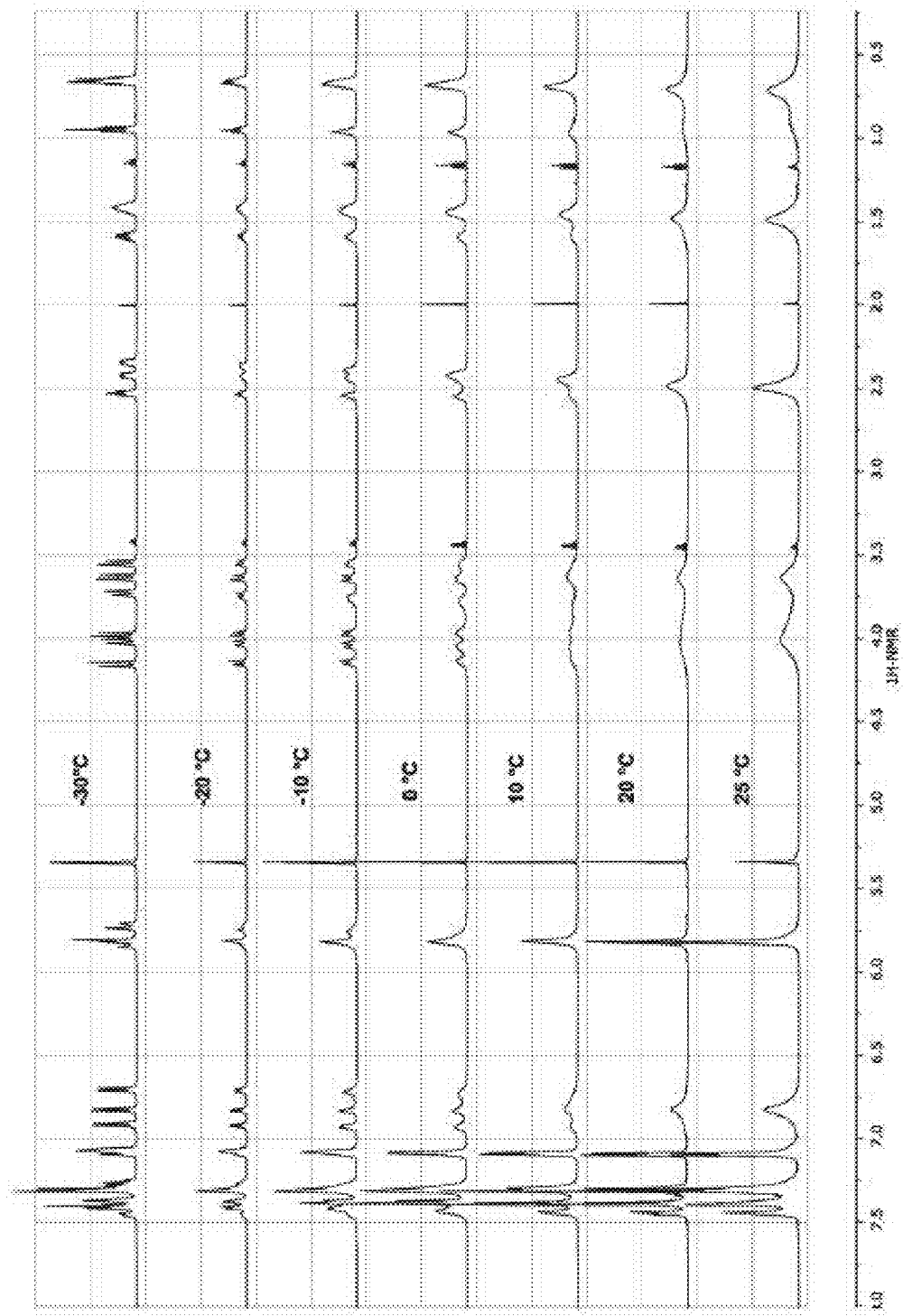
FIG. 21 is a VT $^1$H NMR spectrum of Cu4 in $CD_2Cl_2$.
Figure 22:
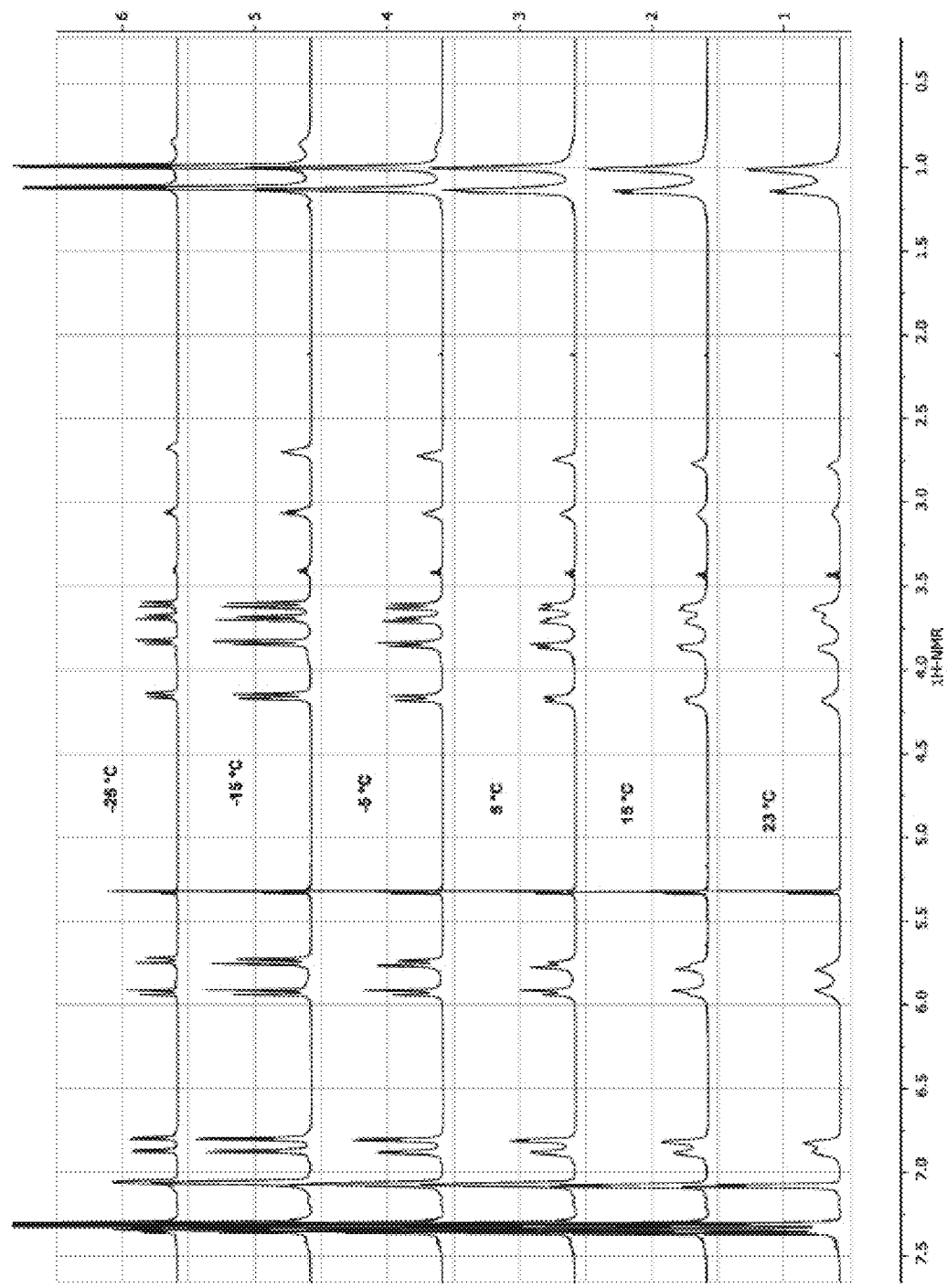
FIG. 22 is a VT $^1$H NMR spectrum of Cu5 in $CD_2Cl_2$

According to VT NMR experiments, for complexes Cu3 and Cu4, coalescence temperature for aromatic meta-protons of pyridine Hmeta is ca. 20° C., and for Cu5 and Cu6, the coalescence temperature is above 27° C. (the sample could not be heated at high temperature due to low boiling point of CD2Cl2 solvent). Complex Cu6 shows sharp peaks already at room temperature, although the exchange is evident from EXSY spectra (FIG. 17 to FIG. 19). VT $^1$H-HMR spectra of Cu3 to Cu5 are shown in FIG. 20 to FIG. 22.

The preliminary study of the kinetics of the exchange in complex Cu6 was performed using soft pulse transfer experiment (SPT).9 A solution of Cu6 in CD2Cl2 was used for the measurements at a constant temperature of 27° C., and double pulse shape experiment implemented on JEOL EXZ600R was used. Soft pulse length of 15 ms and relaxation delay of 7 s were used.

The signal of the tBu group at 1.02 ppm (signal A) was irradiated, and the intensity of signal A and the signal of another tBu group at 1.36 ppm (signal B) were monitored. The intensity change conforms to the theoretical equations confirming both signals are in a state of slow mutual exchange. The fitting was done according to the general equations given in the reported method 9 with a nonlinear least squares minimization iterative procedure based on Levenberg-Marquardt algorithm without enforcing equal rate of degenerative exchange between two chemically equivalent isomers; nevertheless, similar values of ka and kb were obtained, 19.6 s-1 and 15.9 s-1, respectively, thus giving an estimate that the rate of exchange between isomers is ca. 16 s-1 (the difference between two values might be within experimental error). This can be used as an estimate of the order of the exchange rate, rather than exact values, as these results are not free from error due to NOE effects. This value is of the same order of magnitude as determined for structurally similar (RN4)CuII complexes.8 As expected for slow exchange, the exchange rate kex (kex=ka+kb), 35.5 Hz, is smaller than the difference of chemical shifts of signals A and B (205 Hz). More detailed investigation of the exchange kinetics will be performed in a separate study.

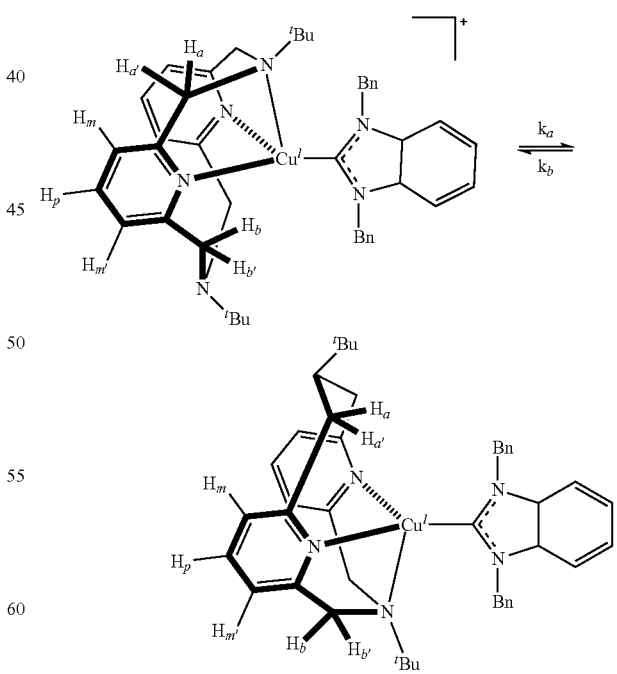

Figure 23:
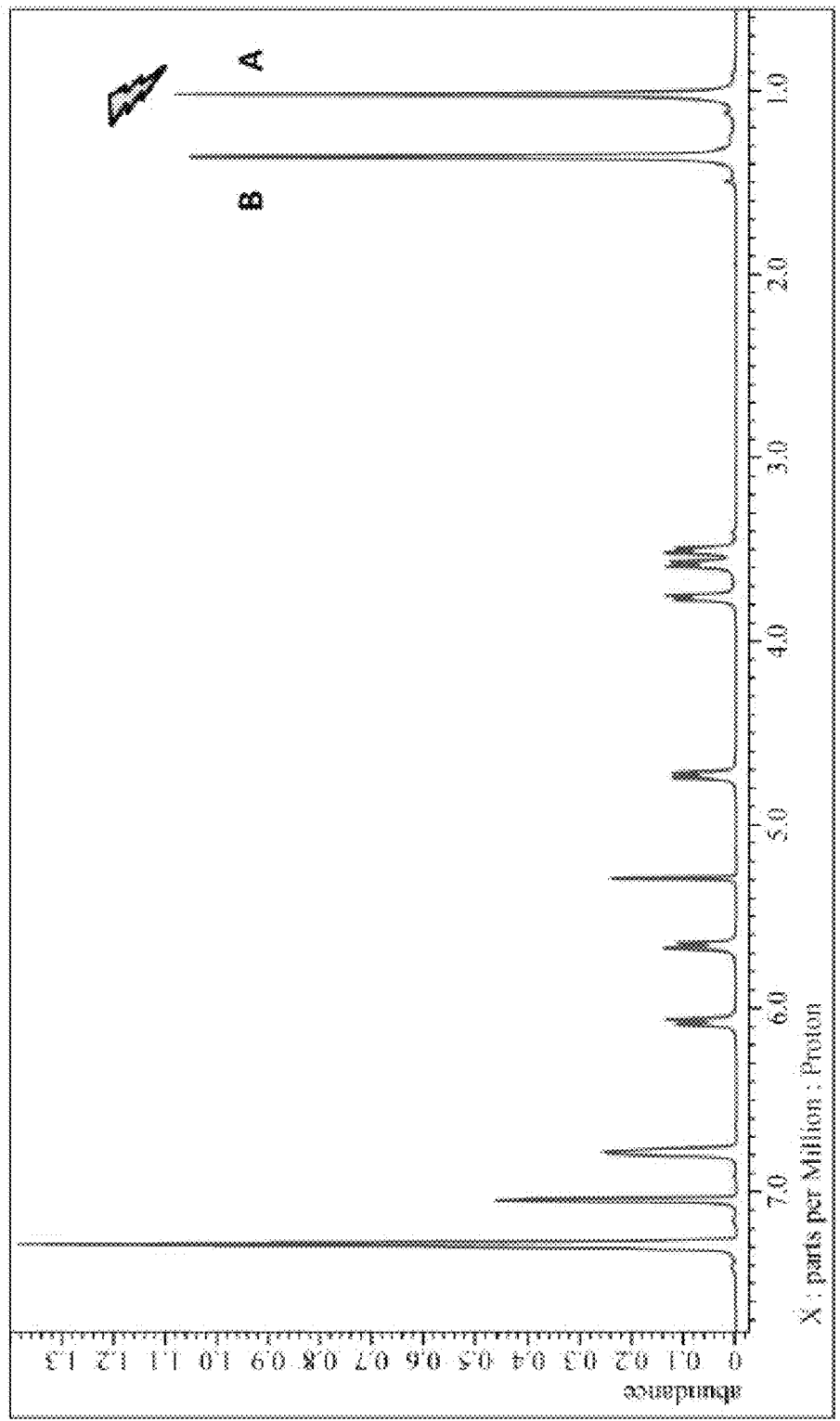
FIG. 23 is a $^1$H NMR spectrum showing $^t$Bu signals A and B of Cu6 monitored.
Figure 24:
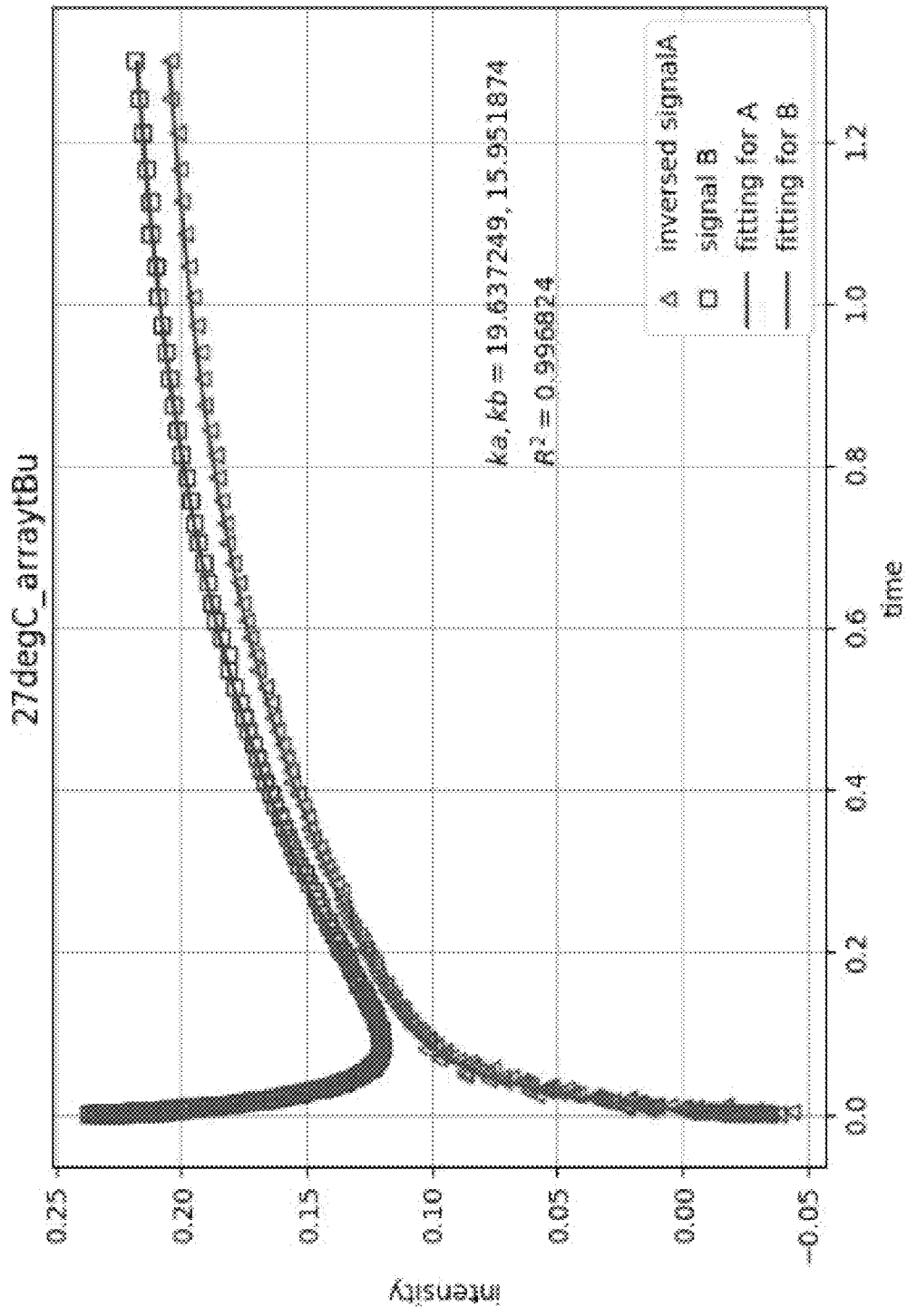
FIG. 24 is a graph showing experimental data and fitting of the intensity of signals A and B as a function of tau interval.
Figure 25A:
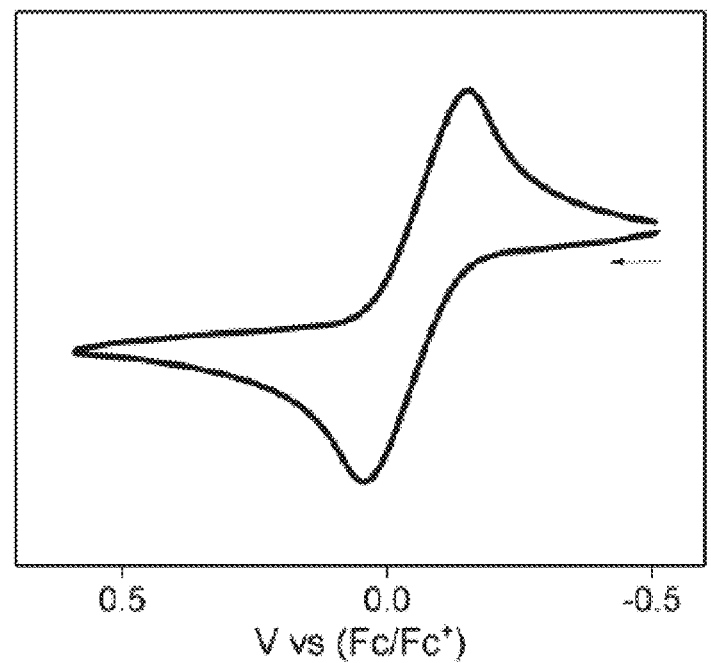
FIG. 25A is a cyclic voltammogram of Cu3 at scan rate of 0.1 V/s.
Figure 25B:
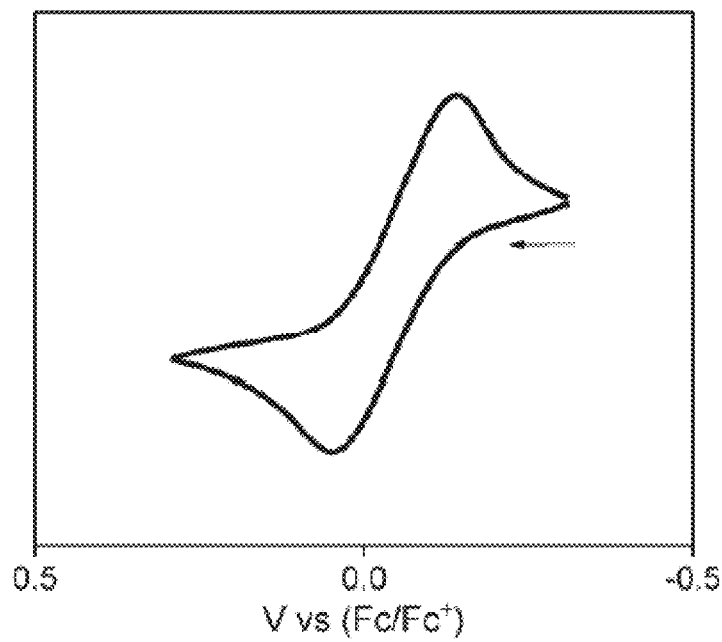
FIG. 25B is a cyclic voltammogram of Cu4 at scan rate of 0.1 V/s.
Figure 26A:
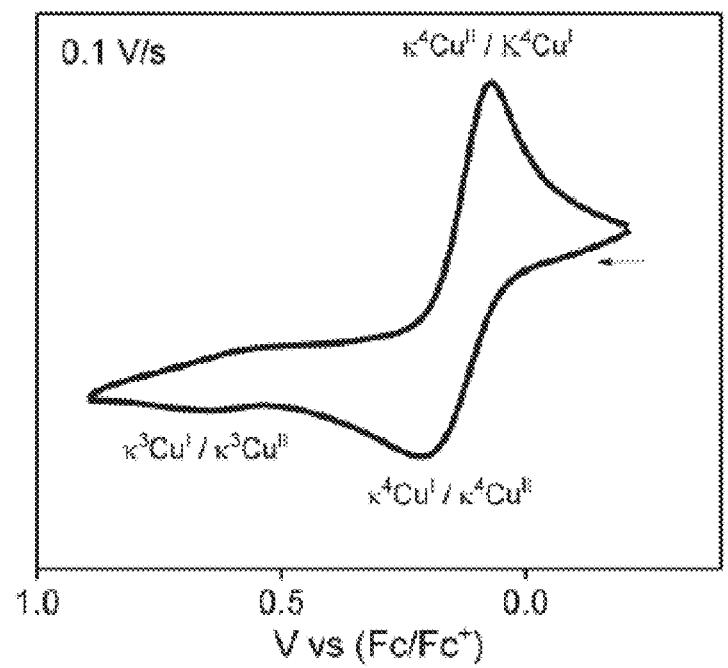
FIG. 26A is a cyclic voltammogram of Cu5 at scan rates of 0.1 V/s.
Figure 26B:
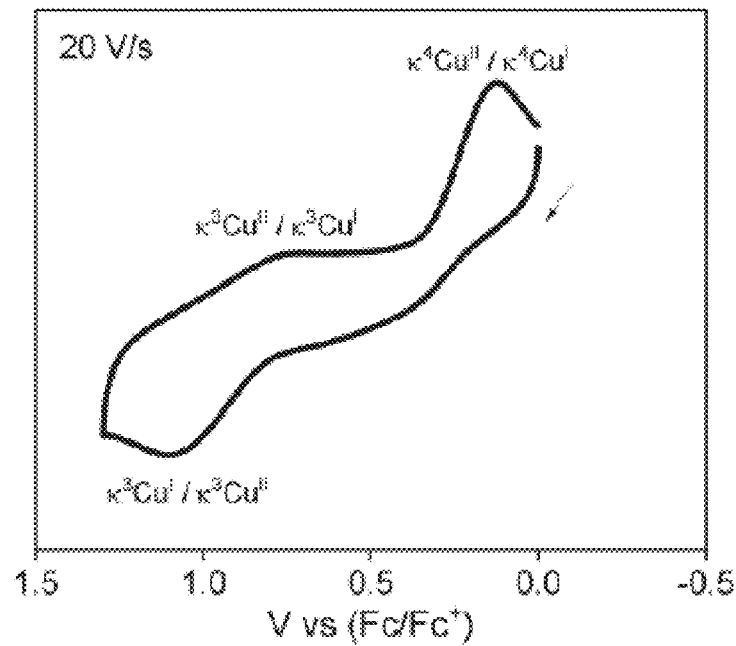
FIG. 26B is a cyclic voltammogram of Cu5 at scan rates of 20 V/s.
Figure 27A:
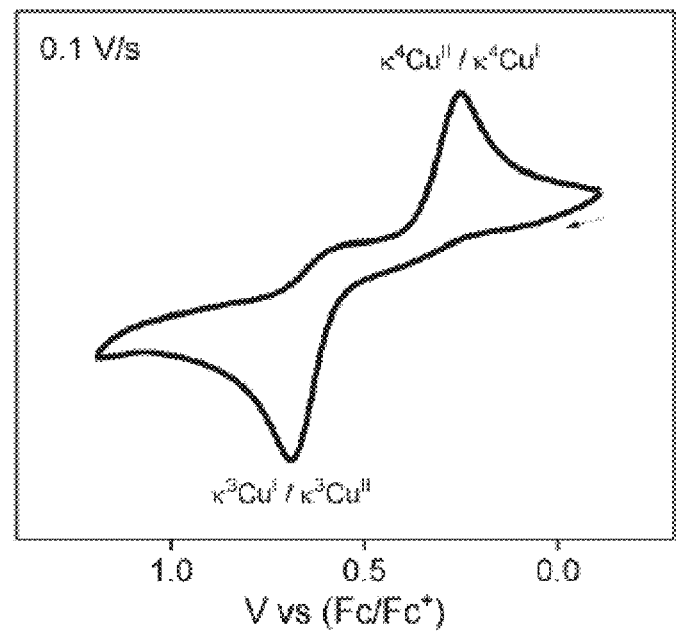
FIG. 27A is a cyclic voltammograms of Cu6 at scan rate of 0.1 V/s.
Figure 27B:
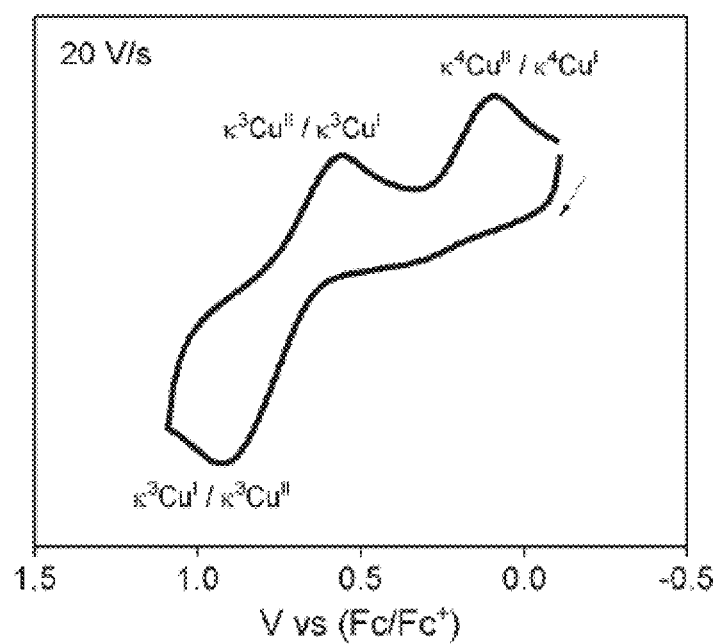
FIG. 27B is a cyclic voltammograms of Cu6 at scan rate of 20 V/s.

$^1$H NMR spectrum of Cu6 is shown in FIG. 23, and intensity of signal A and B as a function of tau interval is shown in FIG. 24.

VI. CYCLIC VOLTAMMETRY

The cyclic voltammograms of complexes Cu3-6 reflect the sterics-dependent conformational behavior of these complexes consistent with their solution NMR studies.

Complexes with less bulky N-Me and N-nPr substituents, which exist in a solution as a mixture of κ4 and κ3-isomers, show one quasireversible wave corresponding to more easily oxidized κ4-isomer. Although the separation between forward and reverse peaks is somewhat larger than 59 mV, such behavior is typically assigned to only minor changes in RN4 ligand conformation.8, 10 This is consistent with previous results showing that upon oxidation to $Cu^{II}$, RN4 coordinates in a κ4-fashion, even for bulky tBu-substituted ligand.10b The behavior does not change significantly when compared at slow and fast scan rates due to high fraction of κ4-isomer already present in the equilibrium mixture.

By contrast, CV's of more bulky complexes Cu5 and Cu6, which are present in a solution predominantly as κ3-isomers according to NMR, show scan-rate dependent behavior. At high scan rates, higher potential oxidation wave is observed for a major κ3-isomer. The separation between forward and reverse peaks is 0.54 V, indicative of significant conformational changes in the ligand (κ3- to κ4-coordination in CuII).8, 10b At lower scan rate, the rate of isomer interconversion (between κ3-CuI and κ4-CuI) is comparable to the cyclic voltammetry experiment timescale for Cu5, and a lower potential wave becomes observable for a minor, but more easily oxidized, κ4-CuI. At the same time, even at slow scan rates, κ4-CuI wave is not detected for tBu-substituted Cu6.

Scheme S9. Isomer interconversion in complexes Cu3-6.

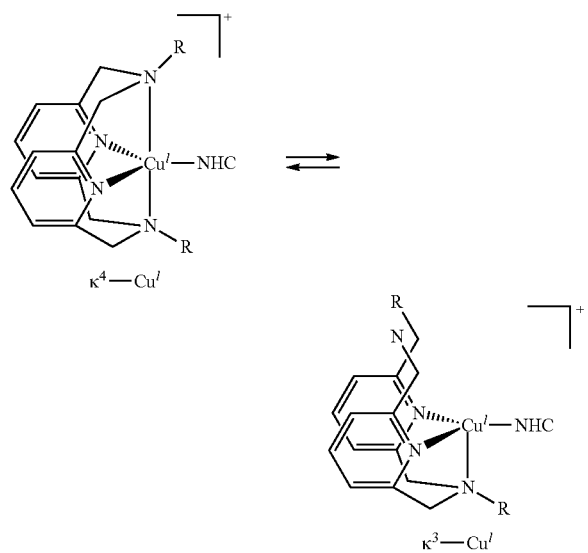

TABLE S1

Electrochemical properties of Cu3-6 (1 mM).[a]

| Complex | R | $E_{pa1}$ (V vs. Fc) | $E_{pc1}$ (V vs. Fc) | $\Delta E_p$ (mV)[b] |
|---|---|---|---|---|
| Cu3 | Me | +0.05 | −0.15 | 0.20 |
| Cu4 | n-Pr | +0.05 | −0.14 | 0.19 |
| Cu5 | i-Pr | +0.21 | +0.07 | 0.14 |
| Cu6 | t-Bu | +0.74 | +0.20 | 0.54 |

[a]1 mM solution of complex in 0.1M solution of $^nBu_4NPF_6$ as a supporting electrolyte in $CH_2Cl_2$ at 23° C., Pt disk electrode (d = 1.6 mm), all potentials were references vs. ferrocene.
[b]The peak-to-peak separation $\Delta E_p$ was calculated as $E_{pa1} - E_{pc1}$.

Cyclic voltammograms of Cu3 to Cu6 are shown in FIG. 25A to FIG. 27B.

VII. PHOTOPHYSICAL PROPERTIES OF COMPLEXES AND POLYMER FILMS

Figure 28:
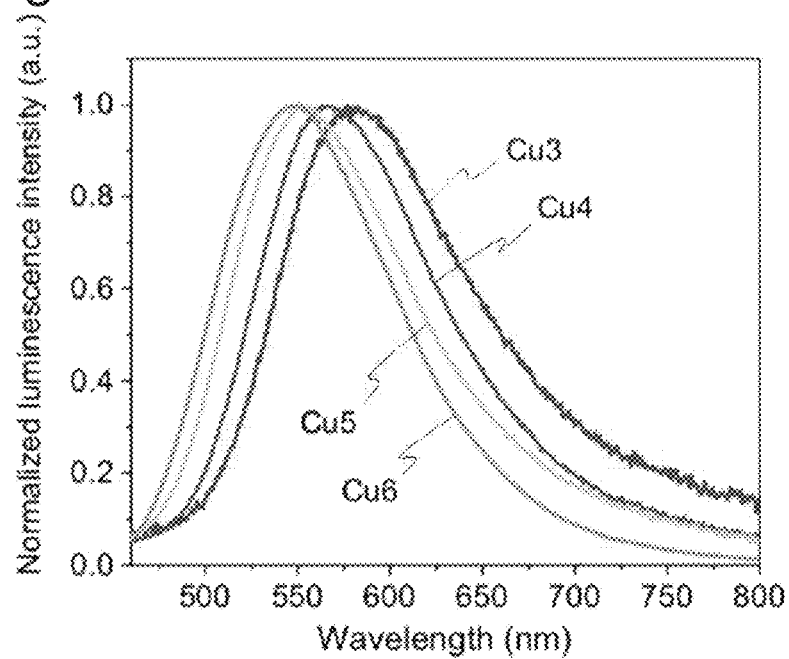
FIG. 28 is an emission spectrum of Cu3 to Cu6 in dichloromethane at 25° C.
Figure 29:
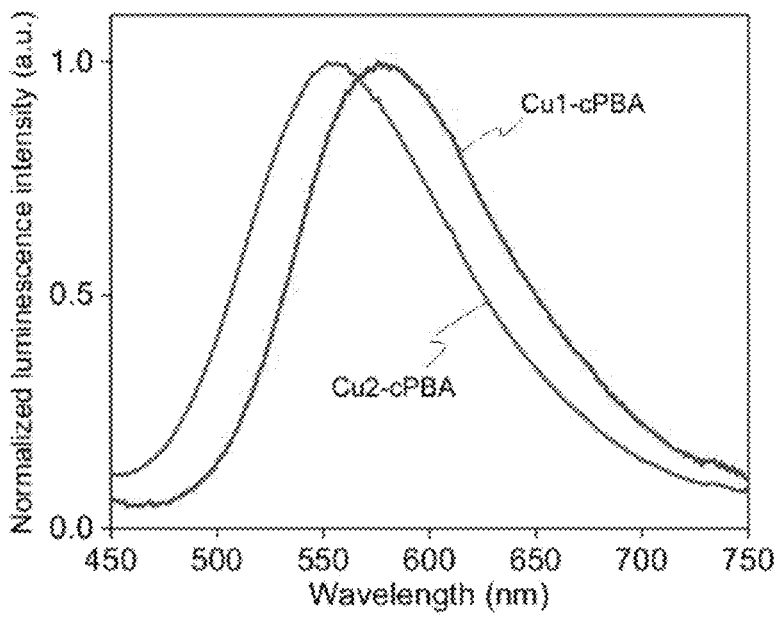
FIG. 29 is an emission spectrum of Cu1-cPBA and Cu2-cPBA at 25° C.
Figure 30:
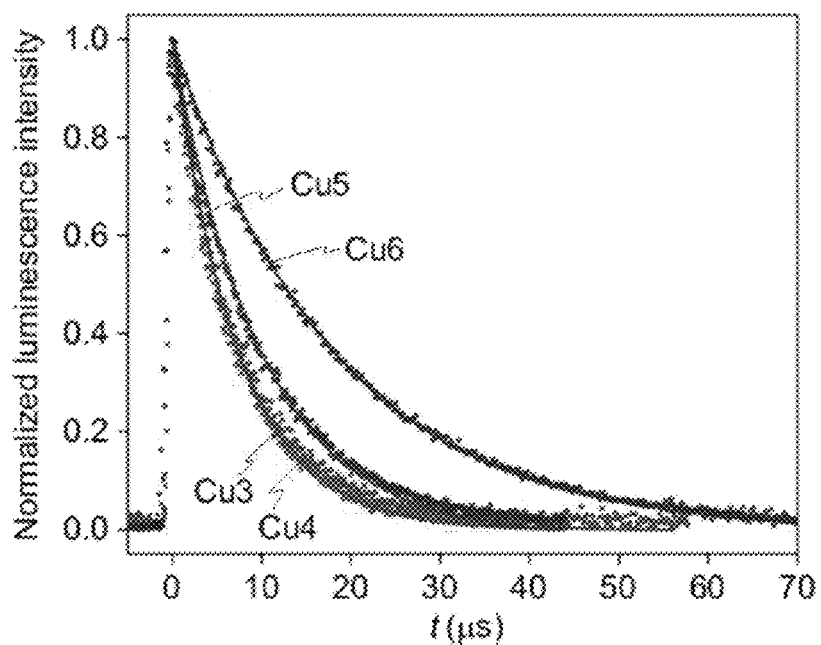
FIG. 30 is a normalized photoluminescence decay profile of Cu3 to Cu6 in dichloromethane (5×10$^{-5}$ M) at 25° C.
Figure 31:
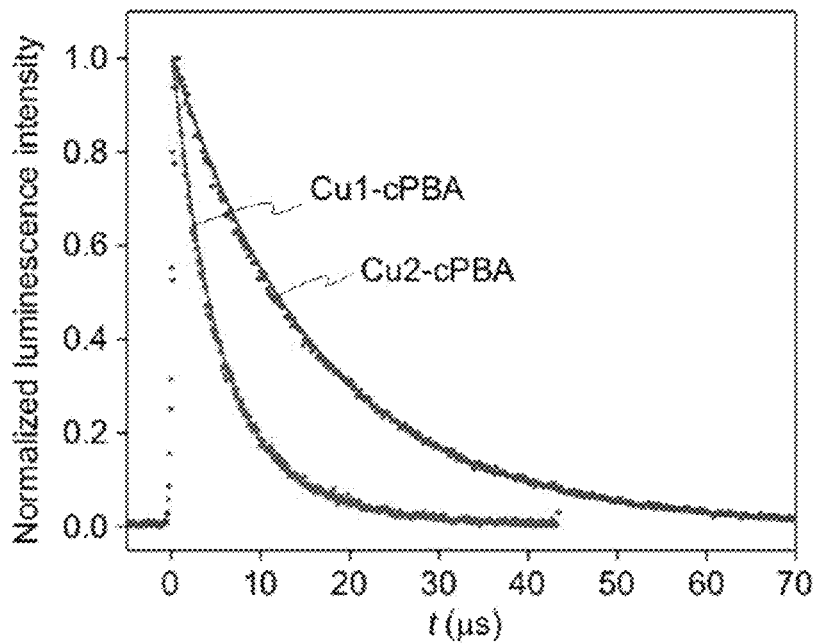
FIG. 31 is a normalized photoluminescence decay profile of Cu1-cPBA and Cu2-cPBA at 25° C.

Emission spectra of Cu3 to Cu6, Cu1-cPBA, Cu2-cPBA are shown in FIG. 28 and FIG. 29, and normalized photoluminescence decay profile of Cu3 to Cu6 are shown in FIG. 30 and FIG. 31.

TABLE S2

Photophysical properties of Cu1-ePBA and Cu2-ePBA.[a]

| Sample | $\lambda_{max}$ (nm)[b] | PLQY | τ (μs)[c] | $k_r(s^{-1})^d \cdot 10^{-4}$ | $k_{nr}(s^{-1})^e \cdot 10^{-4}$ |
|---|---|---|---|---|---|
| Cu1-cPBA | 584 | 0.075 | 7.17 | 1.05 | 12.9 |
| Cu2-cPBA | 560 | 0.27 | 17.4 | 1.55 | 4.20 |

[a]All measurements were performed with excitation at 380 nm.
[b]Emission maximum.
[c]Emission lifetime at 298K
[d]Radiative decay rate constants were estimated as PLQY/τ.
[e]Non-radiative decay rate constants were calculated as $k_r \cdot (1 - PLQY)/PLQY$.

VIII. PHOTOLUMINESCENCE INTENSITY MEASUREMENTS IN RESPONSE TO MECHANICAL STRESS

Figure 5:
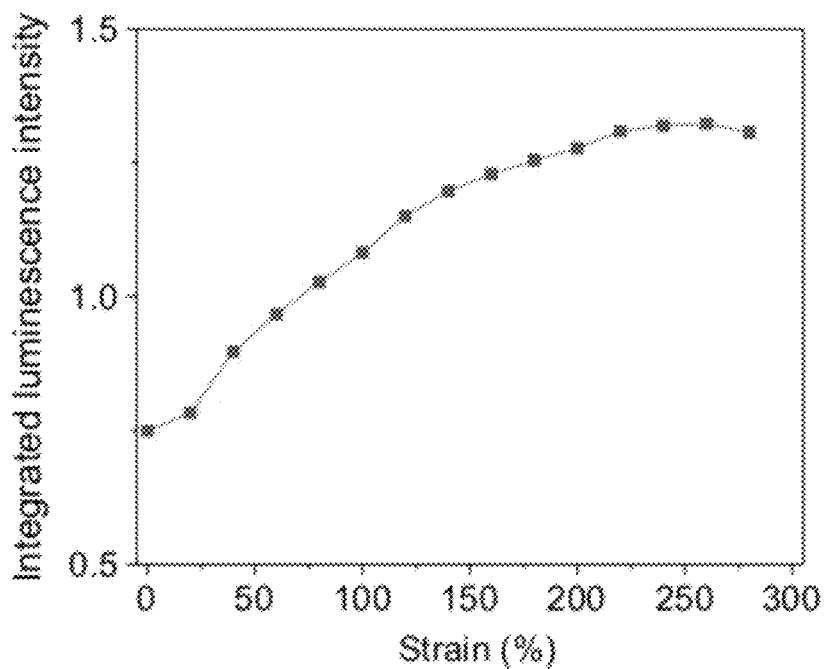
FIG. 5 is a plot of integrated photoluminescence intensity vs. strain of Cu1-cPBA.
Figure 6A:
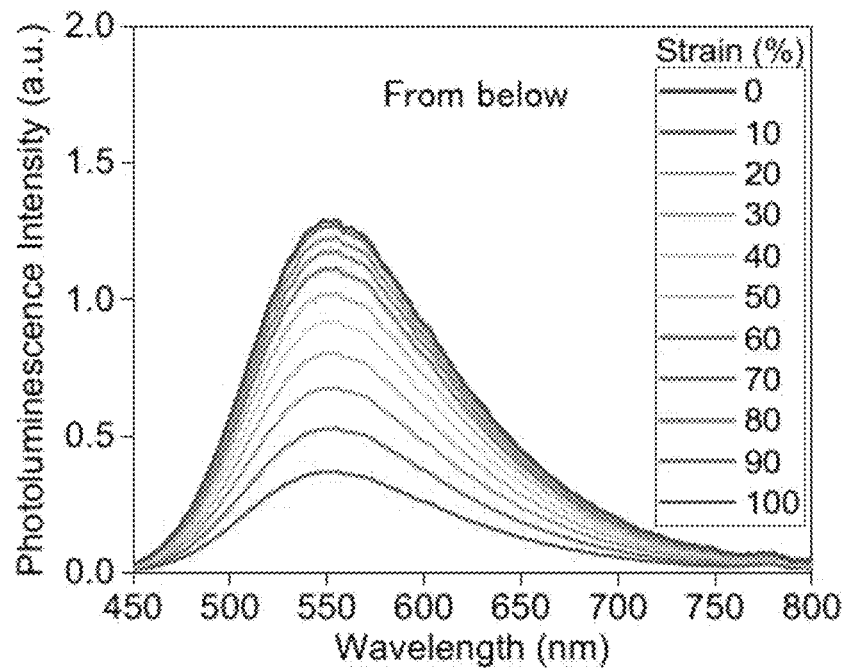
FIG. 6A is an emission spectrum of Cu2-cPBA at variable strain.
Figure 6B:
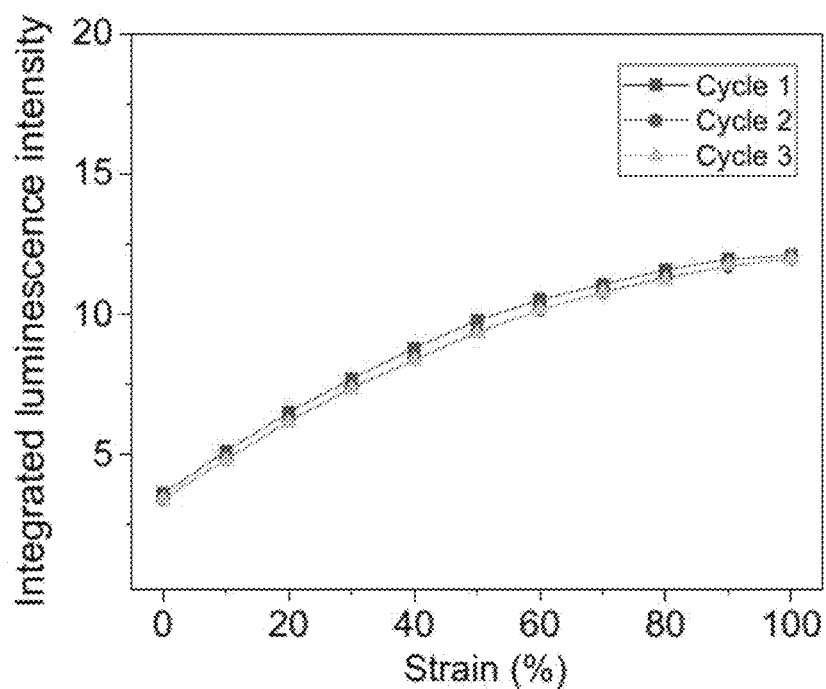
FIG. 6B is a plot of integrated photoluminescence intensity vs. strain of Cu2-cPBA.
Figure 32:
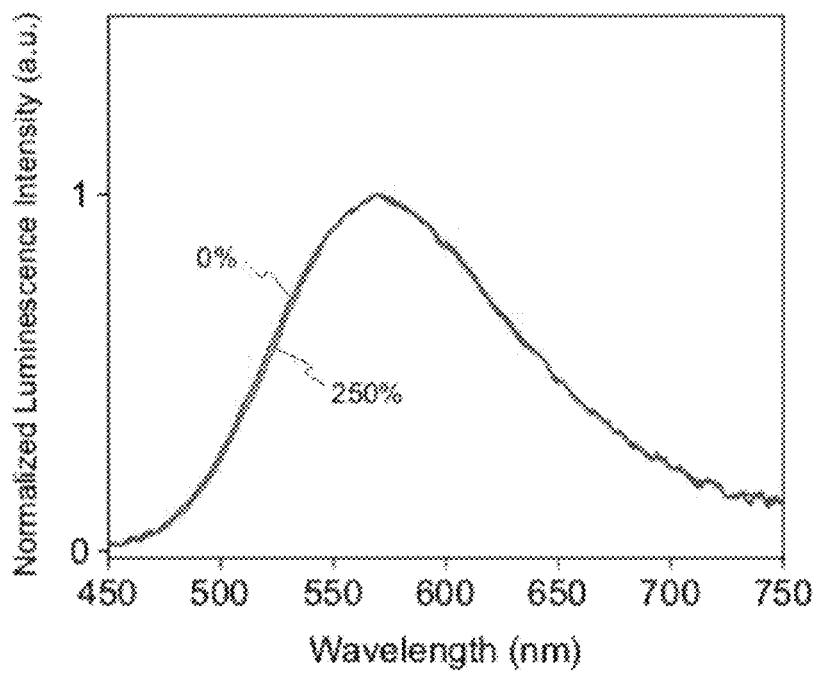
FIG. 32 is a normalized emission spectrum of Cu1-cPBA at 0% and 250% of strain.
Figure 33:
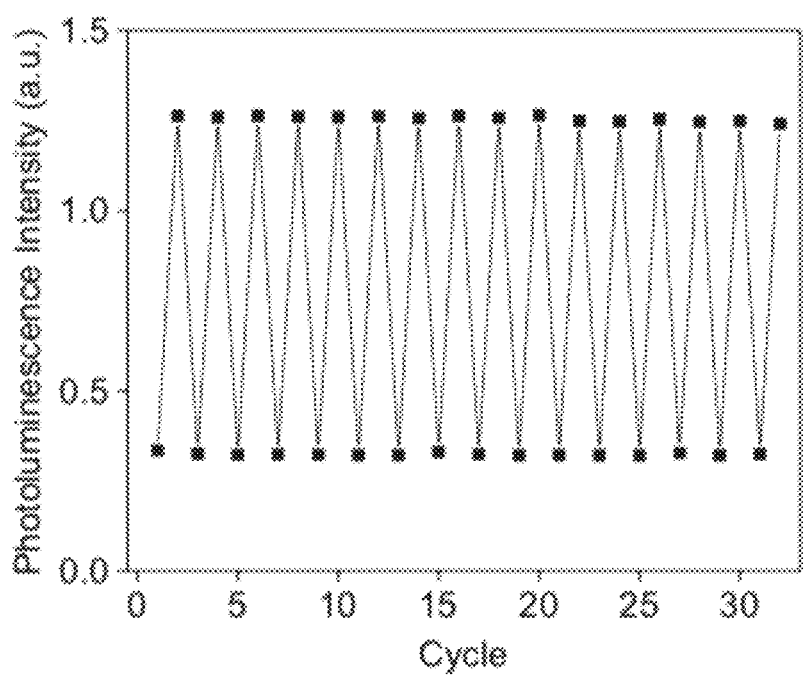
FIG. 33 is a graph showing photoluminescence intensity change of Cu2-cPBA during repeated stretching.
Figure 34:
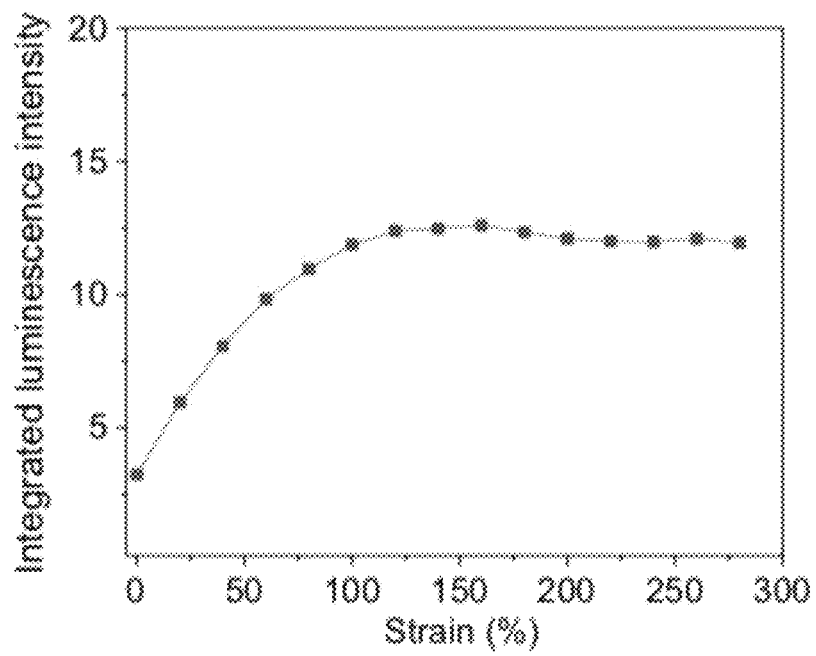
FIG. 34 is a plot of integrated photoluminescence intensity vs. strain of Cu2-cPBA.
Figure 35:
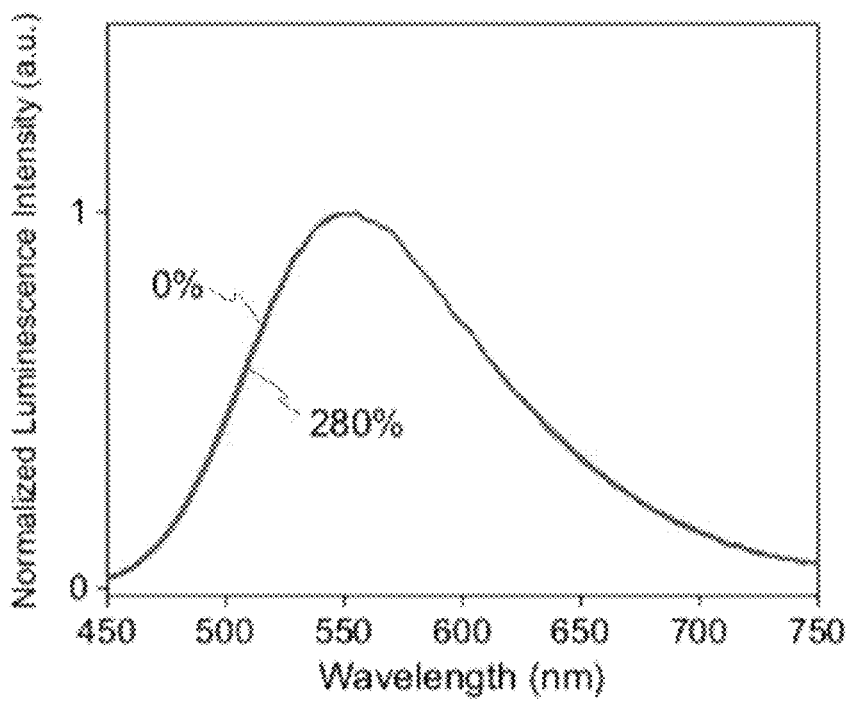
FIG. 35 is a normalized emission spectrum of Cu2-cPBA at 0% and 280% of strain.
Figure 36A:
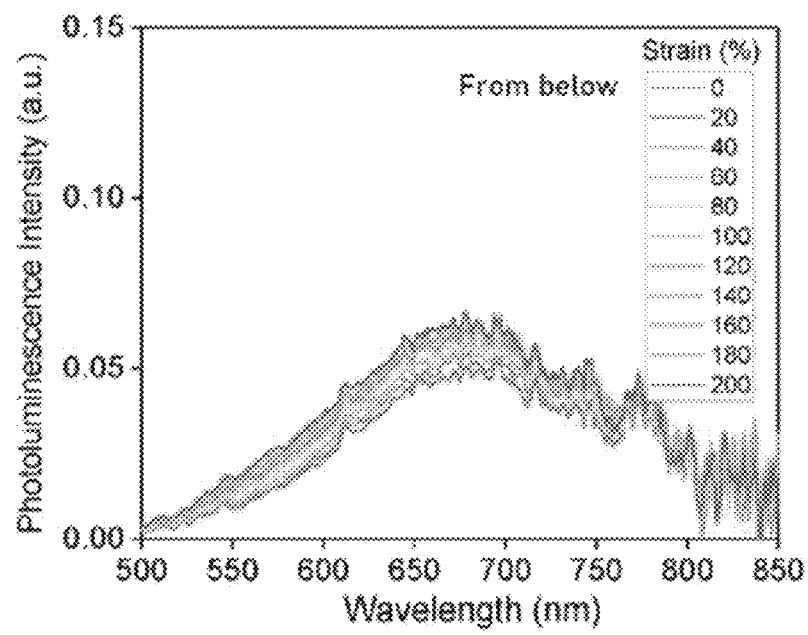
FIG. 36A is an emission spectrum of the control experiments using mechanical mixtures of reference hexamethylene diacrylate-crosslinked poly(butyl acrylate) mixed with 1 wt % of Cu4 during stretching.
Figure 36B:
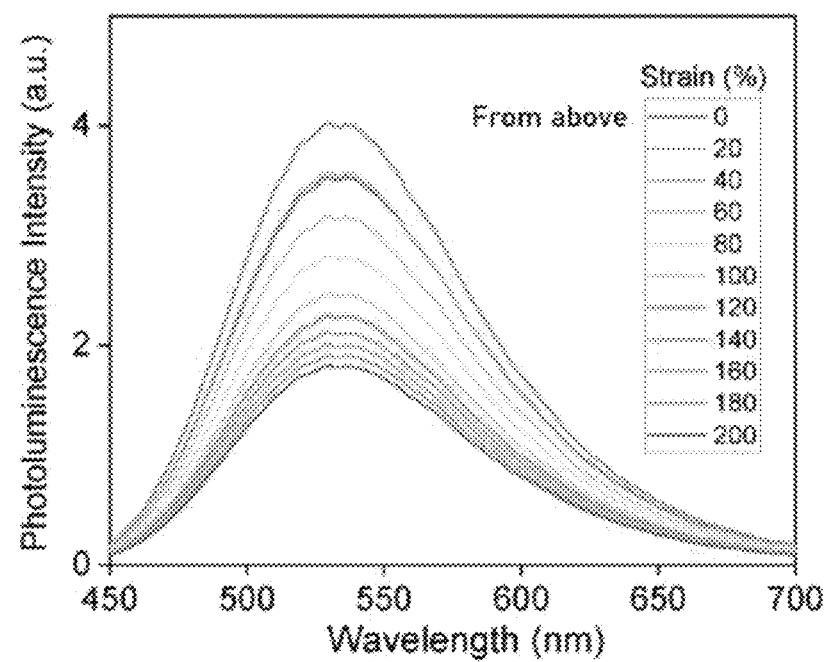
FIG. 36B is an emission spectrum of the control experiments using mechanical mixtures of reference hexamethylene diacrylate-crosslinked poly(butyl acrylate) mixed with 1 wt % of Cu6 during stretching.
Figure 37A:
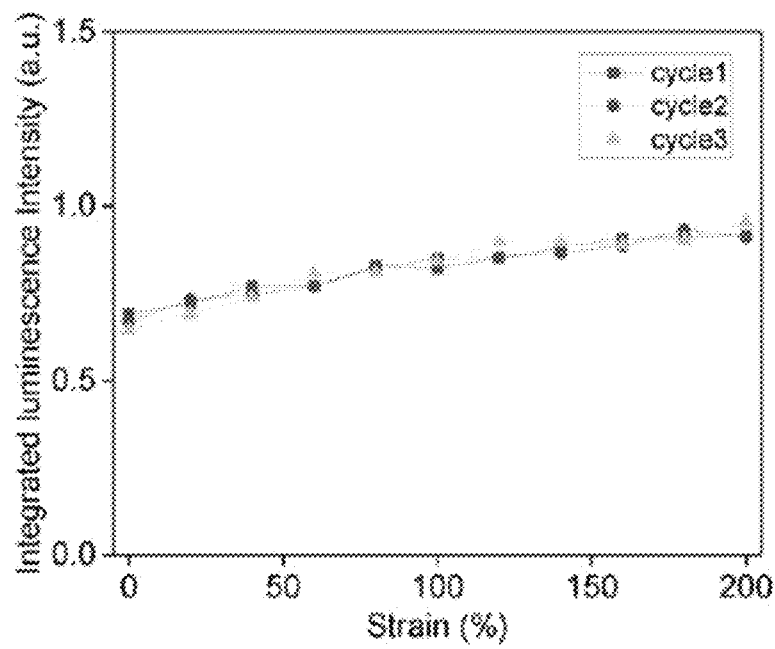
FIG. 37A is a plot of integrated photoluminescence intensity vs strain of the control experiments using mechanical mixture of reference hexamethylene diacrylate-crosslinked poly(butyl acrylate) and 1 wt % of Cu4.
Figure 37B:
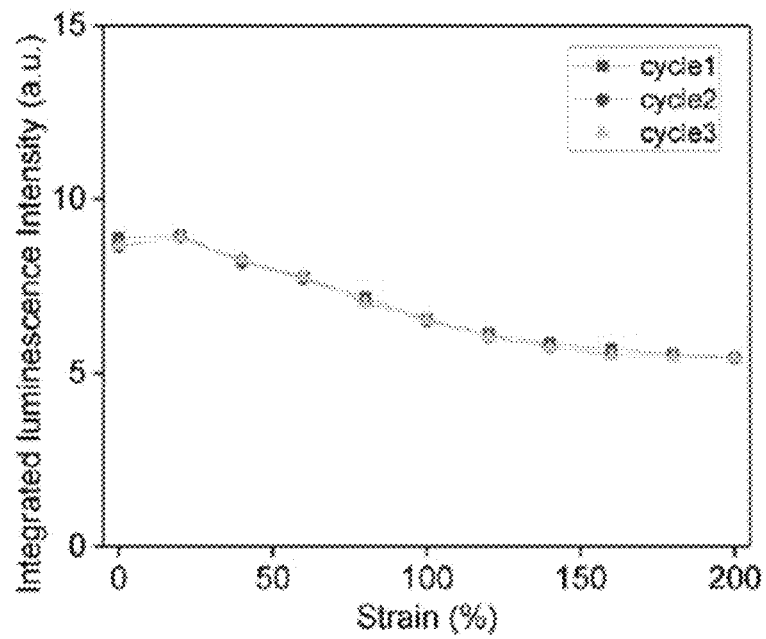
FIG. 37B is Plot of integrated photoluminescence intensity vs strain of the control experiments using mechanical mixture of reference hexamethylene diacrylate-crosslinked poly(butyl acrylate) and 1 wt % of Cu6.

Plot of integrated photoluminescence intensity vs. strain of Cu1-cPBA is shown in FIG. 5, normalized emission spectra of Cu1-cPBA at 0% and 250% of strain is shown in FIG. 32, change of photoluminescence intensity of Cu2-cPBA during stretching is shown in FIG. 6A and FIG. 6B, photoluminescence intensity change of Cu2-cPBA during repeated stretching is shown in FIG. 33, plot of integrated photoluminescence intensity vs. strain of Cu2-cPBA is shown in FIG. 34, normalized emission spectra of Cu2-cPBA at 0% and 280% of strain is shown in FIG. 35, emission spectra of the control experiments using mechanical mixtures of reference hexamethylene diacrylate-crosslinked poly(butyl acrylate) mixed with 1 wt % of Cu4 during stretching is shown in FIG. 36A and FIG. 36B, and plot of integrated photoluminescence intensity vs strain of the control experiments using mechanical mixture of reference hexamethylene diacrylate-crosslinked poly(butyl acrylate) and 1 wt % of Cu4 and Cu6 is shown in FIG. 37A and FIG. 37B.

The decrease observed in sample with incorporated Cu6 can be explained by decreasing luminophore density on the film upon stretching. Although small increase of the PL intensity is observed for sample shown in FIG. 37A, these changes are minor compared to Cu1-cPBA and Cu2-cPBA.

IX. AIR STABILITY

Figure 11A:
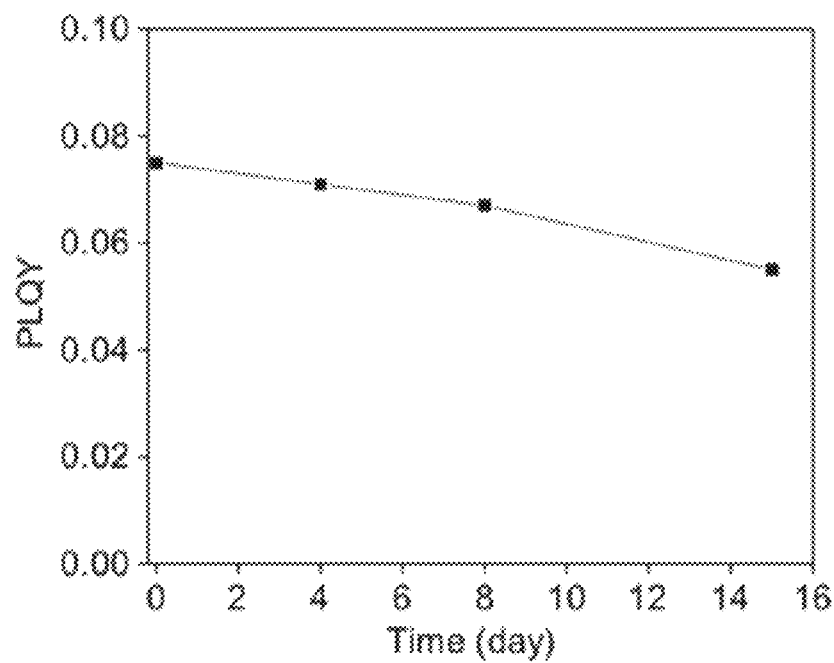
FIG. 11A is a graph showing PLQY of Cu1-cPBA after exposing to air.
Figure 11B:
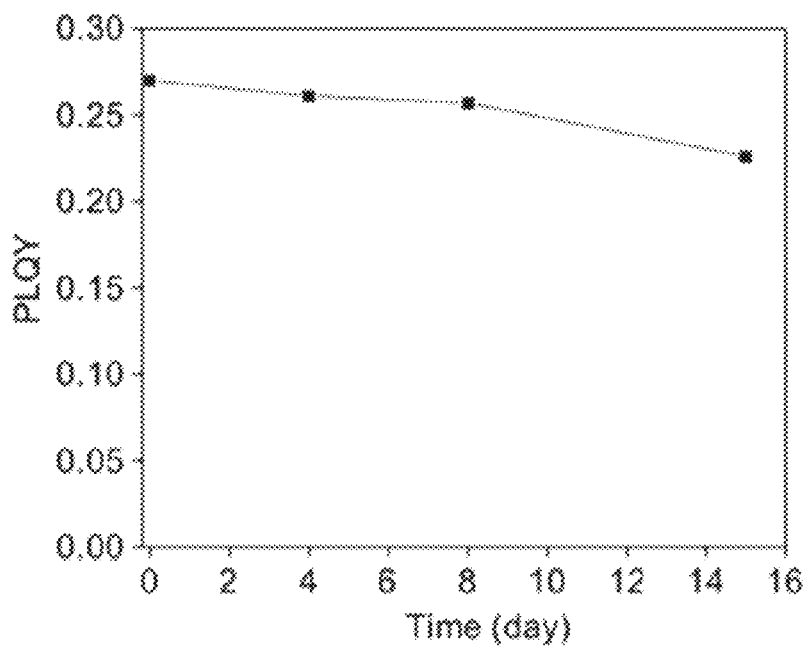
FIG. 11B is a graph showing PLQY of Cu2-cPBA after exposing to air.
Figure 12:
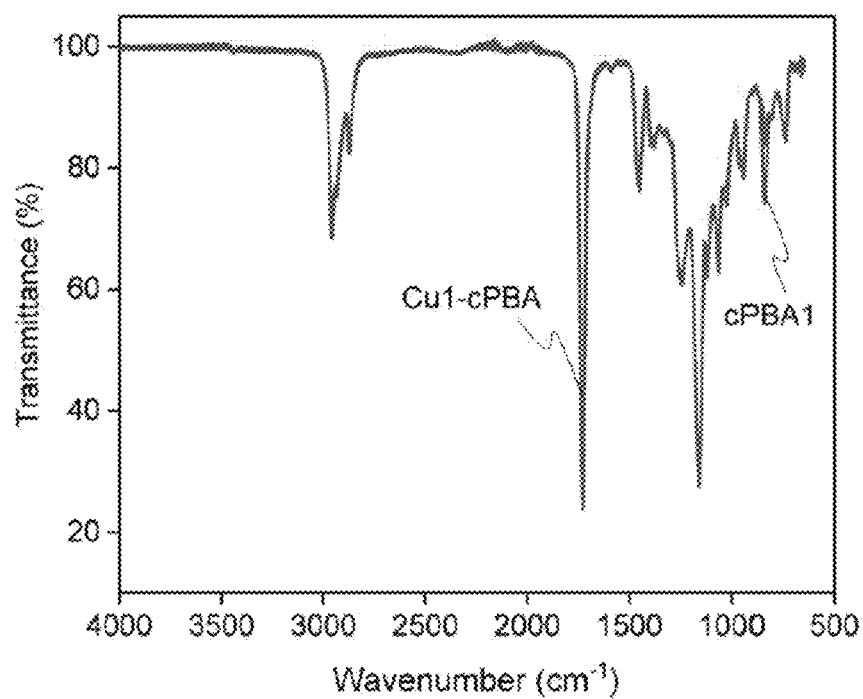
FIG. 12 is a FT-IR spectrum of cPBA1 and Cu1-cPBA.
Figure 13:
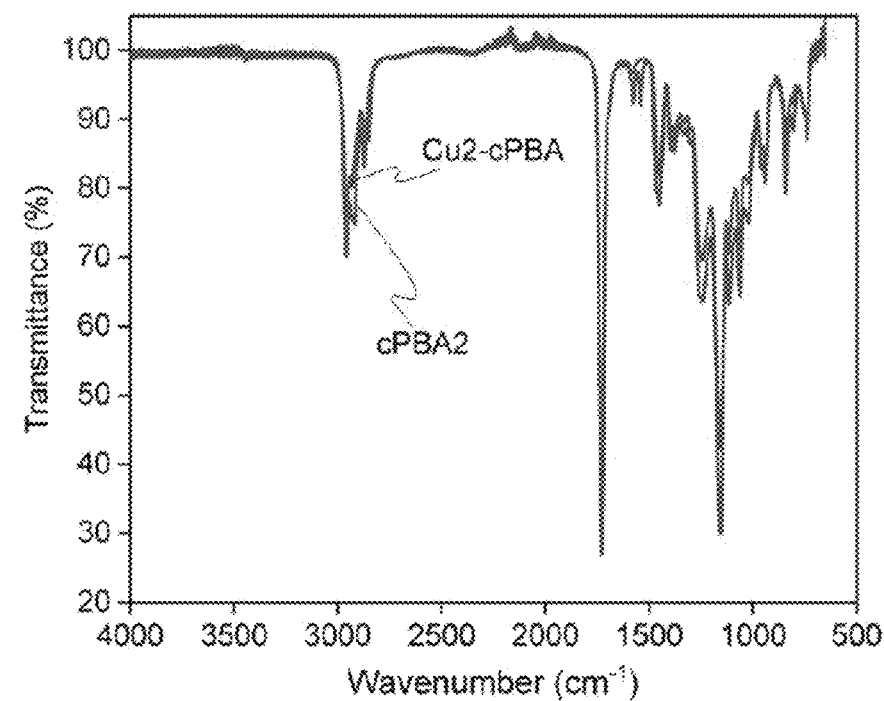
FIG. 13 is a FT-IR spectrum of cPBA2 and Cu2-cPBA.
Figure 14:
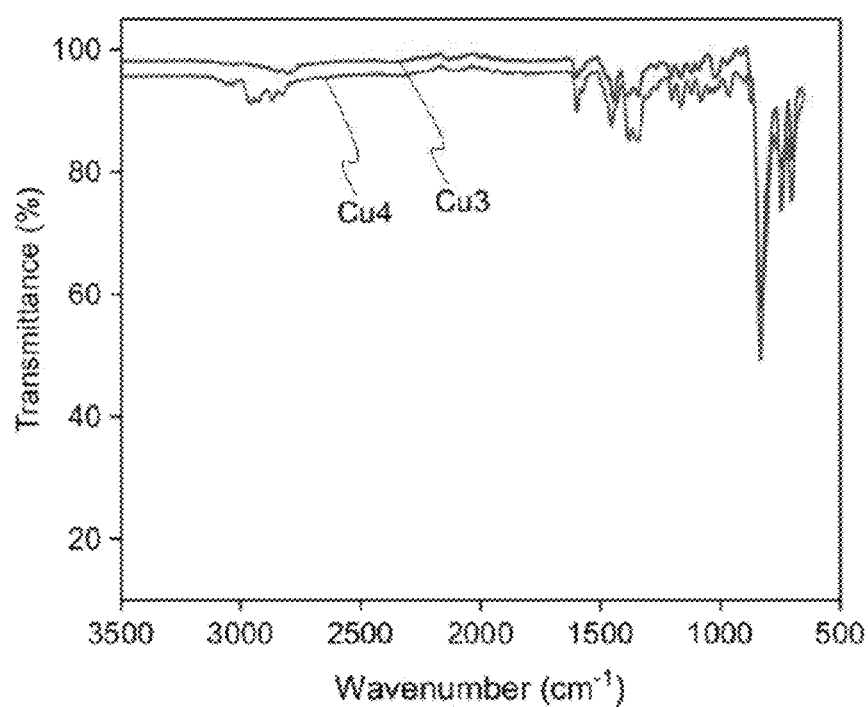
FIG. 14 is a FT-IR spectrum of Cu3 and Cu4.
Figure 15:
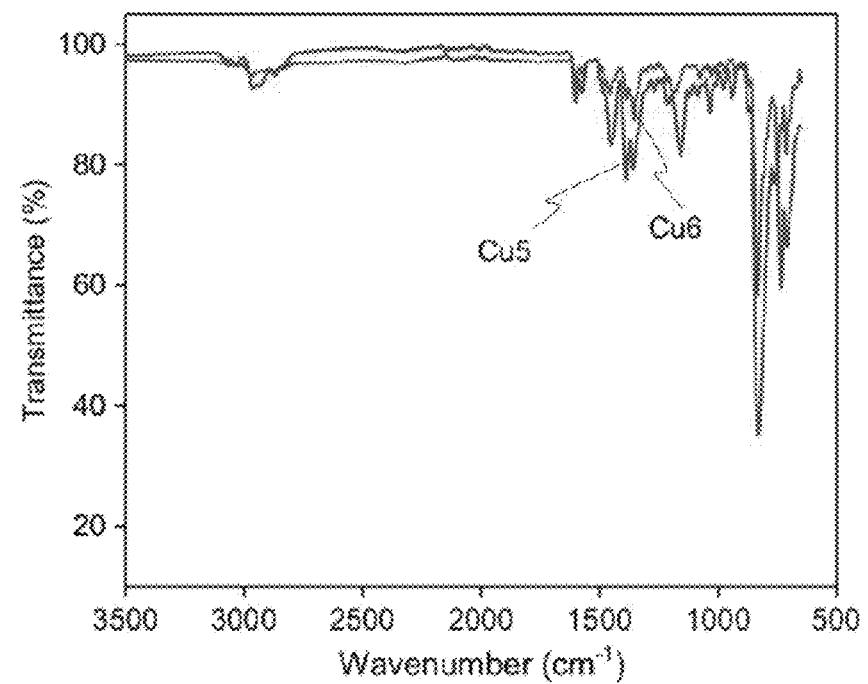
FIG. 15 is a FT-IR spectrum of Cu5 and Cu6.

The films were placed on quartz dishes and kept in air under room light at ambient temperature. The samples were purged with a nitrogen gas for 30 min before measuring PLQY in integrating sphere. The PLQYs were measured under a nitrogen gas flow and was determined as an average of measurements for the three films. PLQY of Cu1-cPBA and Cu2-cPBA are shown in FIG. 11A and FIG. 11B.

Figure 38A:
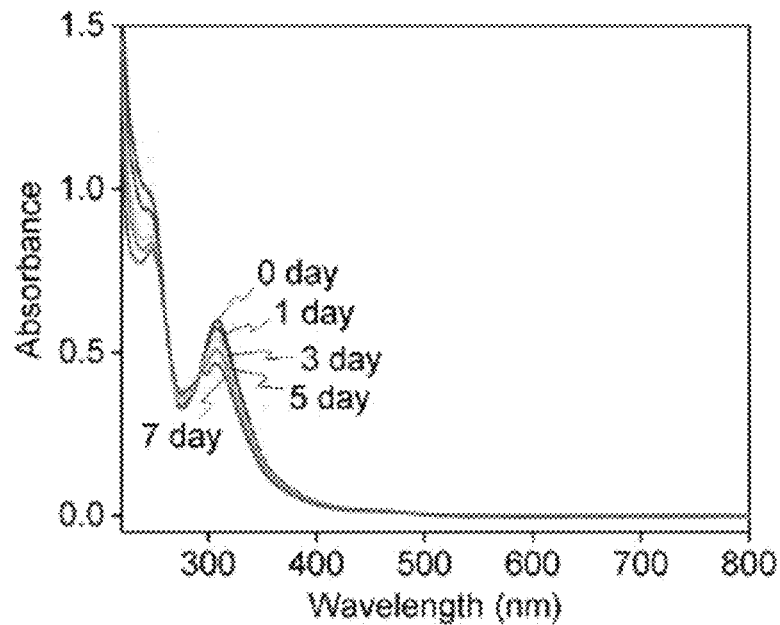
FIG. 38A is a time-dependent UV-vis absorption spectrum of Cu4 in air-saturated THF.
Figure 38B:
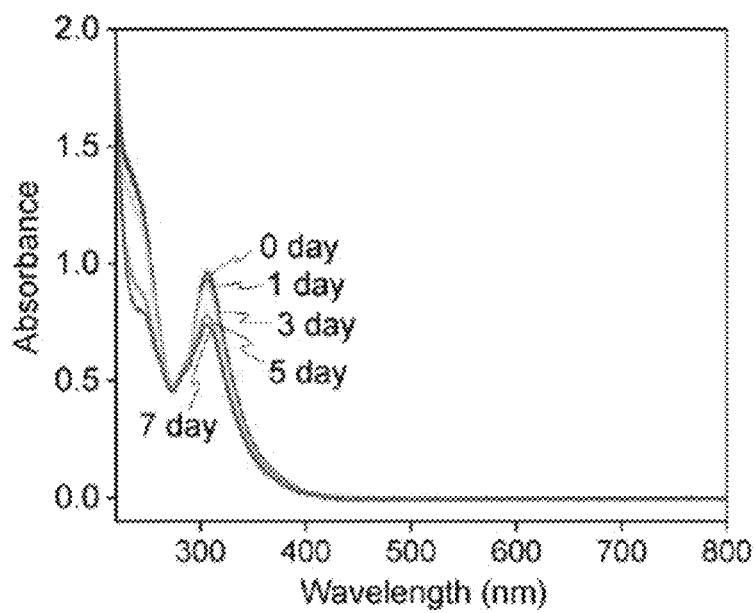
FIG. 38B is a time-dependent UV-vis absorption spectrum of Cu6 in air-saturated THF.

The air-saturated THF solutions of Cu4 and Cu6 in quartz cuvette were kept under at ambient temperature and UV/vis spectra were periodically recorded. Time-dependent UV-vis absorption spectra of Cu4 and Cu6 are shown in FIG. 38A and FIG. 38B.

X. MECHANICAL PROPERTIES

Figure 2:
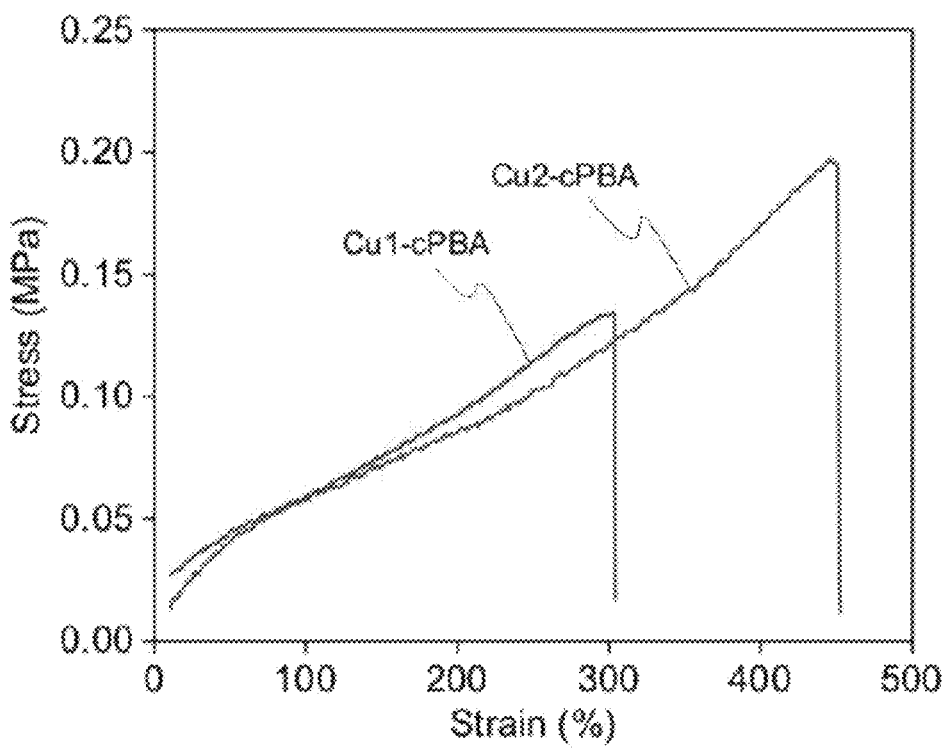
FIG. 2 is a representative stress-strain curve of Cu1-cPBA and Cu2-cPBA.

Representation stress-strain curve of Cu1-cPBA and Cu2-cPBA are shown in FIG. 2.

TABLE S3

Mechanical properties of Cu1-cPBA and Cu2-cPBA.

| Sample | Stress at break [MPa] | Strain at break [%] |
|---|---|---|
| Cu1-cPBA | 0.13 ± 0.017 | 323 ± 12 |
| Cu2-cPBA | 0.19 ± 0.022 | 476 ± 29 |

XI. DSC ANALYSIS

Figure 39:
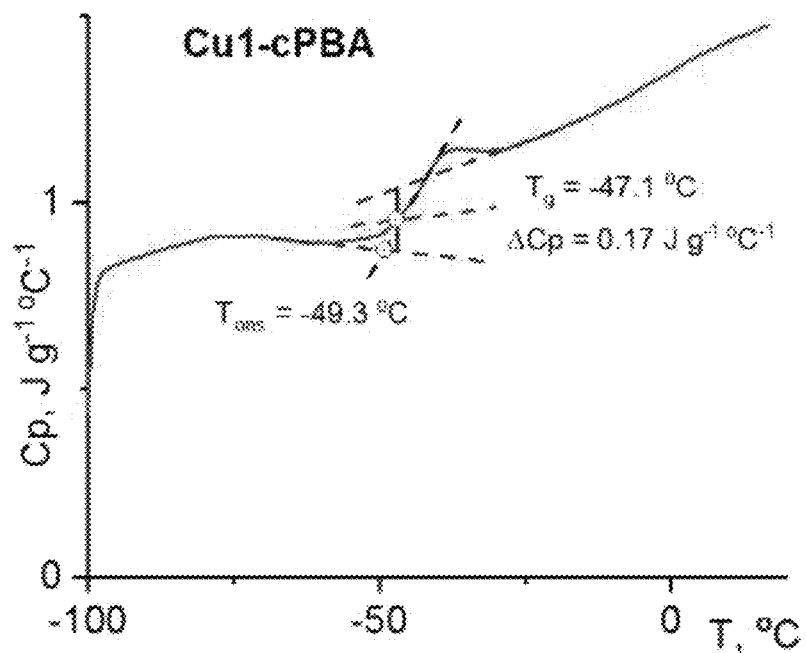
FIG. 39 is a DSC curve of Cu1-cPBA.
Figure 40:
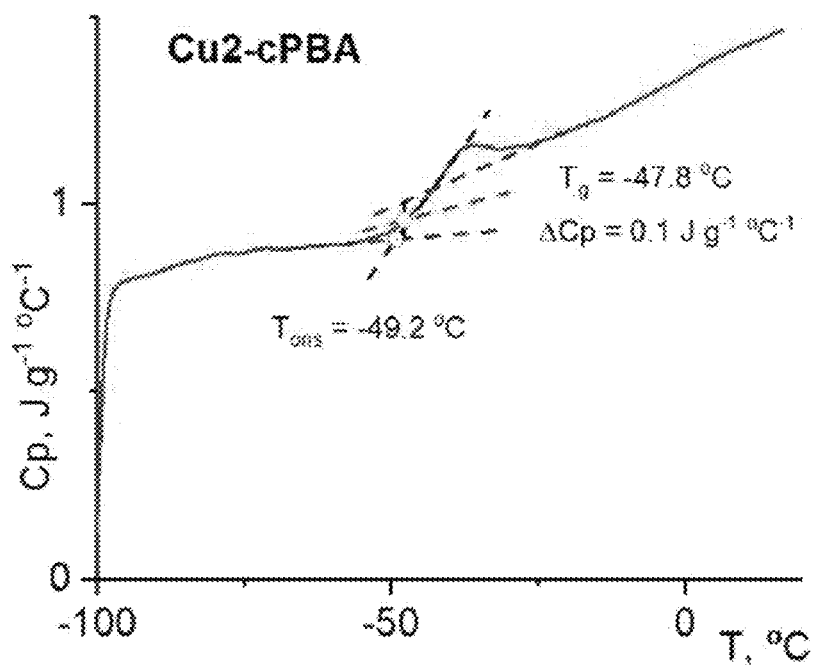
FIG. 40 is a DSC curve of Cu2-cPBA.

DSC curves of Cu1-cPBA and Cu2-cPBA are shown in FIG. 39 and FIG. 40.

XII. IMAGING ANALYSIS

Imaging analysis of Cu2-cPBA is shown in FIG. 8, and imaging analysis of control experiment are shown in FIG. 9 and FIG. 10.

XIII. X-RAY STRUCTURE DETERMINATION DETAILS

The X-ray diffraction data for the single crystals were collected on a Rigaku XtaLab PRO instrument (K-goniometer) with a PILATUS3 R 200K hybrid pixel array detector using MoKα (0.71073 Å) radiation monochromated by means of multilayer optics. The performance mode of a MicroMax™-003 microfocus sealed X-ray tube was 50 kV, 0.60 mA. The diffractometer was equipped with a Rigaku GN2 system for low temperature experiments. Suitable crystals of appropriate dimensions were mounted on loops in random orientations. Preliminary unit cell parameters were determined with three sets of a total of 10 narrow frame scans. The data were collected according to recommended strategies in an ω-scan mode. Final cell constants were determined by global refinement of reflections from the complete data sets using the Lattice wizard module. Images were indexed and integrated with "smart" background evaluation using the CrysAlisPro data reduction package (1.171.39.46, Rigaku Oxford Diffraction, 2018). Analysis of the integrated data did not show any decay. Data were corrected for systematic errors and absorption using the ABSPACK module: Numerical absorption correction based on Gaussian integration over a multifaceted crystal model and empirical absorption correction based on spherical harmonics according to the point group symmetry using equivalent reflections. The GRAL module and the ASSIGN SPACEGROUP routine of the WinGX suite were used for analysis of systematic absences and space group determination. The structures were solved by the direct methods using SHELXT-2018/2[11] and refined by the full-matrix least-squares on F2 using SHELXL-2018/3,[12] which uses a model of atomic scattering based on spherical atoms. Calculations were mainly performed using the WinGX-2018.3 suite of programs.[13] Non-hydrogen atoms were refined anisotropically. The positions of the hydrogen atoms of methyl groups were found using a rotating group refinement with idealized tetrahedral angles. The hydrogen atoms were inserted at the calculated positions and refined as riding atoms. The disorder, if present, was resolved using free variables and reasonable restraints on geometry and anisotropic displacement parameters. The structure of complex Cu6 was refined as a 2-component twin with the fractional volume contribution of 0.4476(81) for the minor component; the twin law was (1.00 0.00 0.00, 0.00 −1.00 0.00, 0.00 0.00 −1.00). All the compounds studied have no unusual bond lengths and angles. Absolute structure of complexes Cu5 and Cu6 was determined on the basis of the Flack parameter.[14]

The $τ4'$ parameters[15] for tetracoordinate Cu centers in the studied complexes are 0.57 (Cu3), 0.63 (Cu4), 0.62 (Cu5), and 0.63 (Cu6) indicative of a noticeable distortion from the ideal tetrahedral geometry where $τ4'$ value equal to 1 is expected. In all the complexes, the pyridinophane ligands adopt a syn-boat-chair conformation. An important feature of the studied crystalline complexes is the tight placement of the aromatic units within the pyridinophane ligands that may enable the intramolecular r-r interaction between these pyridine rings: centroid-centroid distance of 3.3094(6) Å (Cu3), 3.5510(6) Å (Cu4), 3.6498(18) Å (Cu5), and 3.3392(12) Å (Cu6); angle of 25.34(4)° (Cu3), 36.31(4)° (Cu4), 41.81(10)° (Cu5), and 27.55(7)° (Cu6); shift distance of 0.8091(15) Å (Cu3), 1.0034(18) Å (Cu4), 1.328(5) Å (Cu5), and 0.765(3) Å (Cu6). Additionally, compound Cu3 demonstrates the intermolecular r-r interactions between pyridine Py(2) rings {symmetry operation: 2-x, 1-y, -z; centroid-centroid distance of 3.6567(9) Å, angle of 0.000(8)°, and shift distance of 1.5262(17) Å} and between aromatic moieties C(1-7)N(5-6) {symmetry operation: 1-x, 1-y, -z; centroid-centroid distance of 3.9430(7) Å, angle of 0.000(7)°, and shift distance of 2.0872(12) Å}. The intermolecular r-r interaction between phenyl C(52-57) and pyridine Py(2) rings was found in the crystal structure of Cu4: symmetry operation: x+1, y, z; centroid-centroid distance of 3.8736(6) Å, angle of 18.15(4)°, and shift distance of 1.1666(17) Å. The intermolecular r-r interaction between aromatic C(2-7) and pyridine Py(1) rings can be found in the crystal structure of Cu5: symmetry operation: x, 1-y, z-0.5; centroid-centroid distance of 3.7156(18) Å, angle of 13.45(11)°, and shift distance of 1.189(5) Å. Notably, no intermolecular π-π interactions were found in the case of complex Cu6. Structures of the cationic part of the investigated complexes in the crystalline phase and accepted partial numbering are presented as ORTEP diagrams in FIGS. S73-S76.

Deposition numbers 1903712, 1903713, 1937851, and 1937852 contain the supplementary crystallographic data of complexes Cu4, Cu6, Cu3, and Cu5, respectively, for this paper. These data are provided free of charge by the joint Cambridge Crystallographic Data Centre and Fachinformationszentrum Karlsruhe Access Structures service www.ccdc.cam.ac.uk/structures.

Crystallographic Data for Cu3.

$C_{37}H_{38}CuN_6^{1+}$ $F_6P^{1-}$, yellow prism (0.363×0.250×0.162 mm3), formula weight 775.24; monoclinic, P2₁/c (No. 14), a=15.83319(17) Å, b=17.71151(19) Å, c=12.63601(15) Å, β=97.3523(10)°, V=3514.38(7) Å3, Z=4, Z'=1, T=93(2) K, dcalc=1.465 g cm-3, ρ(MoKα)= 0.736 mm-1, F(000)=1600; Tmax/min=1.000/0.401; 130963 reflections were collected (2.260°≤θ≤33.508°, index ranges: −24≤h≤23−27≤k≤27, −19≤l≤18), 13162 of which were unique, Rint=0.0465, Rσ=0.0218; completeness to θ of 25.242° 99.9%. The refinement of 542 parameters with 334 restraints converged to R1=0.0331 and wR2=0.0797 for 11810 reflections with I>2σ(I) and R1=0.0376 and wR2=0.0813 for all data with S=1.033 and residual electron density, ρmax/min=0.527 and −0.363 e Å-3. The crystals were grown by vapor diffusion of diethyl ether into a DCM solution at r.t.

Crystallographic Data for Cu4.

$C_{41}H_{46}CuN_6^{1+}$ $F_6P^{1-}$, yellow prism (0.443×0.347× 0.294 mm3), formula weight 831.35; triclinic, P1⁻ (No. 2), a=11.36657(18) Å, b=11.3830(2) Å, c=17.2143(2) Å, α=76.7608(13)°, β=71.4730(12)°, γ=64.7231(17)°, V=1898.30(6) Å3, Z=2, Z'=1, T=93(2) K, dcalc=1.454 g cm-3, μ(MoKα)=0.687 mm-1, F(000)=864; Tmax/min=1.000/0.188; 83923 reflections were collected (2.046°≤θ≤32.415°, index ranges: −16≤h≤16−17≤k≤16, −25≤l≤25), 12578 of which were unique, Rint=0.0444, Rσ=0.0271; completeness to θ of 25.242° 99.8%. The refinement of 498 parameters with no restraints converged to R1=0.0318 and wR2=0.0827 for 11453 reflections with I>2σ(I) and R1=0.0357 and wR2=0.0843 for all data with S=1.027 and residual electron density, ρmax/min=0.543 and −0.522 e Å-3. The crystals were grown by vapor diffusion of diethyl ether into a DCM solution at r.t.

Crystallographic Data for Cu5.

$C_{41}H_{46}CuN_6^{1+}$ $F_6P^{1-}$, yellow prism (0.180×0.086× 0.062 mm3), formula weight 831.35; monoclinic, Cc (No. 9), a=10.8787(2) Å, b=19.7204(4) Å, c=18.0429(4) Å, β=94.732(2)°, V=3857.57(14) Å3, Z=4, Z'=1, T=100(2) K, dcalc=1.431 g cm-3, μ(MoKα)=0.676 mm-1, F(000)=1728; Tmax/min=0.688/0.141; 32877 reflections were collected (2.356° 5 e 5 29.930°, index ranges: −15≤h≤14−27≤k≤27, −23≤l≤24), 9480 of which were unique, Rint=0.0338, Rσ=0.0299; completeness to θ of 25.242° 99.9%. The refinement of 564 parameters with 371 restraints converged to R1=0.0407 and wR2=0.1069 for 9149 reflections with I>2σ(I) and $R_1$=0.0421 and wR2=0.1079 for all data with S=1.083 and residual electron density, ρmax/min=0.472 and −0.501 e Å-3. Flack parameter x=0.010(9) by classical fit to all intensities. Flack parameter x=0.004(11) determined using 4041 selected quotients by Parsons' method. The crystals were grown by vapor diffusion of diethyl ether into a DCM solution at r.t.

Crystallographic Data for Cu6.

$C_{43}H_{50}CuN_6^{1+}$ $F_6P^{1-}$, yellow prism (0.236×0.118× 0.052 mm3), formula weight 859.40; orthorhombic, Pca21 (No. 29), a=20.03506(17) Å, b=13.30252(12) Å, c=15.03486(14) Å, V=4007.05(6) Å3, Z=4, Z'=1, T=93(2) K, dcalc=1.425 g cm-3, μ(MoKα)=0.653 mm-1, F(000)= 1792; Tmax/min=1.000/0.441; 172675 reflections were collected (1.838°≤θ≤32.426°, index ranges: −28≤h≤30, −19≤k≤19, −21≤l≤22), 13516 of which were unique, Rint=0.0438, Rσ=0.0206; completeness to 0 of 25.242° 100%. The refinement of 521 parameters with 1 restraint converged to R1=0.0392 and wR2=0.1009 for 13018 reflections with I>2σ(I) and R1=0.0406 and wR2=0.1018 for all data with S=1.094 and residual electron density, ρmax/min=0.516 and −0.722 e Å-3. Flack parameter x=−0.009 (70) by classical fit to all intensities. Flack parameter x=0.018(11) determined using 5904 selected quotients by Parsons' method. The crystals were grown by vapor diffusion of diethyl ether into a DCM solution at r.t.

Figure 41:
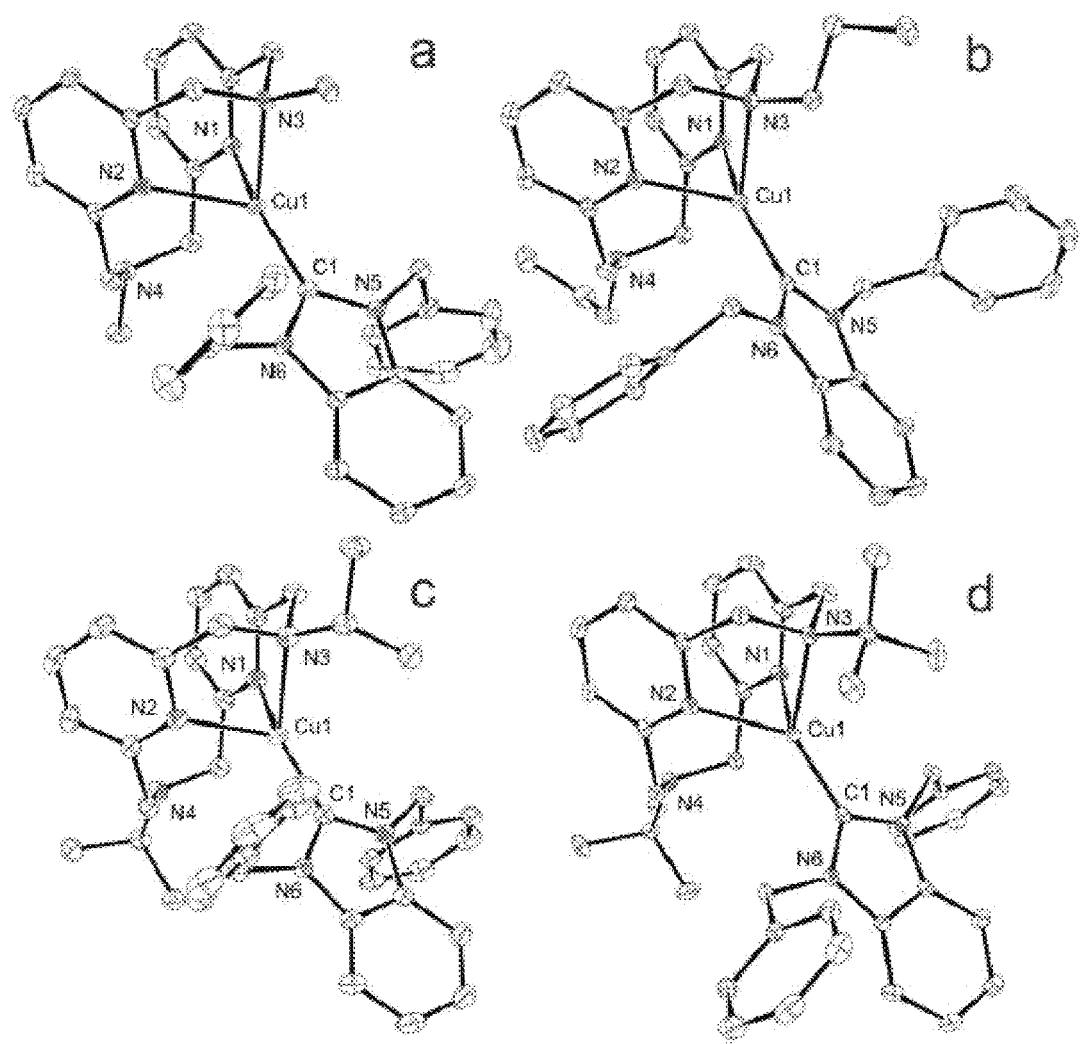
FIG. 41 is a ORTEP of the cationic parts of complexes Cu1 (a), Cu2 (b), Cu3 (c), and Cu4 (d) at 50% probability level according to single crystal XRD data.
Figure 42:
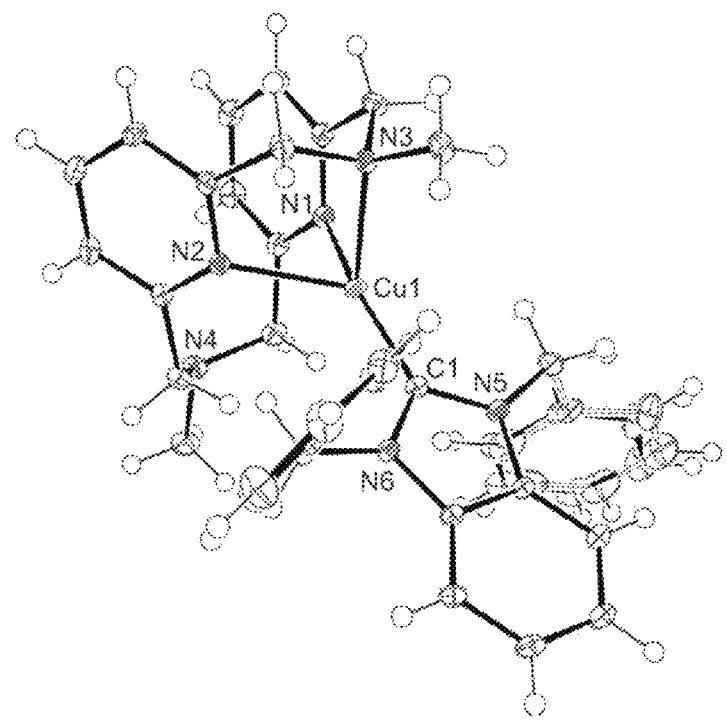
FIG. 42 is a ORTEP diagram showing 50% probability anisotropic displacement ellipsoids of non-hydrogen atoms for compound Cu3 according to single crystal X-ray diffraction data.
Figure 43:
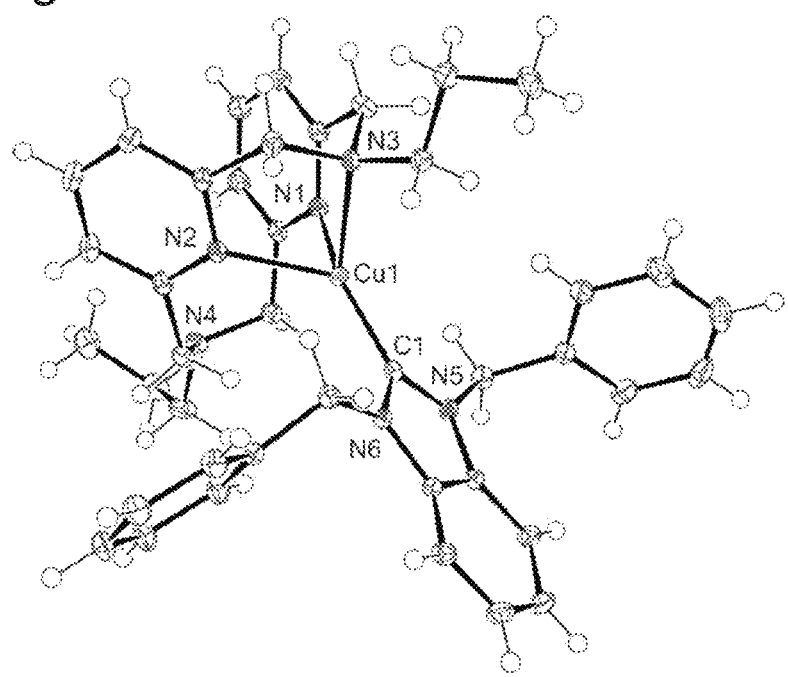
FIG. 43 is a ORTEP diagram showing 50% probability anisotropic displacement ellipsoids of non-hydrogen atoms for compound Cu4 according to single crystal X-ray diffraction data.
Figure 44:
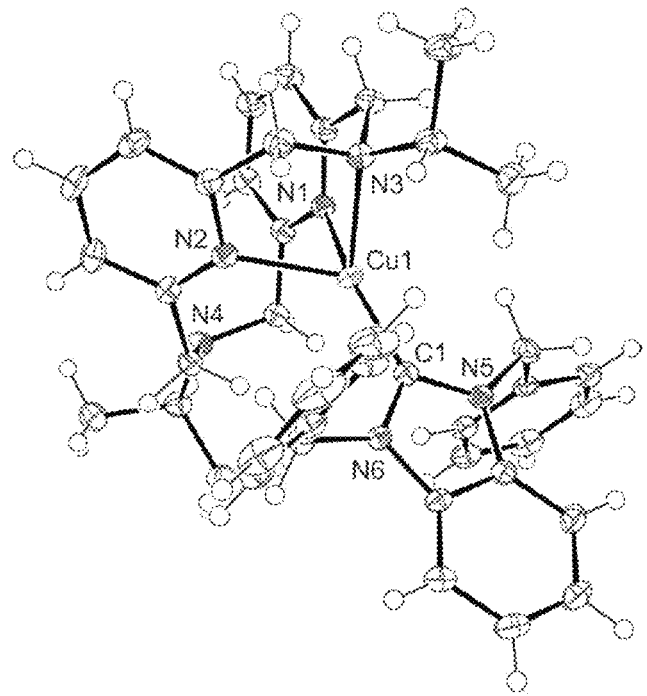
FIG. 44 is a ORTEP diagram showing 50% probability anisotropic displacement ellipsoids of non-hydrogen atoms for compound Cu5 according to single crystal X-ray diffraction data.
Figure 45:
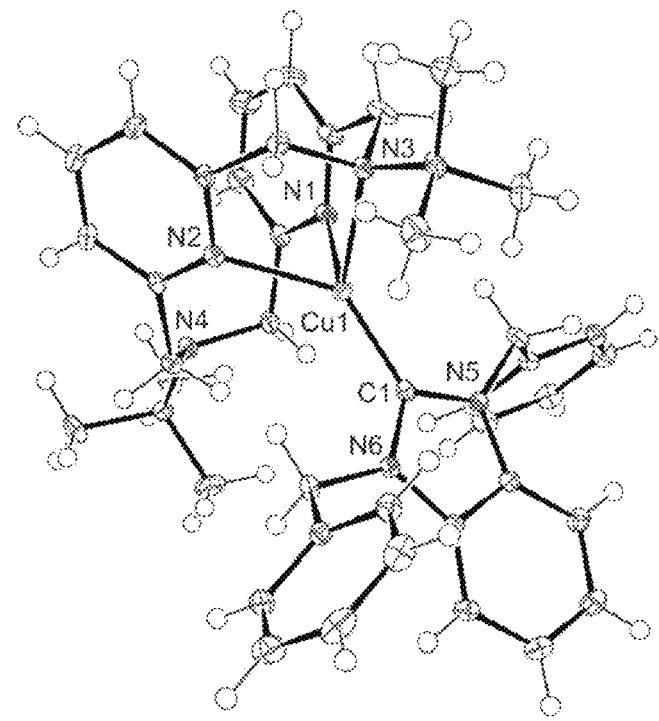
FIG. 45 is ORTEP diagram showing 50% probability anisotropic displacement ellipsoids of non-hydrogen atoms for compound Cu6 according to single crystal X-ray diffraction data.

Summary of XRD data for complexes Cu3-6 are shown in FIG. 41 and individual ORTEP plots are given in FIG. 42 to FIG. 45.

XV. REFERENCES

1. N. T. Coogan, M. A. Chimes, J. Raftery, P. Mocilac and M. A. Denecke, *J. Org. Chem.*, 2015, 80, 8684-8693.
2. E. van de Winckel, R. J. Schneider, A. de la Escosura and T. Torres, *Chem. Eur. J.*, 2015, 21, 18551-18556.
3. F. Tang, F. Qu, J. R. Khusnutdinova, N. P. Rath and L. M. Mirica, *Dalton Trans.*, 2012, 41, 14046-14050.
4. Z.-Y. L. Chi-Ming Che, Kwok-Yin Wong, Chung-Kwong Poon, Thomas C. W. Mak, Shie-Ming Peng, *Polyhedron*, 1994, 13, 771-776.
5. N. I. S. Korotkikh, V. S.; Kiselev, A. V; Glinyanaya, N. V; Marichev, K. A.; Pekhtereva, T. M.; Dudarenko, G. V; Bumagin, N. A.; Shvaika, O. P., *Chem. Heterocycl. Compd.*, 2012, 47, 1551-1560.
6. Z. Zhong, B. J. Postnikova, R. E. Hanes, V. M. Lynch and E. V. Anslyn, *Chem. Eur. J.*, 2005, 11, 2385-2394.
7. C. C. E. Musonda, C. D; Boyle, G. A., Patent WO 2013072903 A1, 2013.
8. P. H. Patil, G. A. Filonenko, S. Lapointe, R. R. Fayzullin and J. R. Khusnutdinova, *Inorg. Chem.*, 2018, 57, 10009-10027.
9. J. R. Alger and J. H. Prestegard, *J. Magn. Reson.*, 1977, 27, 137-141.
10. (a) J. R. Khusnutdinova, N. P. Rath and L. M. Mirica, *Inorg. Chem.*, 2014, 53, 13112-13129; (b) J. R. Khusnutdinova, J. Luo, N. P. Rath and L. M. Mirica, *Inorg. Chem.*, 2013, 52, 3920-3932.
11. G. M. Sheldrick, *Acta Crystallogr. Sect. A: Found. Crystallogr.*, 2015, 71, 3-8.
12. G. M. Sheldrick, *Acta Crystallogr. Sect. C: Cryst. Struct. Commun.*, 2015, 71, 3-8.
13. L. J. Farrugia, *J. Appl. Crystallogr.*, 2012, 45, 849-854.
14. S. Parsons, H. D. Flack and T. Wagner, *Acta Crystallogr. Sect. B: Struct. Sci.*, 2013, 69, 249-259.
15. A. Okuniewski, D. Rosiak, J. Chojnacki and B. Becker, *Polyhedron*, 2015, 90, 47-57.

INDUSTRIAL APPLICABILITY the mechanoresponsive luminescent material of the invention is useful as a sensor material for detecting strain and stress. The sensor containing the mechanoresponsive luminescent material of the invention detects strain and stress generated in the object to be detected with high sensitivity. Accordingly, the invention has high industrial applicability.

The present disclosure relates to the subject matter contained in Japanese Patent Application No. 2020-103434 filed on Jun. 16, 2020, and Chem. Commun., 2020,56, 50-53, the contents of which are expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A polymer comprising a polymer chain moiety and a copper complex moiety represented by the following formula (1):

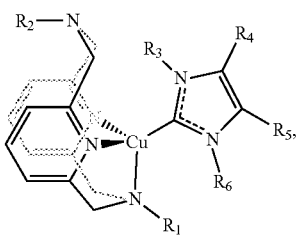

Formula (1)

wherein $R_1$ and $R_2$ each independently represent a linking group to the polymer chain moiety; and $R_3$ to $R_6$ each independently represent a hydrogen atom or a substituent, provided that $R_3$ and $R_4$, $R_4$ and $R_5$, and $R_5$ and $R_6$ each may be bonded to each other to form a cyclic structure, and at least one of the pyridine rings may be substituted.

2. The polymer according to claim 1, wherein $R_1$ and $R_2$ each comprise a functional group selected from the group consisting of an acryloyl group, an epoxy group, a triazole group, a sulfide group, a disulfide group, a siloxane bond, an amide group, an ester group, a carbon-carbon single bond, a carbon-carbon double bond, a carbon-carbon triple bond, an azide group, a thiol group, a hydroxy group, a carboxy group, an amino group, a cyanate group, and an isocyanate group.

3. The polymer according to claim 1, wherein $R_1$ and $R_2$ each independently comprise a group represented by the following formula (1a):

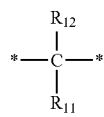

Formula (1a)

wherein $R_{11}$ and $R_{12}$ each independently represent a hydrogen atom or a substituted or unsubstituted alkyl group, and at least one of $R_{11}$ and $R_{12}$ is a substituted or unsubstituted alkyl group.

4. The polymer according to claim 1, wherein $R_3$ to $R_6$ each independently represent a hydrogen atom, an alkyl group, an alkenyl group, an alkynyl group, an alkoxy group, a nitro group, a cyano group, a halogen atom, a hydroxy group, a thiol group, an acyl group, a carboxyl group, a carboxyamide group, an ester group, a silane group, an alkoxysilane group, an amino group, an aldehyde group, an amide group, an isocyanate group, a triazole group, a sulfide group, a disulfide group, an aryl-substituted alkyl group, a haloalkyl group, a halo-alkoxy group, an aryl group, a heterocycloalkyl group, or a heteroaryl group.

5. The polymer according to claim 1, wherein $R_4$ and $R_5$ are bonded to each other to form an aromatic ring.

6. The polymer according to claim 1, wherein at least one of the pyridine rings in the formula (1) is substituted with a substituent.

7. The polymer according to claim 1, wherein $R_3$ and $R_6$ are benzyl groups.

8. The polymer according to claim 1, wherein the copper complex moiety is a crosslinker of the polymer chain moieties.

9. The polymer according to claim 1, wherein the polymer is an elastomeric polymer.

10. The polymer according to claim 1, wherein the polymer chain moiety comprises a structure selected from the group consisting of polyurethane, polyester, polyamide, polylactone, polystyrene, polyacrylate, polymethacrylate, polyalkyleneoxide, polysiloxane, polydimethylsiloxane, polycarbonate, polylactide, polyolefin, polyisobutylene, polyamideimide, polybutadiene, epoxy resin, polyacetylene, and polyvinyl.

11. The polymer according to claim 1, wherein the material is a film, a coating, or a fiber.

12. A composite material comprising the polymer of claim 1.

13. A mechanical stress, strain, or deformation sensor comprising the polymer of claim 1.

14. A method for detecting a mechanical stress, strain, or deformation comprising:
determining a mechanoresponse of the polymer of claim 1.

15. The method according to claim 14, wherein the mechanoresponse is determined by detecting a photoluminescence or a color change of the mechanoresponsive luminescent material.

16. The method according to claim 14, wherein the mechanical stress, strain, or deformation is derived from a mechanical loading selected from the group consisting of compression, tension, tensile stretch, impact, shear, crush, bend, abrasion, torsion, scratching, rubbing, and ultrasound.

17. A method for preparing a polymer comprising a polymer chain moiety and a copper complex moiety represented by the following formula (1):

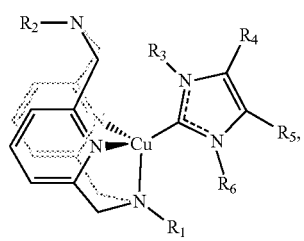

Formula (1)

wherein $R_1$ and $R_2$ each independently represent a linking group to the polymer chain moiety; and $R_3$ to $R_6$ each independently represent a hydrogen atom or a substituent, provided that $R_3$ and $R_4$, $R_4$ and $R_5$, and $R_5$ and $R_6$ each may be bonded to each other to form a cyclic structure, and at least one of the pyridine rings may be substituted, wherein the method comprises:

(1a) copolymerizing a monomer and a compound represented by the following formula (3a) to obtain a precursor polymer:

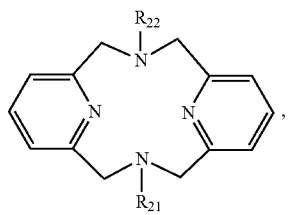

Formula (3a)

wherein $R_{21}$ and $R_{22}$ each independently represent a polymerizable group, and at least one of the pyridine rings may be substituted; or (1b) reacting a polymer chain having a first functional group and a compound represented by the following formula (3b) to obtain a precursor polymer:

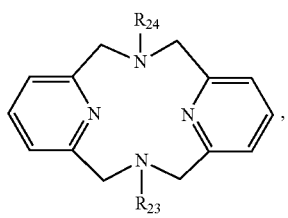

Formula (3b)

wherein $R_{23}$ and $R_{24}$ each independently represent a group having a second functional group that reacts with the first functional group to form a bond, and at least one of the pyridine rings may be substituted; and then, (2) reacting the precursor polymer and a compound represented by the following formula (4):

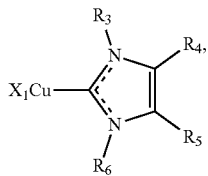

Formula (4)

wherein $X_1$ represents a halogen atom, a triflate group, or a pseudohalogen group; and $R_3$ to $R_6$ each independently represent a hydrogen atom or a substituent, provided that $R_3$ and $R_4$, $R_4$ and $R_5$, $R_5$ and $R_6$ each may be bonded to each other to form a cyclic structure.

18. A copper complex represented by the following formula (5):

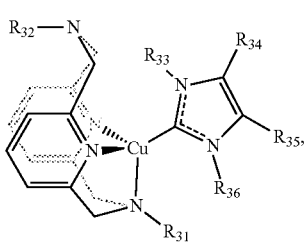

Formula (5)

wherein $R_{31}$ to $R_{36}$ each independently represent a hydrogen atom or a substituent, provided that $R_{33}$ and $R_{34}$, $R_{34}$ and $R_{35}$, $R_{35}$ and $R_{36}$ each may be bonded to each other to form a cyclic structure and at least one of the pyridine rings may be substituted, and in case where $R_{34}$ and $R_{35}$ are both hydrogen atoms, $R_{33}$ and $R_{36}$ are not both methyl groups or both isopropyl groups.

19. A method for preparing the copper complex of claim 18, comprising:

reacting a compound represented by the following formula (6) and a compound represented by the following formula (7):

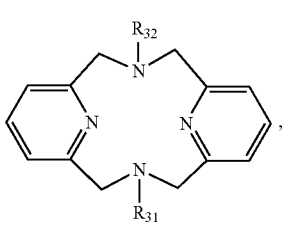

Formula (6)

wherein $R_{31}$ and $R_{32}$ each independently represent a hydrogen atom or a substituent, and at least one of the pyridine rings may be substituted;

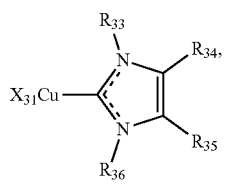

Formula (7)

wherein $X_{31}$ represents a halogen atom, a triflate group, or a pseudohalogen group; and $R_{33}$ to $R_{36}$ each independently represent a hydrogen atom or a substituent, provided that $R_{33}$ and $R_{34}$, $R_{34}$ and $R_{35}$, $R_{35}$ and $R_{36}$ each may be bonded to each other to form a cyclic structure, and in case where $R_{34}$ and $R_{35}$ are both hydrogen atoms, $R_{33}$ and $R_{36}$ are not both methyl groups or both isopropyl groups.

* * * * *